United States Patent
Tsutsui et al.

(10) Patent No.: US 6,169,973 B1
(45) Date of Patent: Jan. 2, 2001

(54) ENCODING METHOD AND APPARATUS, DECODING METHOD AND APPARATUS AND RECORDING MEDIUM

(75) Inventors: Kyoya Tsutsui; Osamu Shimoyoshi, both of Kanagawa (JP)

(73) Assignee: Sony Corporation, Tokyo (JP)

(*) Notice: Under 35 U.S.C. 154(b), the term of this patent shall be extended for 0 days.

(21) Appl. No.: 09/048,150

(22) Filed: Mar. 25, 1998

(30) Foreign Application Priority Data

Mar. 31, 1997 (JP) .................................................. 9-081208

(51) Int. Cl.[7] .............................. G10L 19/00; G10L 21/04
(52) U.S. Cl. ...................... 704/500; 704/501; 704/229; 704/230; 704/503
(58) Field of Search .................................... 704/229, 230, 704/222, 226, 201, 500–504, 233, 227; 369/124, 47

(56) References Cited

U.S. PATENT DOCUMENTS

| | | | |
|---|---|---|---|
| 4,896,362 | 1/1990 | Veldhuis et al. | 381/30 |
| 5,042,069 | 8/1991 | Chhatwal et al. | 381/31 |
| 5,105,463 | 4/1992 | Veldhuis et al. | 381/30 |
| 5,109,417 | 4/1992 | Fielder et al. | 381/36 |
| 5,264,846 | 11/1993 | Oikawa | 341/76 |

(List continued on next page.)

FOREIGN PATENT DOCUMENTS

| | | | |
|---|---|---|---|
| 2140779 | 5/1994 | (CA) | H03M 7/30 |
| 3440613 C1 | 4/1986 | (DE) | H04B 1/66 |
| 3506912 A1 | 8/1986 | (DE) | H03M 7/30 |
| 3639753 C2 | 9/1988 | (DE) | H03M 7/30 |
| 4020656 A1 | 1/1992 | (DE) | H04B 1/66 |

(List continued on next page.)

OTHER PUBLICATIONS

G. Stoll et al., "Mascam: Minimale Datenrate Durch Berucksichtigung Der Gehoreigenschaften Bei Der Codierung Hochwertiger Tonsignale," Fernseh– Und Kino–Tecknik, 42. JG., Nov. 1988, pp. 551–558.

E. Schroder et al., "Der MPEG–2–Standard: Generische Codierung Fur Bewegtbilder Und Zugehorige Audio–Information," Fernseh– Und Kino–Technik 48. JG., Nov. 1994, pp. 364–373.

Polyphase Quadrature Filters—A New Subband Coding Technique, J. Rothweiler, ICASSP Apr. 14, 15 and 16, 1983, Boston, vol. 3, pp. 1280–1283.

Perceptual Transform Coding of Wideband Stereo Signals, J. Johnston, ICASSP May 23–26, 1989, vol. 3, pp. 1993–1996.

(List continued on next page.)

Primary Examiner—David R. Hudspeth
Assistant Examiner—Vijay Chawan
(74) Attorney, Agent, or Firm—Limbach & Limbach LLP

(57) ABSTRACT

An encoding method and apparatus and a decodings method and apparatus in which the encoded information is decreased in volume and in which the encoding and decoding operations are performed with a smaller processing volume and a smaller buffer memory capacity. The apparatus includes a low range signal splitting circuit for separating low-range side signal components from L and R channel signals converted by a transform circuit into spectral signal components, and a channel synthesis circuit for synthesizing (L+R) channel signal components from the L and R channel spectral signal components. The apparatus also includes a high range signal separating circuit for separating the high range side signal components from the (L+R) channel signal components, a signal component encoding circuit for compression-encoding low-range side signal components and a signal component encoding circuit for compression-encoding the normalization coefficient information obtained on normalization of the (L+R) channel high-range signal components.

70 Claims, 31 Drawing Sheets

U.S. PATENT DOCUMENTS

| | | | |
|---|---|---|---|
| 5,268,685 | | 12/1993 | Fujiwara .................. 341/76 |
| 5,301,205 | | 4/1994 | Tsutsui et al. ............. 375/1 |
| 5,309,290 | | 5/1994 | Sugiyama et al. ......... 360/32 |
| 5,311,561 | | 5/1994 | Akagiri .................... 375/122 |
| 5,375,189 | | 12/1994 | Tsutsui .................... 395/2.38 |
| 5,381,143 | | 1/1995 | Shimoyoshi et al. ..... 341/51 |
| 5,438,643 | | 8/1995 | Akagiri et al. ........... 395/2.1 |
| 5,521,713 | | 5/1996 | Oikawa .................... 358/335 |
| 5,617,219 | | 4/1997 | Oikawa .................... 386/111 |
| 5,619,570 | | 4/1997 | Tsutsui .................... 380/4 |
| 5,623,557 | | 4/1997 | Shimoyoshi et al. ..... 382/246 |
| 5,654,952 | * | 8/1997 | Suzuki et al. ............ 369/124 |
| 5,717,821 | | 2/1998 | Tsutsui et al. ........... 395/2.14 |
| 5,724,612 | | 3/1998 | Haneda et al. ........... 395/853 |
| 5,731,767 | | 3/1998 | Tsutsui et al. ........... 341/50 |
| 5,737,718 | | 4/1998 | Tsutsui .................... 704/205 |
| 5,752,224 | | 5/1998 | Tsutsui et al. ........... 704/225 |
| 5,752,226 | * | 5/1998 | Chan et al. .............. 704/233 |
| 5,754,127 | | 5/1998 | Tsutsui et al. ........... 341/54 |
| 5,754,501 | | 5/1998 | Tsutsui .................... 369/32 |
| 5,757,927 | | 5/1998 | Gerzon et al. ........... 381/20 |
| 5,758,020 | | 5/1998 | Tsutsui .................... 395/213 |
| 5,781,586 | * | 7/1998 | Tsutsui .................... 375/241 |
| 5,805,770 | * | 9/1998 | Tsutsui .................... 704/224 |
| 5,819,214 | | 10/1998 | Suzuki et al. ............ 704/229 |
| 5,832,426 | * | 11/1998 | Tsutsui et al. ........... 704/229 |
| 5,864,800 | * | 1/1999 | Imai et al. ............... 704/229 |
| 5,870,703 | | 2/1999 | Oikawa et al. ........... 704/206 |
| 5,930,750 | * | 7/1999 | Tsutsui .................... 704/229 |

FOREIGN PATENT DOCUMENTS

| | | | |
|---|---|---|---|
| 4209544 C2 | 1/1994 | (DE) | H03M 7/30 |
| 4239506 A1 | 5/1994 | (DE) | H03M 7/30 |
| 0193143 A3 | 7/1988 | (EP) | H04B 1/66 |
| 0554081 A1 | 8/1993 | (EP) | G11B 20/10 |
| 0555031 A2 | 8/1993 | (EP) | G11B 13/00 |
| 0 653 846 A1 | 5/1995 | (EP) | H03M 7/30 |
| 0663740 A2 | 7/1995 | (EP) | H04H 1/00 |
| 0 713 295 A1 | 5/1996 | (EP) | H03M 7/30 |
| 0 717 518 A2 | 6/1996 | (EP) | H04H 5/00 |
| WO 9428633 | 12/1994 | (WO) | H03M 7/30 |

OTHER PUBLICATIONS

Digital Coding of Speech in Sub–bands, R. Crochiere et al., The Bell System Technical Journal, Oct. 1976, vol. 55, No. 8. pp. 1069–1085.

Subband/Transform Coding Using Filter Bank Designs Based on Time Domain Aliasing Cancellation, J. Princen et al, ICASSP Apr. 6–9, 1987, IEEE, vol. 4, pp. 2161–2164.

Adaptive Transform Coding of Speech Signals, R. Zelinski et al., IEEE Aug. 1977, vol. ASSP–25, No. 4. pp. 299–309.

The Critical Band Coder—Digital Encoding of Speech Signals Based on the Perceptual Requirements of the Auditory System, M. Krasner, Apr. 1980 IEEE, vol. 1–3, pp. 327–331.

A Method for the Construction of Minimum–Redundancy Codes, D. Huffman, Proceedings of the I.R.E., The Institute of Radio Engineers, Inc., Sep. 1952, vol. 40, No. 9, pp. 1098–1101.

Information Technology—Coding of Moving Pictures and Associated Audio for Digital Storage Media at up to About 1.5 Mbit/s, Part 3: Audio, ISO/IEC 11172–3, First Edition Aug. 1, 1993, pp. 1–150.

U.S. application No. 08/784,274, filing date Jan. 15, 1997.
U.S. application No. 08/786,326, filing date Jan. 23, 1997.
U.S. application No. 09/074,113, filing date May 7, 1998.
U.S. application No. 08/591,623, filing date Feb. 9, 1996.

* cited by examiner

ENCODING METHOD AND APPARATUS, DECODING METHOD AND APPARATUS AND RECORDING MEDIUM

BACKGROUND OF THE INVENTION

1. Field of the Invention

This invention relates to an encoding method and apparatus for encoding multi-channel acoustic signals, a decoding method and apparatus for decoding the encoded information and a recording medium having the encoded signals recorded thereon.

2. Description of Related Art

There has so far been proposed a recording medium capable of recording signals such as the encoded acoustic information or the music information (referred to hereinafter as audio signals), such as a magneto-optical disc. Among methods for high-efficiency encoding of the audio signals, there are a so-called transform coding which is a blocking frequency spectrum splitting method of transforming a time-domain signal into frequency domain signals by orthogonal transform and encoding the spectral components from one frequency band to another, and a sub-band encoding (SBC) method, which is a non-blocking frequency spectrum splitting method of splitting the time-domain audio signals into plural frequency bands without blocking and encoding the resulting signals of the frequency bands. There is also known a high-efficiency encoding technique which is a combination of the sub-band coding and transform coding, in which case the time domain signals are split into plural frequency bands by SBC and the resulting band signals are orthogonal transformed into spectral components which are encoded from band to band.

Among the above-mentioned filters is a so-called QMF (Quadrature Mirror Filter) filter as discussed in 1976, R. E. Crochiere, Digital Coding of Speech in subbands, Bell Syst. Tech. J. Vol. 55, No. 8, 1976. This QMF filter splits the frequency spectrum into two bands of equal bandwidths and is characterized in that so-called aliasing is not produced on subsequently synthesizing the split bands. The technique of dividing the frequency spectrum is discussed in Joseph H. Rothweiler, Polyphase Quadrature Filters—A New Subband Coding Technique, ICASSP 83 BOSTON. This polyphase quadrature filter is characterized in that the signal can be split at a time into plural bands of equal band-width.

Among the above-mentioned techniques for orthogonal transform is such a technique in which an input audio signal is blocked every pre-set unit time, such as every frame, and discrete Fourier transform (DFT), discrete cosine transform (DCT) or modified DCT (MDCT) is applied to each block for converting the signals from the time axis to the frequency axis. Discussions of the MDCT are found in J. P. Princen and A. B. Bradley, Subband/Transform coding Using Filter Bank Based on Time Domain Aliasing Cancellation, ICASSP 1987.

If the above-mentioned DFT or DCT is used as a method for transforming waveform signals into spectral signals, and transform is applied based on a time block composed of M samples, M independent real-number data are obtained. It is noted that, for reducing junction distortions between time blocks, a given time bock is usually overlapped with M1 samples with both neighboring blocks, and M real-number data on an average are quantized and encoded in DFT or DCT for (M−M1) samples. It is these M real-number data that are subsequently quantized and encoded.

On the other hand, if the above-mentioned MDCT is used as a method for orthogonal transform, M independents real-number data are obtained from 2M samples overlapped with M samples of both neighboring time blocks. Thus, in MDCT, M real-number data on an average are obtained for NM samples and subsequently quantized and encoded. A decoding device adds waveform elements obtained on inverse transform in each block from the codes obtained by MDCT with interference for re-constructing the waveform signals.

In general, if a time block for transform is lengthened, the spectrum frequency resolution is improved such that the signal energy is concentrated in specified frequency components. Therefore, by using MDCT in which, by overlapping with one half of each of both neighboring blocks, transform is carried out with long block lengths, and in which the number of the resulting spectral signals is not increased beyond the number of the original time samples, encoding can be carried out with higher efficiency than if the DFT or DCT is used. Moreover, since the neighboring blocks have sufficiently long overlap with each other, the inter-block distortion of the waveform signals can be reduced. However, if the transform block length for transform is lengthened, more work area is required for transform, thus obstructing reduction in size of reproducing means. In particular, use of a long transform block at a time point when it is difficult to raise the integration degree of a semiconductor should be avoided since this increases the manufacturing cost.

By quantizing signals split into plural frequency bands by a filter or orthogonal transform, the frequency band in which the quantization noise occurs can be controlled so that encoding can be achieved with psychoacoustic higher efficiency by exploiting acoustic characteristics such as masking effects. If the signal components are normalized with the maximum values of the absolute values of the signal components in the respective bands, encoding can be achieved with still higher efficiency.

As frequency band widths in case of quantizing the frequency components, obtained on splitting the frequency spectrum, it is known to split the frequency spectrum in such a manner as to take account of the psychoacoustic characteristics of the human auditory system. Specifically, the audio signals are divided into a plurality of, such as 25, bands using bandwidths increasing with increasing frequency. These bands are known as critical bands. In encoding the band-based data, encoding is carried out by fixed or adaptive bit allocation on the band basis. In encoding coefficient data obtained by MDCT processing by bit allocation as described above, encoding is by an adaptive number of bit allocation for band-based MDCT coefficients obtained by block-based MDCT processing. As these bit allocation techniques, there are known the following two techniques.

For example, in R. Zelinsky and P. Noll, 'Adaptive Transform Coding of Speech Signals' and in 'IEEE Transactions of Acoustics, Speech and Signal Processing, vol. ASSP-25, No. 4, August 1977, bit allocation is performed oil the basis of the magnitude of the band-based signals. With this system, the quantization noise spectrum becomes flat, such that the quantization noise is minimized. However, the actual noise feeling is not psychoacoustically optimum because the psychoacoustic masking effect is not exploited.

In a publication 'ICASSP 1980, 'The critical band coder—digital encoding of the perceptual requirements of the auditory system, M. A. Krasner, MIT', the psychoacoustic masking mechanism is used to determine a fixed bit allocation that produces the necessary signal-to-noise ratio for each critical band. However, if this technique is used to measure characteristics of a sine wave input, non-optimum results are obtained because of the fixed allocation of bits among the critical bands.

For overcoming these problems, there is proposed a high-efficiency encoding device in which a portion of the total number of bits usable for bit allocation is used for a fixed bit allocation pattern pre-fixed from one small block to another and the remaining portion is used for bit allocation dependent on the signal amplitudes of the respective blocks, and in which the bit number division ratio between the fixed bit allocation and the bit allocation dependent on the signal amplitudes is made dependent on a signal related to an input signal, such that the bit number division ratio to the fixed bit allocation becomes larger the smoother the signal spectrum.

This technique significantly improves the signal-to-noise ratio on the whole by allocating more bits to a bloclk including a particular signal spectrum exhibiting concentrated signal energy, as in the case of a sine wave input in which signal energies are concentrated in specified spectral signal components. By using the above techniques, for improving the signal-to-noise ratio characteristics, not only the measured values are increased, but also the sound as perceived by the listener is improved in signal quality, because the human auditory system is sensitive to signals having acute spectral components.

A variety of different bit allocation techniques have been proposed, and a model simulating the human auditory mechanism has also become more elaborate, such that perceptually higher encoding efficiency can be achieved supposing that the encoding device capability is correspondingly improved.

In these techniques, the customary practice is to find real-number reference values for bit allocation, realizing the signal-to-noise characteristics as found by calculations as, faithfully as possible, and to use integer values approximating the reference values as allocated bit numbers.

For constructing a real codestring, it suffices if the quantization fineness information and the normalization coefficient information are encoded with pre-set numbers of bits, from one normalization/quantization band to another, and the normalized and quantized spectral signal components are encoded. In the ISO standard (ISO/IFC 11172-3: 1993 (E), 1993), there is described a high-efficiency encoding system in which the numbers of bits representing the quantization fineness information are set so as to be different from one band to another. Specifically, the number of bits representing the quantization fineness information is set so as to be decreased with the increased frequency.

There is also known a method of determining the quantization fineness information in the decoding device from, for example, the normalization coefficient information. Since the relation between the normalization coefficient information and the quantization fineness information is set at the time of setting the standard, it becomes impossible to introduce the quantization fineness control based on a more advanced psychoacoustic model in future. In addition, if there is a width in the compression ratio to be realized, it becomes necessary to set the relation between the normalization coefficient information and the quantization fineness, information from one compression ratio to another.

There is also known a method of using variable length codes for encoding for realization of more efficient encoding of quantized spectral signal components, as described in D. A. Huffman, "A Method for Construction of Minimum Redundancy Codes", in Proc. I. R. E., 40, p. 1098 (1952).

In the International Laying-Open WO94/28633 of the present Assignee, there is disclosed a method of separating perceptually critical tonal components, that is signal components having the signal energy concentrated in the vicinity of a specified frequency, from the spectral signals, and encoding the signal components separately from the remaining spectral components. This enables audio signals to be efficiently encoded with a high compression ratio without substantially deteriorating the psychoacoustic sound quality.

The above-described encoding techniques can be applied to respective channels of acoustic signals constructed by plural channels. For example, the encoding techniques can be applied to each of the left channel associated with a left-side speaker and the right channel associated with a right-side speaker. The L and R channels of the audio signals are known to be correlated to each other such that this correlation can be used to realize encoding with a higher efficiency. For example, there is described in the publication 'Perceptual Transform Coding of Wideband Stereo Signals', James D. Johnston, ICSSSP89, picture processing. 1993 to 1995) a technique of taking a sum and a difference of the input L, and R channels, converting these into spectral signals, finding a masking curve from the spectrum of the sum and quantizing the spectrum of the sum and that of the difference using the masking curve to achieve encoding. Since in general it occurs frequently that the L-channel signals are similar to the R-channel signals, the signal level of the channel corresponding to (L−R) is rather low such that it be encoded with a relatively small number of bits. It is an ancillary merit of this technique that monaural signals can be reproduced by reproducing only the signals of the channel corresponding to (L+R).

In the ISO standard (ISO/IEC 11172-3: 1993(E), 1993), there is described a system in which L and R channels are split by a filter, both L and R channel signals or channel signals corresponding to (L+R) and (L−R) are encoded for the bands of the lower frequency and in which only normalization coefficients of each band with the higher frequency are separately encoded for both channels.

With the method of encoding the channel corresponding to the (L+R) and to the channel corresponding to (L−R) in the entire spectrum, signals of the two channels need to be encoded even if one of the channels is of low signal level. This sets a limit to improving the compression efficiency by encoding. If only the normalization coefficients are encoded for the high-range side, there is required a significant number of bits in encoding the normalization coefficients for the entire frequency spectrum.

Moreover, in the above technique, transform and inverse transform operations are required for encoding and decoding for signals of the entire spectrum of each of two channels, thus increasing the volume of the buffer memory used for transient data storage.

SUMMARY OF THE INVENTION

It is therefore an object of the present invention to provide a encoding method and apparatus for encoding multi-channel acoustic signals, a decoding method and apparatus for decoding the encoded information and a recording medium in which the volume of the encoding information can be decreased and in which encoding and decoding can be achieved with a smaller volume of the buffer memory.

In one aspect, the present invention provides a method for encoding an input signal including a splitting step of generating plural low-range signals and a number of high-range signals smaller in number than the input signal from a signal derived from plural input signals, a low-range encoding step of encoding each of the plural low-range side signals, a high-range encoding step of encoding the high-range side signal and for generating the encoding information obtained by the encoding step and a generating step for generating al codestring based on signals encoded by the low-range encoding step and the high-range encoding step, and on the encoding information.

In another aspect, the present invention provides an apparatus for encoding an input signal including splitting means for generating plural low-range signals and a number of high-range signals smaller in number than the input signal from a signal derived from plural input signals, low-range encoding means for encoding each of the plural low-range side signals, high-range encoding means for encoding the high-range side signal and for generating the encoding information obtained by the encoding means, and generating means for generating a codestring based on signals encoded by the low-range encoding means and the high-range encoding means, and on the encoding information.

In a further aspect, the present invention provides a method for decoding a codestring including: a separating step for splitting a codestring having low-range codes obtained on encoding each of plural low-range signals, generated based on plural signals, high-range codes obtained on encoding a number of high-range signals smaller in number than the plural signals and the encoded information obtained on encoding the high-range signals, a low-range decoding step for decoding the separated low-range codes, a high-range decoding step for decoding the separated high-range codes based on the encoded information, and a synthesis step for generating an output signal based on the decoded low-range side signals and the decoded high-range side signals.

In a further aspect, the present invention provides an apparatus for decoding a codestring including separating means for splitting a codestring having low-range codes obtained on encoding each of plural low-range signals, generated based on plural signals, high-range codes obtained on encoding a number of high-range signals smaller in number than the plural signals and the encoded information obtained on encoding the high-range signals, low-range decoding means for decoding the separated low-range codes, high-range decoding means for decoding the separated high-range codes based on the encoded information and synthesis means for generating an output signal based on the decoded low-range side signals and the decoded high-range side signals.

In yet another aspect, the present invention provides a recording medium having recorded thereon a codestring having low-range codes obtained on encoding each of plural low-range signals, generated based on plural signals, high-range codes obtained on encoding a number of high-range signals smaller in number than the plural signals and the encoded information obtained on encoding the high-range signals.

With the information encoding method and apparatus according to the present invention, acoustic signals of plural channels are split in frequency to produce a low-range side and a high-range side. In the low-range side, signals of the respective channels or signals that can be decoded on subsequent decoding are encoded for compression. In the high-range side, a number of channels smaller than in the low-range side are generated and at least the normalization coefficient information thereof is encoded for compression to decrease the volume of the encoded information to enable encoding with a smaller processing volume and a smaller buffer memory capacity.

The recording medium of the present invention has recorded thereon the codestring generated by the encoding method and apparatus of the present invention, thus enabling storage of acoustic signals of higher quality with the use of a smaller recording capacity.

According to the present invention, acoustic signals can be encoded using a smaller number of bits while the stereo sound effect or multi-channel effect, for example, is maintained. The processing volume or the buffer memory capacity required for encoding and decoding can also be reduced.

DESCRIPTION OF PREFERRED EMBODIMENTS

Figure 1:
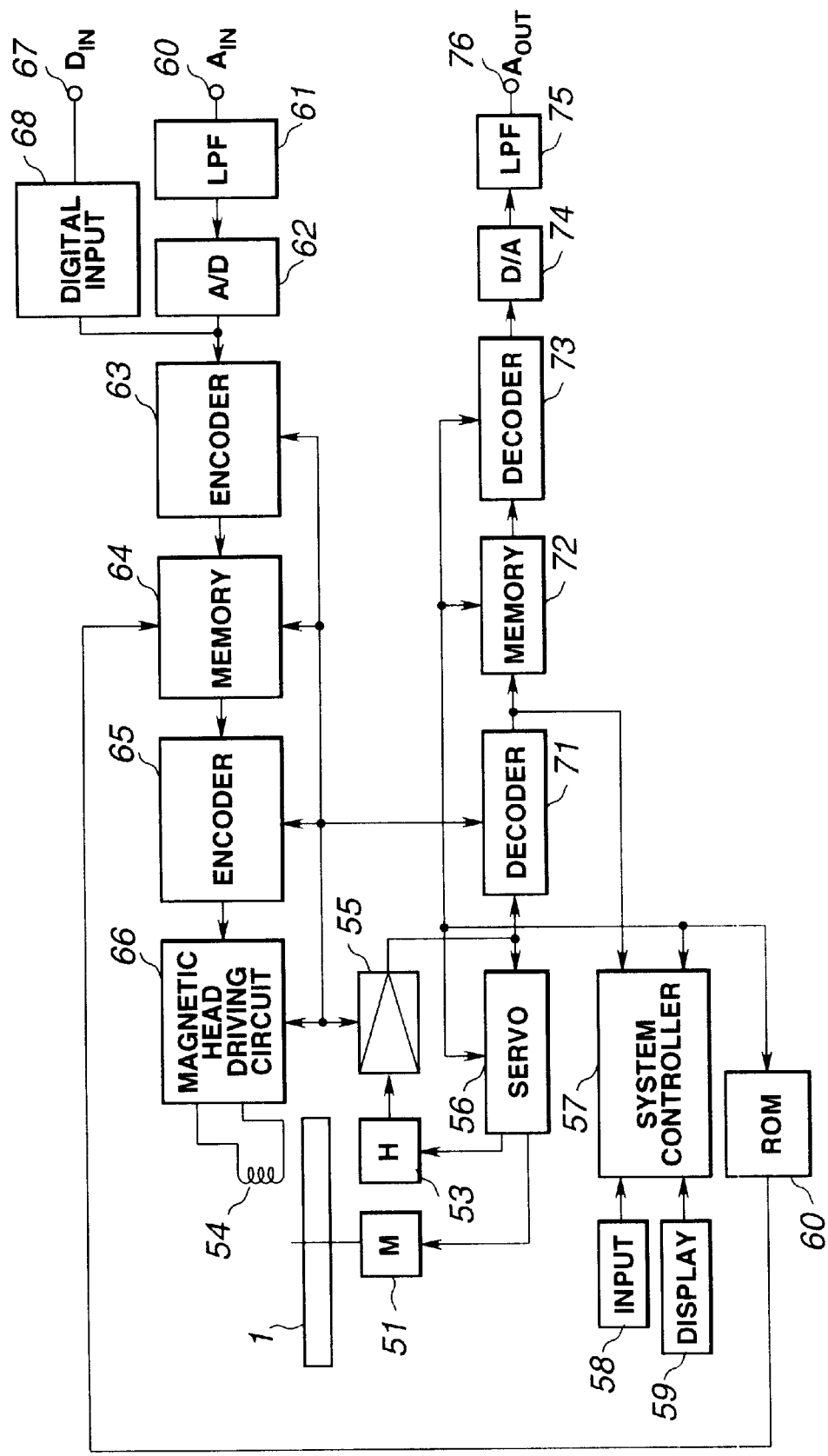
FIG. 1 is a block circuit diagram showing an illustrative structure of a recording/reproducing apparatus as an embodiment of the compressed data recording/reproducing apparatus according to the present invention.

Referring to the drawings, preferred embodiments of the present invention will be explained in detail.

FIG. 1 shows the schematic structure of a compressed data recording/reproducing apparatus according to an embodiment of the present invention.

In the compressed data recording/reproducing apparatus shown in FIG. 1, a magneto-optical disc 1 run in rotation by a spindle motor (M) 51 is used as a recording medium. During data recording on the magneto-optical disc 1, a modulating magnetic field corresponding to recording data is applied by a magnetic head (H) 54, as the laser light beam is illuminated by, for example, a magnetic head 53, by way of performing; so-called magnetic field modulation recording for recordings data along a recording track of the magneto-optical disc 1. During reproduction, the recording track of the magneto-optical disc 1 is traced by the laser light by an optical head 53 for photomagnetic data reproduction.

The optical head 53 is made up of a laser light source, such as a laser diode, optical components, such as a collimator lens, an objective lens, a polarization beam splitter and a cylindrical lens. This optical head 53 is mounted facing the magnetic head 54 via magneto-optical disc 1. When recording data on the magneto-optical disc 1, the magnetic head 54 is driven by a magnetic head driving circuit 66 of a recording system as later explained for applying the modulating magnetic field corresponding to the recording data, at the same time as the laser light beam is illuminated on a target track of the magneto-optical disc 1 by the optical head 53 by way of performing thermo-magnetic recording in accordance with the magnetic field modulating system. On the other hand, the optical head 53 detects the reflected light of the laser light illuminated on the target track in order to detect the focusing error by the astigmatic method and in order to detect the focusing error by the push-pull method. For reproducing data from the magneto-optical disc 1, the optical head 53 detects the focusing errors and the tracking errors, at the same time as it detects the difference in the polarization angle (Kerr rotation angle) from the target track of the laser light in order to generate playback signals.

An output of the optical head 53 is supplied to an RF circuit 55, which extracts the focusing error signals and the tracking error signals from the output of the optical head 53 to supply the extracted signals to a servo control circuit 56, while converting the playback signals to a bi-level signal which is supplied to a decoder 71 of the reproducing system.

The servo control circuit 56 is made up of, for example, a focusing servo control circuit, a tracking servo control circuit, a spindle motor servo control circuit and a thread servo control circuit. The focusing servo control circuit focusing-controls the optical system of the optical head 53 for reducing the focusing error signals to zero, while the tracking servo control circuit tracking-controls the optical system of the optical head 53 for reducing the tracking error signals to zero. The spindle motor servo control circuit controls the spindle motor 51 so that the magneto-optical disc 1 will be run in rotation at a pre-set rotational velocity, such as at a pre-set linear velocity. The thread servo control circuit also moves the optical head 53 and the magnetic head 54 to a target track position on the magneto-optical disc 1 designated by a system controller 57. The servo control circuit 56, performing these various control operations, sends the information specifying the operating states of the various, components controlled by the servo control circuit 56 to the system controller 57.

To the system controller 57 are connected a key input operating unit 58 and a display unit 59. The system controller 57 supervises the recording system and the reproducing system by the operating input information from the key input unit 58. The system controller 57 also supervises the recording position or the playback position on the recording track traced by the optical head 53 and the magnetic head 54, based on the sector-based address information reproduced by the header timer or subcode Q-data from the recording track of the magneto-optical disc 1. The system controller 57 also performs control of displaying the playback time on the display unit 59 based on the data compression rate of the compressed data recording/reproducing device and the playback position information on the recording track.

For playback time display, the sector-based address information (absolute time information) reproduced by the header data or the sub-code Q data from the recording track of the magneto-optical disc 1 is multiplied by a reciprocal of the data compression ratio, such as 4 for the 1/4 compression, in order to find the actual time information, which is displayed on a display unit 59. For recording, if the absolute time information is pre-recorded (pre-formatted) on the recording track of, for example, a magneto-optical disc, the pre-formatted absolute time information can be read out and multiplied by the reciprocal of the data compression ratio for displaying the current position in terms of the actual recording time.

In this recording system of the disc recording/reproducing device, an analog audio input signal $A_{in}$ at an input terminal 60 is supplied via a low-pass filter (LPF) 61 to an A/D converter 62 which then quantizes the analog audio input signal $A_{in}$. The digital audio signal from the A/D Converter 62 is supplied to a ATC encoder 63. The digital audio input signal Din from the input terminal 67 is supplied via a digital input interfacing circuit (digital input) 68 to the ATC (Adaptive Transform Coding) encoder 63. The ATC encoder 63 performs bit compression (data compression) corresponding to a pre-set data compression ratio on the digital audio PCM data of the pre-set transfer rate obtained on quantization of the input signal $A_{in}$ by the A/D converter 62. The compressed data (ATC data) outputted by the pre-set data compression ratio is supplied to a memory 64. Supposing that the data compression ratio is 1/8, the data transfer rate is reduced to one-eighth of the data transfer rate of the CD-DA format as the standard digital audio CD formalt of 75 sectors/sec or to 9.375 sectors/second.

The memory (RAM) 64 is used as a buffer memory having data write/readout controlled by the system controller 57 and which is configured for transiently holding on memory the ATC data supplied from the ATC encoder 63 for recording the data on a disc whenever the necessity arises. That is, if the data compression ratio is 1/8, for example, the compressed audio data supplied from the ATC encoder 63 has its data transfer rate reduced to 1/8 of the data transfer rate for the standard CD-DA format of 75 sectors/ second, that is to 9.375 sectors/ second. It is this compressed data (ATC data) that is continuously recorded in the memory 64. For these compressed data (ATC data), it suffices to record the data at a rate of one sector per eight sectors, as discussed previously. However, since this recording every eight sectors is virtually impossible, sector-continuous recording is carried out, as will be explained subsequently. This recording is carried out in a burst fashion at the same data transfer rate as that for the standard CD-DA format (75 sectors/ second), with preset plural sectors, such as 32 sectors plus several sectors, as a recording unit.

That is, the ATC audio data with the data compression rate of 1/8, continuously written at a low transfer rate of 9.375 (=75/8) sectors/second, are read out from the memory 64 in a burst-like manner as recording data at the above-mentioned transfer rate of 75 sectors/second. The overall data transfer rate of the data, thus read out and recorded, including the non-recording period, is the above-mentioned low rate of 9.375 sectors/second. However, the instantaneous data transfer rate within the time of the burst-like recording operation is the above-mentioned standard rate of 75 sectors/second. Therefore, if the rotational velocity of the disc is the above-mentioned standard velocity of the CD-DA format (constant linear velocity), recording is by the same recording density and the same recording pattern as those of the CD-DA format.

The ATC audio data, that is the recording data, read out from the memory 64 in the burst-like fashion at the (instantaneous) transfer rate of 75 sectors/ second, is supplied to an encoder 65. In the data string supplied from the memory 64 to the encoder 65, a continuous recording unit per each recording is a cluster made up of plural sectors, such as 32 sectors, and several cluster-interconnecting sectors arrayed ahead and at back of the cluster. These cluster interconnecting sectors are set so as to be longer than the interleaving length at the encoder 65, such that interleaving cannot affect data of other clusters.

The encoder 65 applies encoding for error correction, such as parity appendage and interleaving, or EPM encoding, to the recording data supplied in a burst-like fashion from the: memory 64. The recording data encoded by the encoder 65are supplied to the magnetic head driving circuit 66 To this magnetic head driving circuit 66 is connected the magnetic head 54 so that the magnetic head 54 is driven for applying the magnetic field modulated in accordance with the recording data to the magneto-optical disc 1.

The system controller 57 performs memory control as described above on the memory 64, while also controlling the recording position for continuously recording the recording data continuously in a burst-like fashion from the memory 64 by this memory control on the recording track of the magneto-optical disc 1. For controlling the recording position in this manner, the recording position read out in a burst fashion from the memory 64 is supervised by the system controller 57 for supplying a control signal designating the recording position on the recording track of the magneto-optical disc 1 to the servo control circuit 56.

Figure 4:
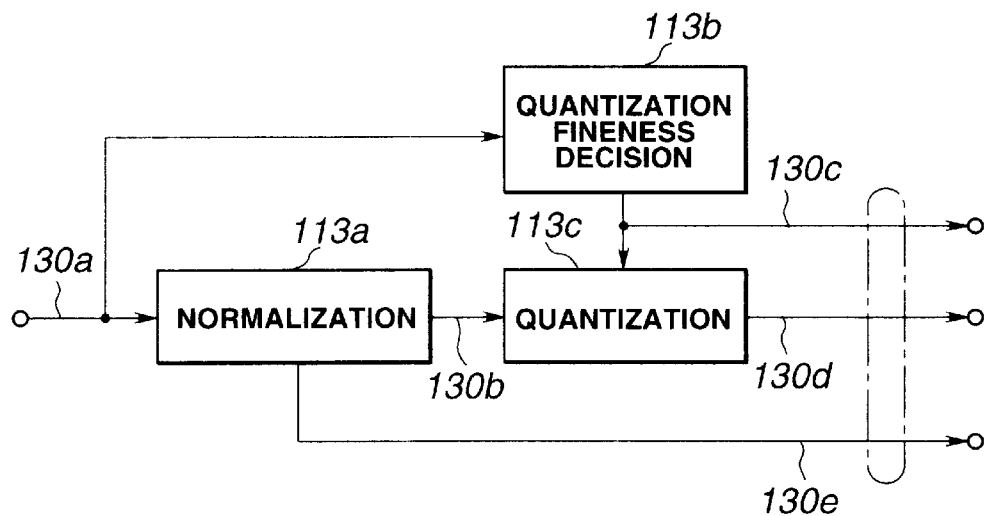
FIG. 4 is a block circuit diagram showing an illustrative structure of a transform circuit according to the present invention.

The reproducing system of the disc recording/reproducing device shown in FIG. 4 is now explained. This reproducing system is configured for reproducing recording data continuously recorded on the recording track of the magneto-optical disc 1 by the above-described recording system. Thus, the reproducing system includes a decoder 71 supplied with a bi-level signal obtained by a RF circuit 55 from the playback output obtained in turn by the optical head 53 tracing the recording track of the magneto-optical disc 1 with a laser light beam. It is noted that not only the magneto-optical disc but also the read-only optical disc similar to the compact disc (CD) can be read.

The decoder 71 is a counterpart device of the encoder 65 of the above-described recording system. The playback output, converted into the bi-level signal by the RF circuit 55, is decoded for error correction or is EFM decoded for reproducing the ATC audio data having the data compression rate of 1/8 at a transfer rate of 75 sectors/second which is faster than the normal transfer rate. The playback data, obtained by the decoder 71, is supplied to a memory 72.

In the memory 72, having data write/readout controlled by the system controller 57, the playback data supplied from the decoder 71 at the transfer rate of 75 sectors/second, its written in a burst-like fashion at the transfer rate of 75 sectors/second. In the memory 72, the above-mentioned playback data, written at the above-mentioned transfer rate of 75 sectors/second, is continuously read out at the transfer rate of 9.375 sectors/second corresponding to the data compression rate of 1/8.

The system controller 57 performs memory control for writing the playback data in the memory 72 at the transfer rate of 75 sectors/second, while reading out the playback data. from the memory 7 at the transfer rate of 9.375 sectors/second. The system controller 57, performing the memory control for the memory 72 as described above., controls the playback position for continuously reading out the playback data written in the burst-like fashion from the memory 72 by the memory control from the recording track of the magneto-optical disc 1. The playback position control is by supervising the playback position of the playback data read out in the burst-like fashion from the memory 72 by the system controller 57 and by supplying a control signal designating the playback position on the recording track of the optical disc 1 or the magneto-optical disc 1 to the servo control circuit 56.

The ATC audio data, continuously read out from the memory 72 at the transfer rate of 9.375 sectors/second, is supplied to an ATC decoder 73. This ATC decoder 73 is a counterpart device of the ATC encoder 63 of the recording system and reproduces the 16-bit digital audio data by expanding the ATC data by a factor of eight. The digital audio data from the ATC decoder 73 is supplied to a D/A converter 74.

The D/A converter 74 converts the digital audio date supplied from the ATC decoder 73 into an analog signal for forming an analog audio output signal $A_{out}$. This analog audio output signal $A_{out}$, obtained from the D/A converter 74, is outputted via a low-pass filter 75 at an output terminal 76.

The high-efficiency encoding is explained in detail. Specifically, the technique of high-efficiency encoding an input digital signal, such as an audio PCM signal, by techniques of sub-band coding (SBC), adaptive transform coding (ATC) and adaptive bit allocation, is explained by referring to FIG. 2ff.

In the encoding device (encoder 63 of FIG. 1) for executing the method for encoding the information (acoustic waveform signals) of the present invention, an input signal waveform 110a is converted by a conversion circuit 111a into signal frequency components 110b. These signal frequency components 110b are then encoded by a signal component encoding circuit 111b to produce an encoded signal 110c. A codestring generating circuit 111c then generates a codestring 110d from an encoded signal 110c generated by the codestring generating circuit 111c.

The conversion circuit 111a splits the input signal 120a by a band-splitting filter 112a into two bands and resulting two band signals 120b, 120c are transformed by forward orthogonal transform circuits 112b, 112c by MDCT into spectral signal components 120d, 120e. The input signal 120a corresponds to the signal waveform 110a of FIG. 2, while the spectral signal components 120d, 120e correspond to the signal frequency components 110b shown in FIG. 2. In the conversion circuit 111a, shown in FIG. 3, the bandwidths of the two band-split signals 120b, 120c are one-half the bandwidth of the input signal 120a, that is, the input signal 120a is thinned out by ½. Of course, any other structure of the conversion circuit 111a may be used besides the illustrative example. For example, the input signal may be directly transformed by MDCT into spectral signals, while the input signal may also be transformed by DFT or DCT, instead of by MDCT. Although the input signal may be split into frequency components by a band splitting filter, the input signal is preferably transformed by the above-mentioned ark orthogonal transform methods into frequency components because then a large number of frequency components can be obtained with a smaller volume of processing operations.

The signal component encoding circuit 111b normalizes the signal components 130a from one pre-set band to another, by a normalization circuit 113a, while calculating the quantization fineness information 130c from the signal components 130a by the quantization fineness decision circuit 113b, as shown in FIG. 4. The quantization circuit 113c quantizes the normalized spectral coefficient data 130b from the normalization circuit 113a based on the quantization fineness information 130c. Meanwhile, the signal components 130a correspond to the encoded signal 110b of FIG. 2. The encoded signal 110c of FIG. 2 includes the normalization coefficient information for normalization 130e and the above-mentioned quantization fineness information 130c, in addition, to the quantized signal components for normalization 130d from the quantization circuit 113c.

Figure 5:
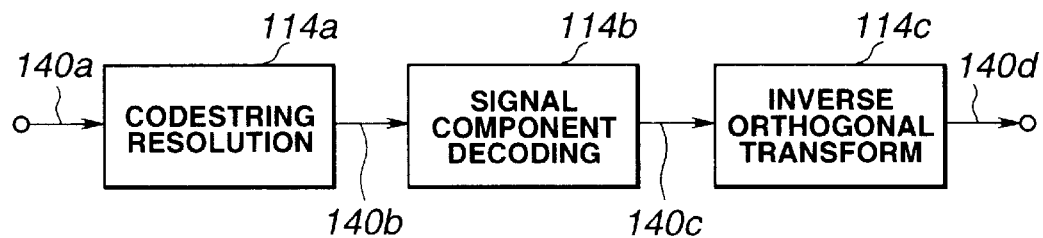
FIG. 5 is a block circuit diagram showing an illustrative structure of a decoding circuit according to the present invention.

In the decoding apparatus (decoder 73 of FIG. 1) for regenerating the audio signals from the codestring generated by the above-described encoder, codes 140b of the signal components, normalization coefficient information and the quantization fineness information are extracted from, a codestring 140a by a codestring resolution circuit 114a, as shown in FIG. 5. From these codes 140b, signal components 140c are restored by a codestring decoding circuit 114b and, from the restored signal components 140c, acoustic waveform signals 140d are regenerated by a back-conversion circuit 114c.

Figure 3:
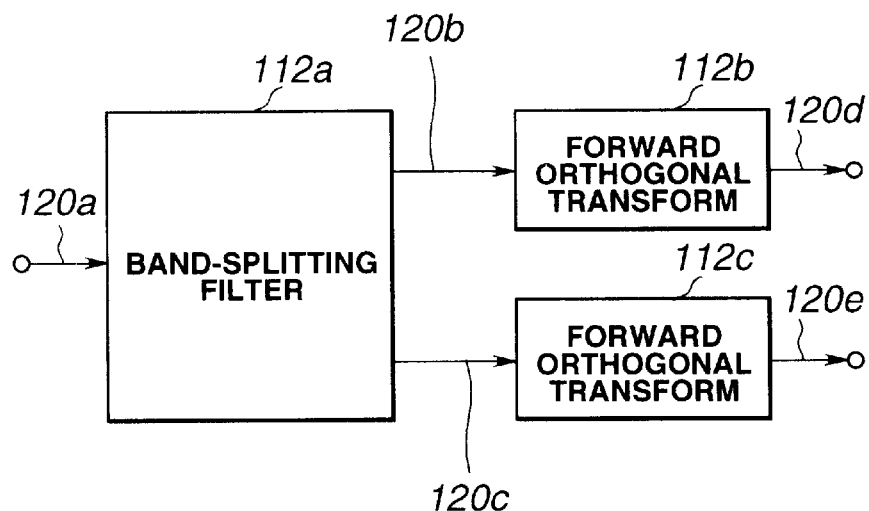
FIG. 3 is a block circuit diagram showing an illustrative structure of a signal component encoding circuit according to the present invention.
Figure 6:
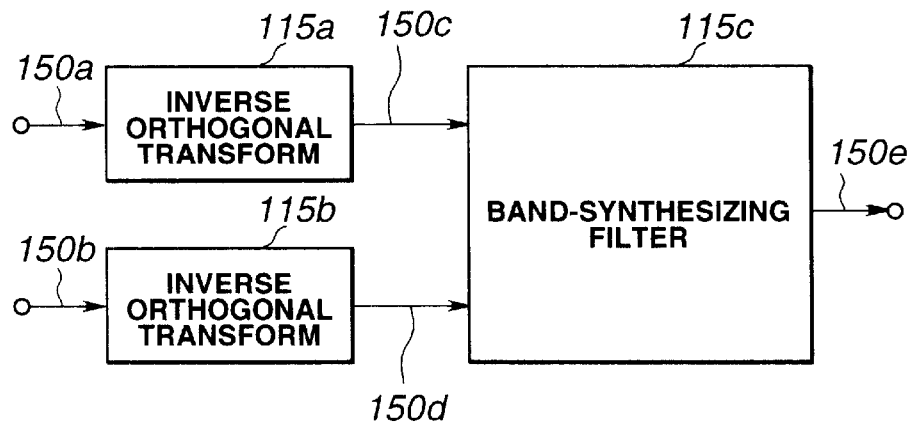
FIG. 6 is a block circuit diagram showing an illustrative structure of an inverse transform circuit according to the present invention.

This back-conversion circuit 114c of the information decoder is configured as shown in FIG. 6 and is associated with the conversion circuit shown in FIG. 3. In the back-conversion circuit 114c, shown in FIG. 6, inverse orthogonal transform circuits 115a, 115b apply inverse orthogonal transform to input signals 150a, 150b, respectively, for restoring the band signals, which are then synthesized by a band synthesizing filter 115c. The input signals 150a, 150b correspond to a signal 140c the signal components of which have been restored by the signal component decoding circuit 114b. An output signal 150e of the band synthesizing filter 115c corresponds to the acoustic waveform signal 140d of FIG. 5.

Figure 7:
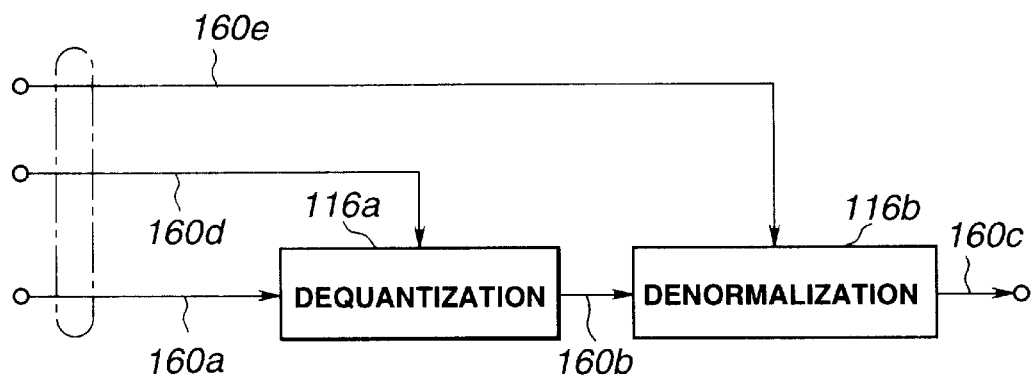
FIG. 7 is a block circuit diagram showing an illustrative structure of a signal component encoding circuit according to the present invention.

The signal component decoding circuit 114b of FIG. 5 is configured as shown in FIG. 7, and applies dequantization and denormalization processing to the codes 140b from the codestring resolution circuit 114a, that is spectral signals. In the signal component decoding circuit 114b, shown in FIG. 7, a dequantization circuit 116a dequantizes input codes 160a, while the denormalization circuit 116b denormalizes the signals 160b obtained on dequantization to output signal components 160c. The above codes 160a correspond to codes 140b from the codestring resolution circuit 114a of FIG. 5, while the output signal components 160c correspond to the signal components 140c of FIG. 5.

Figure 8:
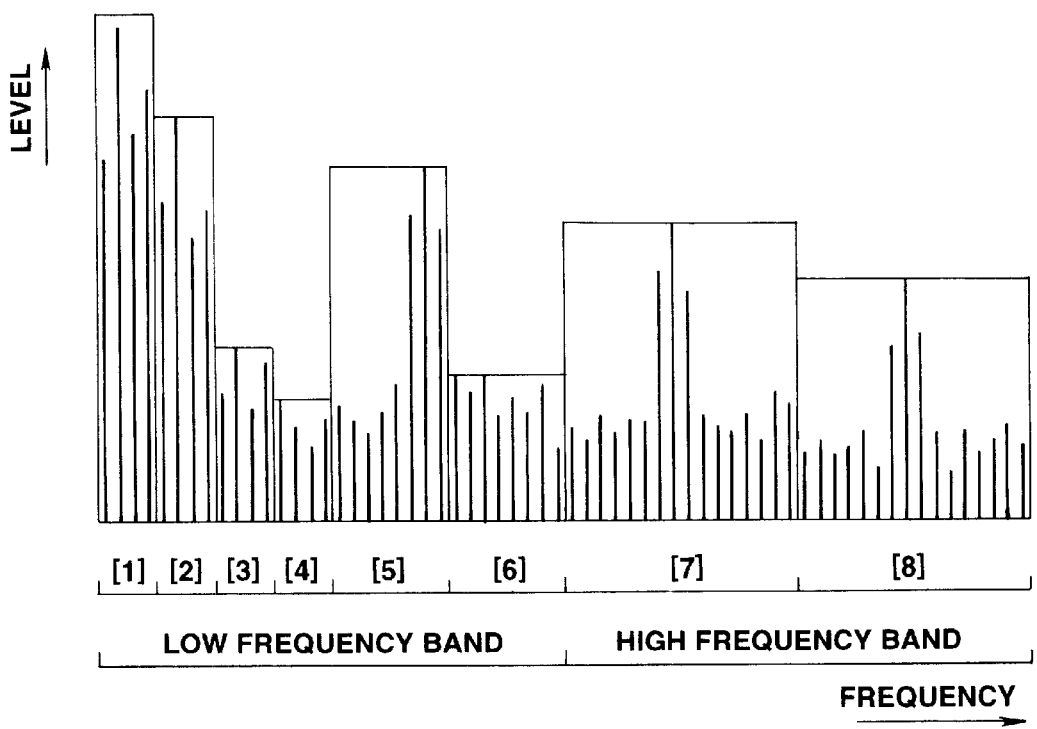
FIG. 8 illustrates a basic encoding method.

The spectral signals obtained by the conversion circuit of the above-described encoder, shown in FIG. 3, are as shown for example in FIG. 8. The spectral components, shown in FIG. 8, denote absolute values of the spectral components by MDCT after level conversion by dB values. That is, in this encoder, the input signal is converted into 64 spectral components, from one pre-set transform block to another, and is normalized and quantized in terms of eight bands, termed herein encoding units, shown in [1] to [8] in FIG. 8. It is noted that these spectral signals transiently split into two bands by band-splitting by the band-splitting filter, followed by forward orthogonal transform, in which the bandwidth of the encoding unit can be set independently of the bandwidth of the band-splitting filter. The input signal may also be transformed directly into spectral signals by orthogonal transform without being passed through the band-splitting filter. If the quantization fineness is varied from one encoding unit to another depending on how the frequency components are distributed, there is assured encoding with perceptually high efficiency with suppression of the sound quality deterioration to the minimum.

Figure 9:
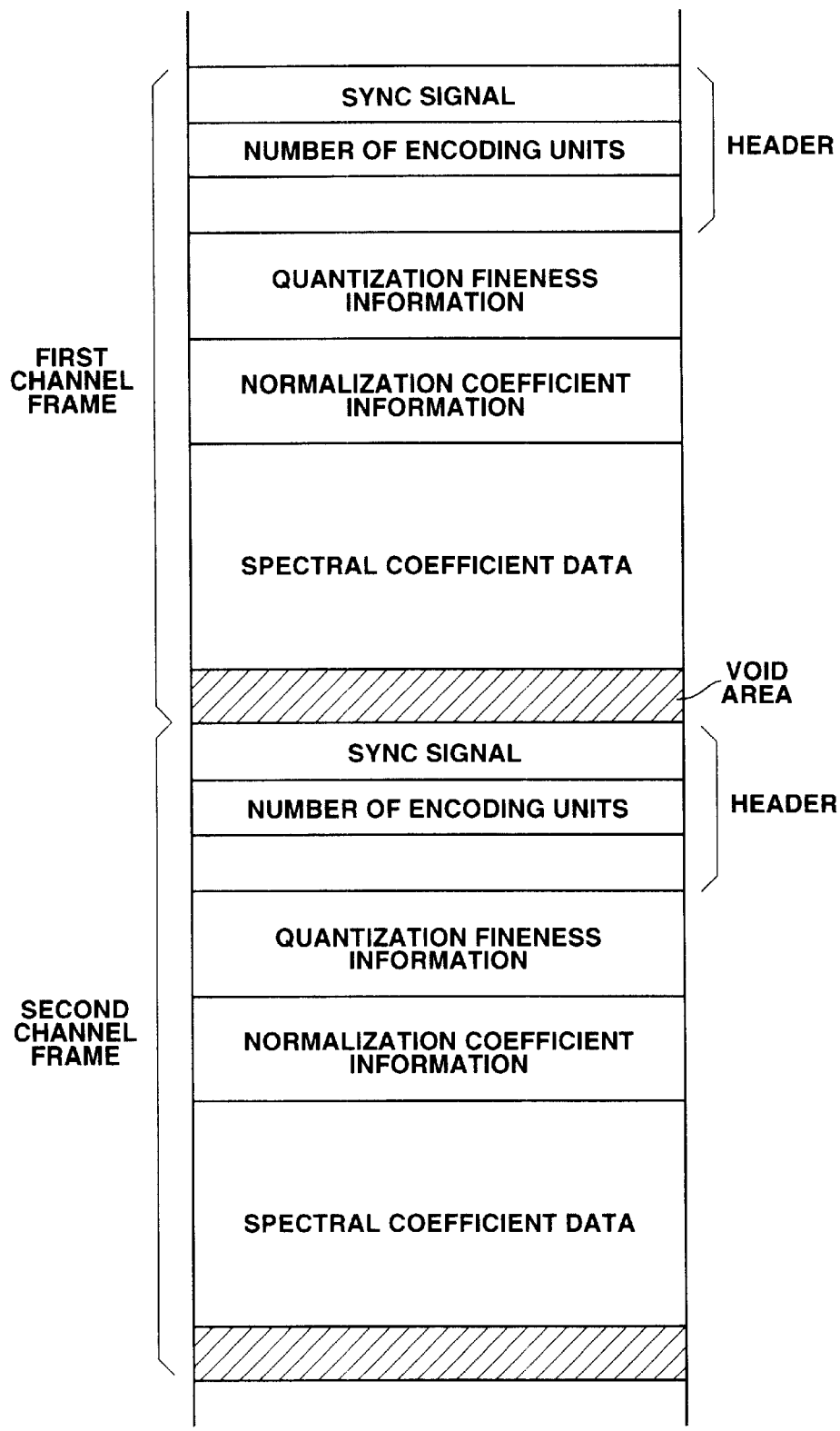
FIG. 9 illustrates the structure of a codestring of a frame encoded by the basic encoding method.

FIG. 9 shows an illustrative structure of a codestring in case of encoding as described above.

In the present an illustrative structure, data for restoration of spectral signals of each transform block (time block) are encoded in accordance with frames each made up of a pre-set number of bits, for a first channel for the left channel and for a second channel as the right channel, with the L and R channels being arrayed alternately. In a leading end (header) of each frame are sequentially arranged the information which is the control data such as synchronization signals and the encoded number of encoding units, encoded with a pre-set number of bits, the information which is the quantization fineness information and normalization. coefficient information of each encoding unit, and the. spectral coefficient data, normalized and quantized on the basis of the normalization coefficient data and the quantization fineness data from one encoding unit to another. The information corresponding to the control data and the spectral coefficient data are encoded beginning from the low-range side encoding unit.

The number of bits actually required for decoding the spectral signals of the transform block is determined by the number of the encoded encoding units and the number of quantization bits specified by the quantization fineness information of each encoding unit. The number of bits may vary from one frame to another. The above-mentioned required number of bits, counting from the leading end of each frame, is valid during reproduction, with the remaining area of each frame being a void area not affecting playback signals.

By encoding each time block in association with a frame having a pre-set number of bits, as in the present embodiment, the recording position of an arbitrary transform block can easily be calculated when the codestring is recorded in a recording medium, such as an optical disc, for facilitating random accessing, that is reproduction from an arbitrary position. Usually, a larger number of bits are effectively used for improving the sound quality for minimizing the void area in each frame.

Figure 10:
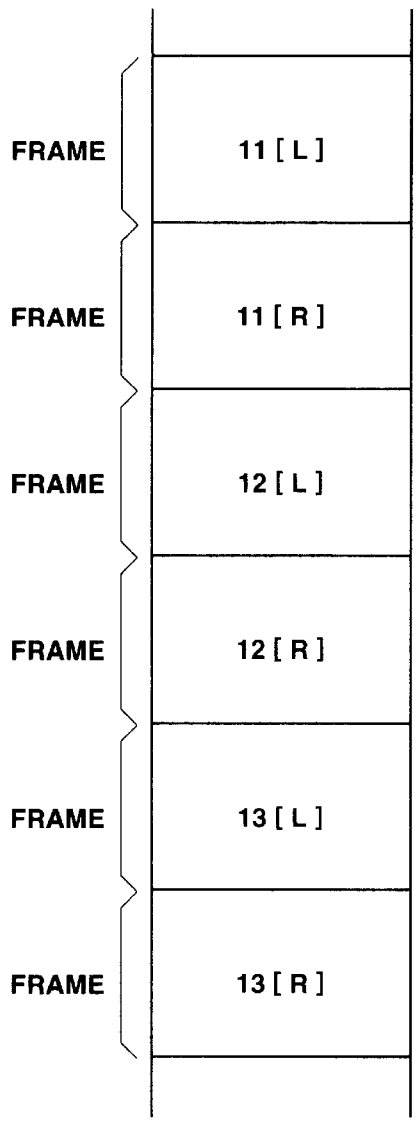
FIG. 10 shows an example of arraying L and R channels from frame to frame.
Figure 11:
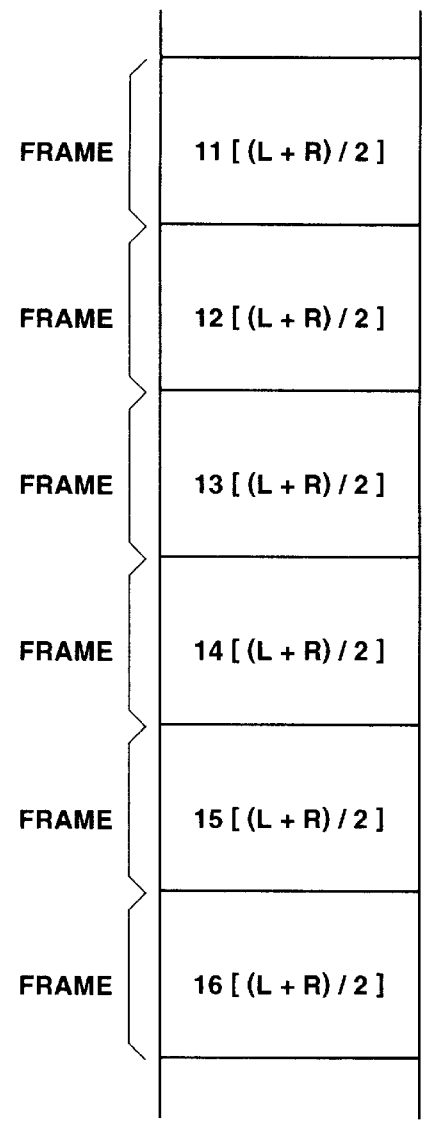
FIG. 11 shows an example of arranging the channel (L+R)/2 to a frame.

FIGS. 10 and 11 illustrate an example of a recording format when chronologically recording data of the frame shown in FIG. 9. FIG. 10 shows an example in which the left (L) and right (R) channels are arrayed alternately from frame to frame, and FIG. 11 shows signals having sample values produced on (L+R)/2-ing L and R channels from frame to frame. The channel obtained in this manner on (L+R)/2-ing L and R channels from frame to frame is termed herein a (L+R) channel. Similarly, the channel obtained in this manner on (L−R)/2-ing L and R channels from frame to frame is termed herein a (L−R) channel.

By employing the recording format as shown in FIG. 10, the two channels of L and R can be recorded on the same recording medium. If the recording format as shown in FIG. 11 is used, in which two channels of L and R are arrayed alternately from frame to frame, double time signals can be recorded/reproduced, while reproduction can be realized without complicating the reproducing circuit.

Although the technique explained with reference to FIG. 9 has been discussed above, the encoding efficiency can be further improved over the encoding method of FIG. 9.

For example, the encoding efficiency can be improved by employing the so-called variable encoding technique of allocating shorter and longer codelengths for the signals of higher and lower probability of occurrence, respectively.

Also, if the above-mentioned pre-set transform block in encoding input signals, that is the time block length for orthogonal transform, is longer, the quantity of the subsidiary information, such as the quantization fineness information or the normalization coefficient information, can be reduced per block, while the frequency resolution can be controlled more finely, thus improving the encoding efficiency.

In addition, if a method disclosed in PCT Application of the International Publication WO94/28633 by the present Assignee, that is a method of separating perceptually crucial tonal components, that is signal components where the energy is concentrated in a specified frequency, from the spectral signals components, and encoding the separated tonal components independently of the remaining spectral signal components, efficient encoding may be realized with a high compression ratio without substantially producing perceptual deterioration of audio signals.

Figure 12:
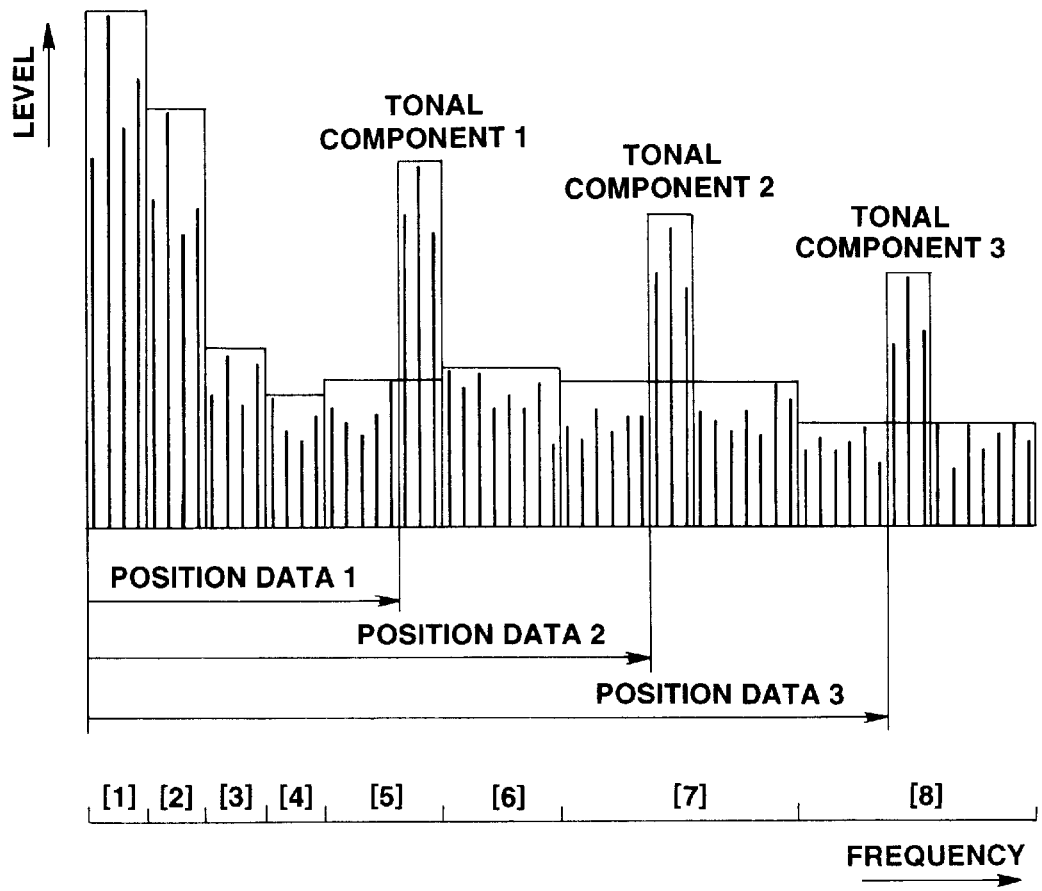
FIG. 12 illustrates an encoding method in which the signal components are divided into tonal and noise components and encoding the resulting signals.

Referring to FIG. 12, the method of separating the tonal signal components and encoding the separated signal components is explained. In the example of FIG. 12, a set of three tonal components have been separated as tonal signal components from the spectral signal components. The signal components making up each tonal component are encoded along with respective position data on the frequency axis of the tonal components.

In general, the signal components of the tonal components, where the energy is concentrated in a relatively small number of spectral components, need to be quantized to extremely high precision for evading sound quality deterioration. However, the spectral coefficients in each encoding unit freed of the tonal components can be quantized with a relatively small number of bits without deteriorating the perceptual sound quality.

Although only a relatively small number of spectral signal components are shown in FIG. 12 for simplifying the drawing, the signal energy is concentrated in a few signal components of tens of signal components making up a given encoding unit. Therefore, the amount of data is not increased significantly as a result of separation of the tonal components, such that the encoding efficiency can be improved on the whole by separating the tonal components.

Figure 13:
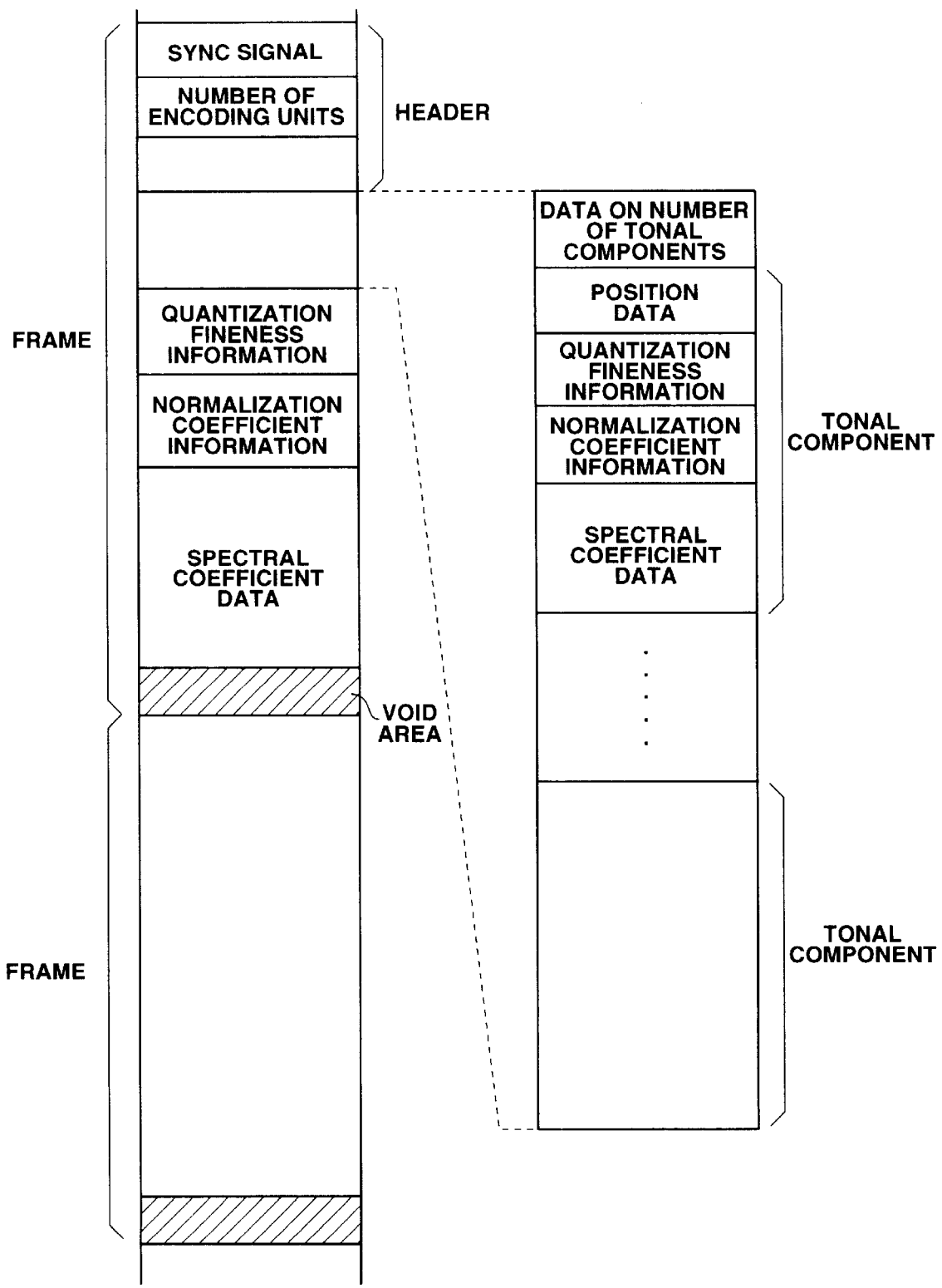
FIG. 13 illustrates the structure of a codestring encoded by the encoding method of dividing the signal components into tonal and noise components and encoding the resulting signals.

FIG. 13 shows an illustrative structure of a codestring in case of encoding by the method explained with reference to FIG. 12. In the present illustrative structure, there is arrayed, at the leading end of each frame, the information comprised of control data, such as sync signals and the encoded number of the encoding units, encoded with a pre-set number of bits, as a header portion. Next to the header portion is arrayed the information comprised of the encoded tonal component data as tonal component data.

As tonal component data, the information which is the encoded number of signal components in the tonal components is arrayed first, and is followed by the information which is the encoded position information of the tonal components on the frequency axis, the information which is the encoded information on the normalization coefficients and the information which is the normalized, quantized and encoded tonal signal components, in this order.

Next to the tonal component data is arrayed the information which is the encoded data of the residual signal left after subtraction of the tonal signal components from the original spectral signal components. This residual signal can also be termed noisy signal components. This residual signal is comprised of quantization fineness data and normalization coefficient data of each encoding unit, spectral component signals normalized and quantized based on the normalization coefficients data and the quantization fineness data (signal components other than the tonal components) encoded in the order of the increasing frequency of the encoding units. It is noted that spectral signal components of the tonal and other signal components (coefficient data) are encoded by VLC.

Figure 2:
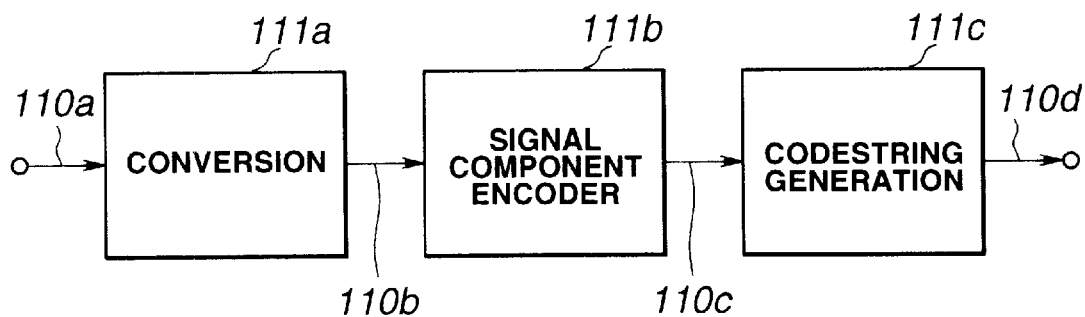
FIG. 2 is a block circuit diagram showing an illustrative structure of an encoding circuit according to the present invention.
Figure 14:
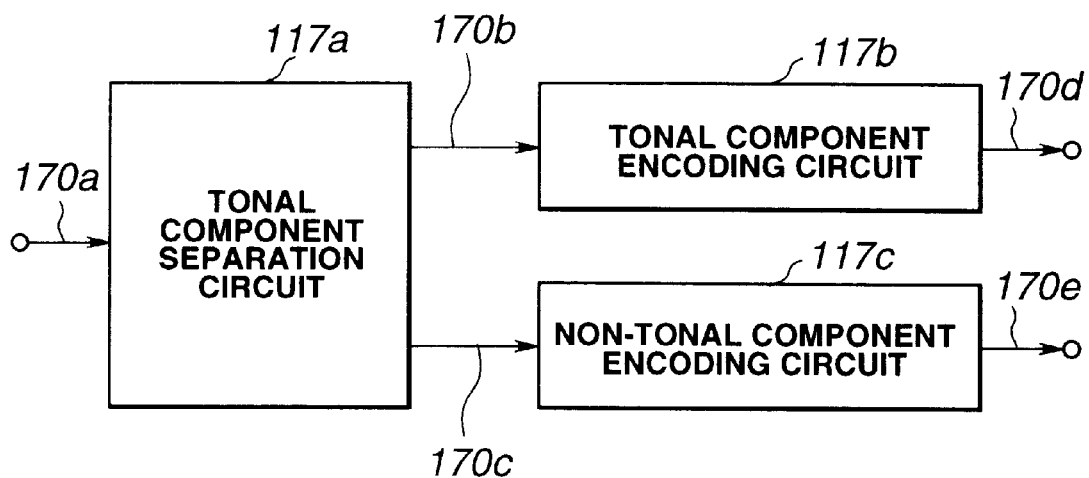
FIG. 14 is a block circuit diagram showing an illustrative structure of a signal component encoding circuit configured for dividing the signal components into tonal and noise components and encoding the resulting signals.

FIG. 14 shows an illustrative example of the signal component encoding circuit 111b of FIG. 2 when separating the tonal signal components from the above-mentioned respective signal components.

In the signal component encoding circuit 111b, shown in FIG. 14, the signal components 170a (110b) sent from the conversion circuit 111a of FIG. 2 are sent to a tonal component separation circuit 117a. The signal components 170a are separated into tonal signal components 170b and other signal components 170c (non-tonal signal components). The tonal signal components 170b are sent to a tonal component encoding circuit 117b, while the non-tonal signal components 170c are sent to a non-tonal component encoding circuit 117c. The tonal component encoding circuit 117b and the non-tonal component encoding circuit 117c encode the signal components supplied thereto to output resulting output signals 170d, 170e. The tonal component encoding circuit 117b generates the information constituting the tonal component data of FIG. 13, at the same time as it encodes the information constituting the tonal component data of FIG. 13. The signal encoding arrangements in the tonal component encoding circuit 117b and in the non-tonal component encoding circuit 117c are the same as those shown in FIG. 4.

Figure 15:
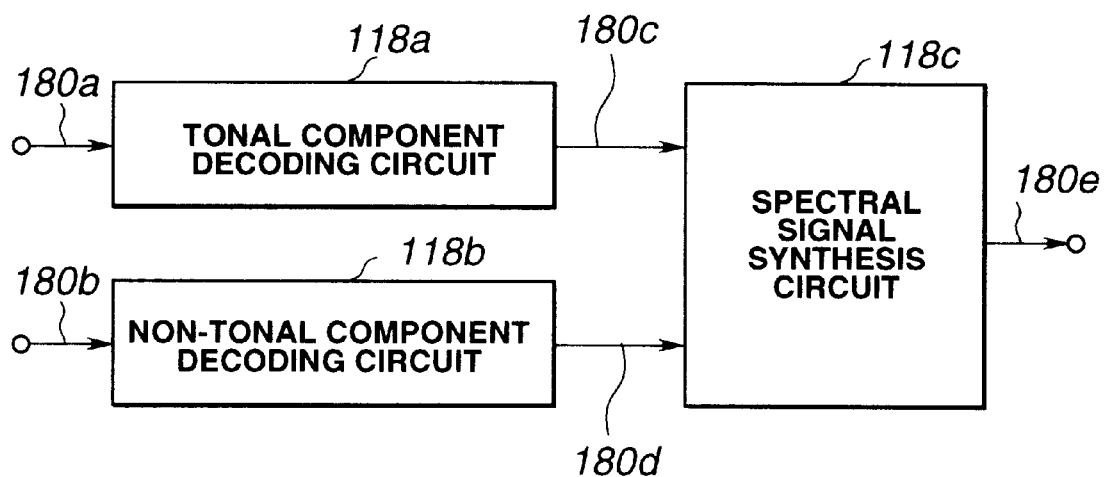
FIG. 15 is a block circuit diagram showing an illustrative structure of a signal component decoding circuit configured for decoding a codestring obtained on dividing the signal components into tonal and noise components and encoding the resulting signals.

FIG. 15 shows an illustrative example of the signal component decoding circuit 114b in case the tonal signal components have been separated from the respective signal components.

In the signal component decoding circuit 114b, shown in FIG. 15, the code 140a supplied from the codestring resolution circuit 114a of FIG. 5 is made up of tonal component data 180a and non-tonal component data 180b, which are sent to associated tonal component decoding circuit 118a and non-tonal component decoding circuit 118b, respectively. The tonal component decoding circuit 118a decodes the tonal signal components from the tonal component data shown in FIG. 13 to output resulting tonal signal components 180c. The non-tonal component decoding circuit 118b decodes the tonal signal components from the non-tonal component data to output resulting non-tonal signal components 180d. These tonal signal components 180c and the non-tonal signal components 180d are both sent to a spectral signal synthesis circuit 118c, which then synthesizes the tonal signal components and the non-tonal signal components based on the above-mentioned position data to output the resulting signal components 180e. The decoding configurations of the tonal component decoding circuit 118a and the non-tonal component decoding circuit 118b are the same as those shown in FIG. 7.

Although the method for efficient encoding of signals of respective channels has been explained above, there is also known a method for further improving the encoding efficiency by exploiting signal correlation between channels. For example, if, when the L-channel signals are substantially similar in waveform to the R-channel signals, signals having the sample values of (L+R)/2 and those having the sample values of (L−R)/2 are encoded in place of encoding the L and R channels, the signal (L−R)/2 is of a smaller value, so that encoding can be done with a smaller number of bits.

Figure 16:
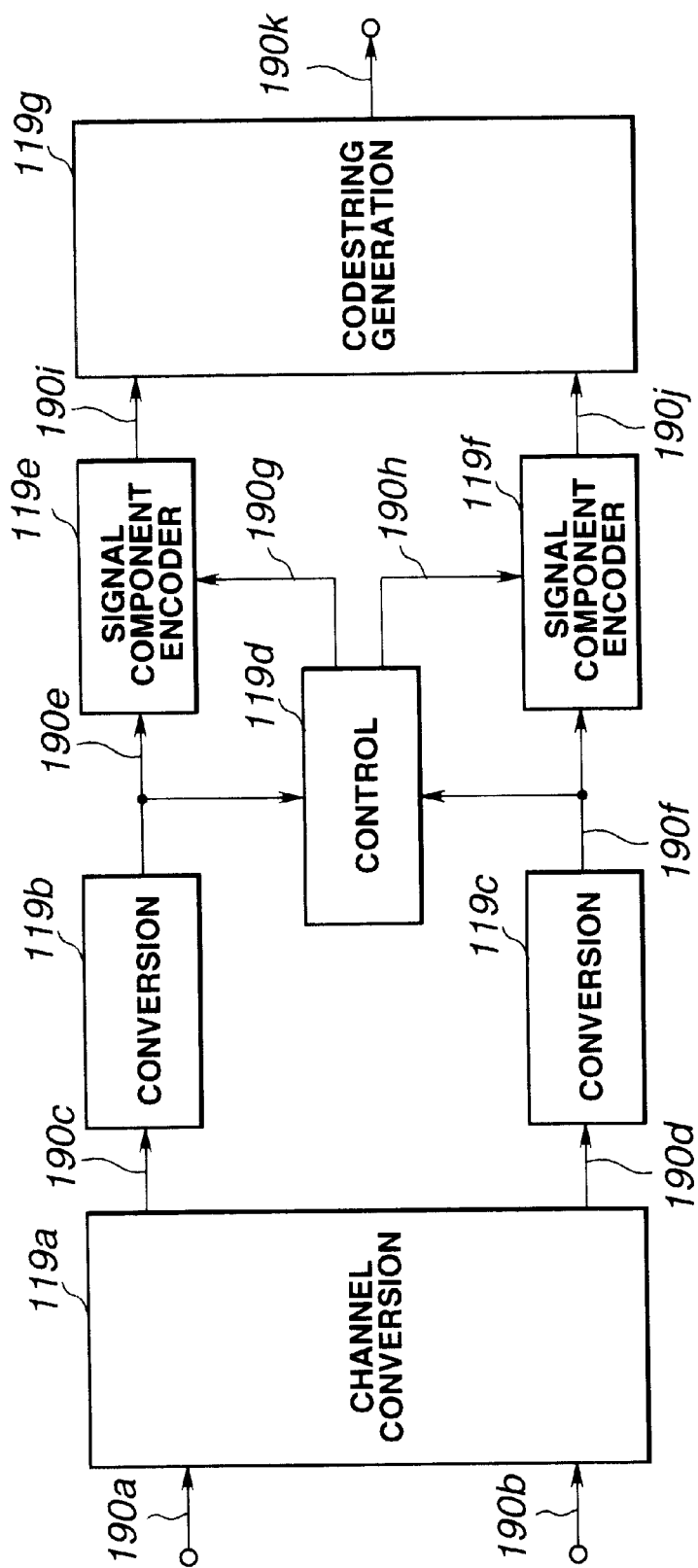
FIG. 16 is a block circuit diagram showing a schematic structure of an encoding circuit configured for encoding a channel (L+R)/2 and a channel (L−R)/2.

FIG. 16 shows an illustrative structure of an encodings device for encoding by the above-mentioned method.

Referring to FIG. 16, a channel conversion circuit 119a converts a L-channel signal 190a and a R-channel signal 190b into a (L+R) channel signal 190c (signal having sampled value of (L+R)/2) and a (L−R) channel signal 190d (signal having sampled value of (L−R)/2).

The signal 190c of the (L+R) channel and the signal 190d of the (L−R) channel are sent to the conversion circuits 119b, 119c, respectively, so as to be converted as in the conversion circuit 111a of FIG. 2.

The signal components 190e from the conversion circuit 119b and the signal components 190f from the conversion circuit 119c are sent to the signal component encoding circuits 119e and 119f, respectively. These signal component encoding circuits 119e and 119f operate similarly to the signal component encoding circuit 111b of FIG. 2. The signal components 190e, 190f are also sent to the control circuit 119d.

The control circuit 119d determines the number of allocated bits 190g in encoding the signal components of the (L+R) channel in the signal component encoding circuit 119e and the number of allocated bits 190h in encoding the signal components of the (L−R) channel in the signal component encoding circuit 119f, respectively, based on the signal components 190e, 190f of the conversion circuits 119b, 119c, respectively. During this bit number decision, the entire bits can also be allocated so that the number of bits will be proportionate to the signals energies in each channel.

Thus, the signal components 190e, 190f encode the signal components 190e for the (L+R) channel the signal components 190f for the (L−R) channel based on the numbers of allocated bits 190g, 190h as determined by the control circuit 119d.

The encoding by the signal component encoding circuits 119e, 119f generates codes 190i, 190j both of which are sent to a codestring generating circuit 119g. This codestring generating circuit 119g generates and outputs a codestring 190k from the codes 190i, 190j of the (L+R) and (L−R) channels, respectively.

Figure 17:
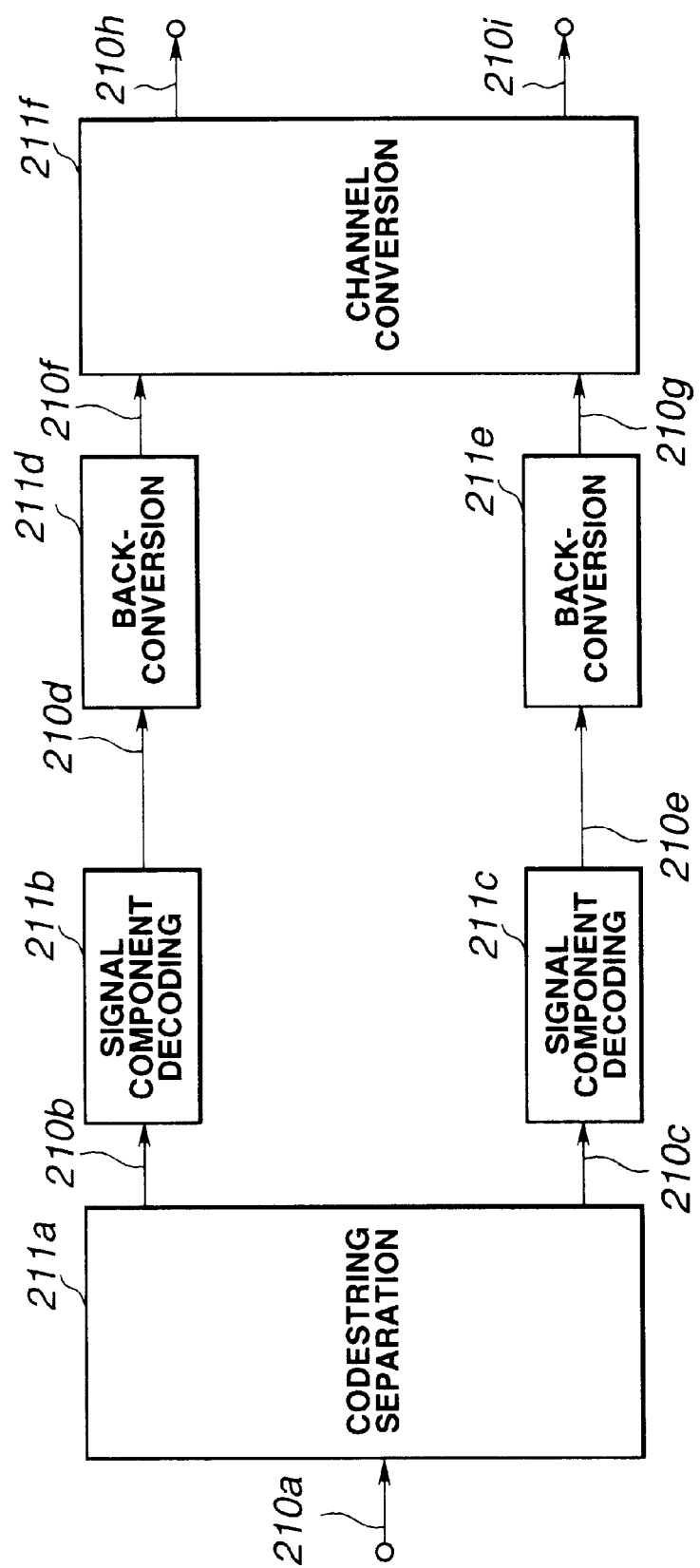
FIG. 17 is a block circuit diagram showing a schematic structure of a decoding circuit for decoding a codestring; obtained on encoding the channel (L+R)/2 and the channel (L−R)/2.

FIG. 17 shows an illustrative structure of a decoding circuit adapted for decoding a codestring 190k generated by the encoding device shown in FIG. 16.

In FIG. 17, a codestring separation circuit 211a separates a signal 210b of the (L+R) channel and a signal of the (L−R) channel 210c from the codestring 210a which is the above-mentioned codestring 190k.

The code 210b of the (L+R) channel and the signal 210c of the (L−R) channel are sent to signal component decoding circuits 211b and 211c, respectively. These signal component decoding circuits 211b and 211c decode the codes similarly to the signal component decoding circuit 114b of FIG. 5.

The signal component of the (L+R) channel and the signal component of the (L−R) channel, obtained by decoding by the signal component decoding circuits 211b and 211c, are sent to associated inverse transform circuits 211d, 211e, respectively. The inverse transform circuits 211d, 211e perform inverse transform similarly to the inverse transform circuit 114c shown in FIG. 5.

The signal 210f of the (L+R) channel, obtained by the inverse transform by the inverse transform circuit 211d, and the signal 210g of the (L−R) channel, obtained by the inverse transform by the inverse transform circuit 211e, are both sent to a channel conversion circuit 211f, which converts the (L+R) channel signals and the (L−R) channel signals into a L-channel signal 210h and a R-channel signal 210i, which are outputted.

In addition to the above-described method, there is also known a method for efficiently encoding the L and R channel signals by exploiting characteristics of the human hearing system. This method realizes efficient encoding by exploiting the fact that the phase difference of the L and R channel signals contributes to the psychoacoustic stereo effect mainly in case the signals are low-range signals. Specifically, the signals of both the L and R channels are encoded on the low frequency side and, on the high-range side, the signal waveform of the (L+R) channel is normalized and quantized using the normalization coefficients different for the L and R channels.

Figure 18:
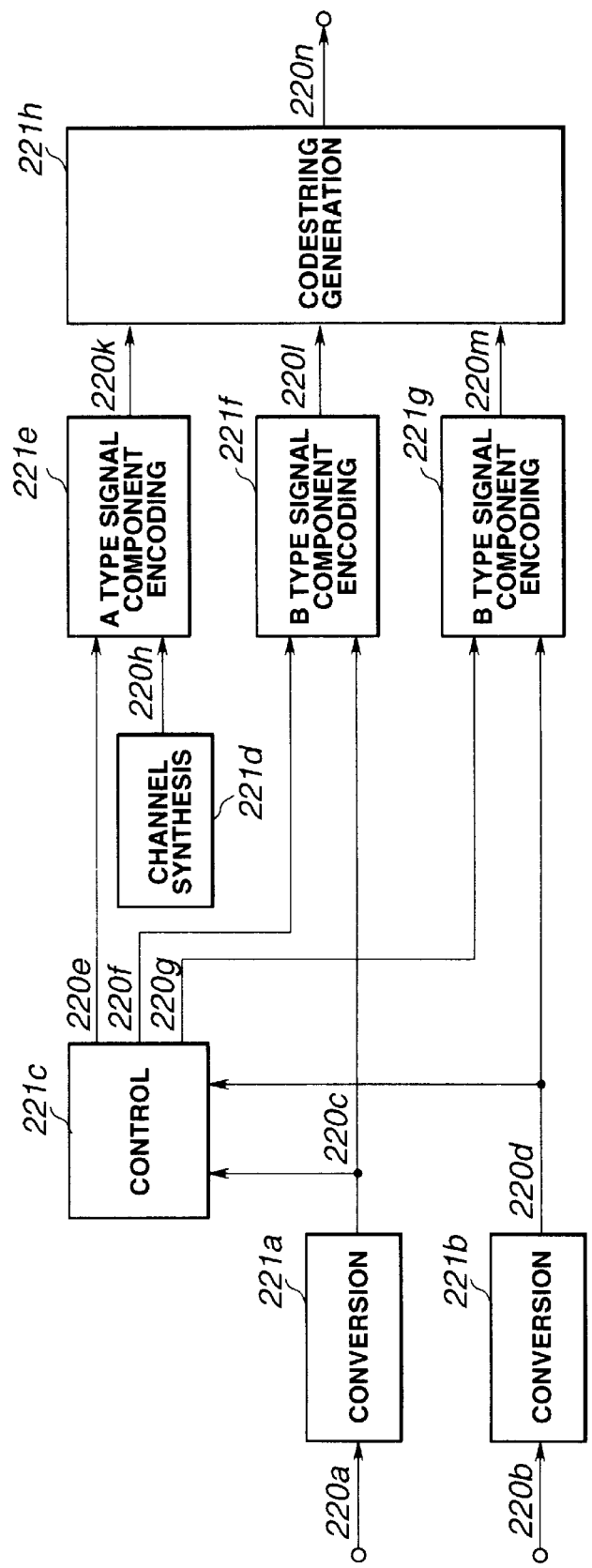
FIG. 18 is a block circuit diagram showing the schematic structure of an encoding circuit configured for encoding the L and R channels on the low-range side and for encoding the (L+R)/2 channel on the high-range side.

FIG. 18 shows an illustrative structure of an encoding device employing this method for encoding.

To the encoding device, shown in FIG. 18, a L-channel signal 220a and a R-channel signal 220b are entered and transformed by associated transform circuits 221a, 221b, respectively, for transform as by the transform circuits 221a, 221b, respectively. These transform circuits 221a, 221b output signal components of the respective channels 220c, 220d which are sent to the associated signal component encoding circuits 220f, 220g. The signal component encoding circuits 221f, 221g are hereinafter referred to as B-type signal component encoding circuits. These B-type signal component encoding circuits 221f, 221g encode low-range signal components of the L-channel signal components 220c and the R-channel signal components 220d, respectively.

The signal components of the respective channels 220c, 220d from the associated transform circuits 221a, 221b are also sent to a channel synthesis circuit 221d which sums the L-channel signal components 220c and the R-channel signal components 220d together to produce (L+R) channel signal components 220h. These (L+R) channel signal components 220h are sent to a signal components encoding circuit 221e.

The signal component encoding circuit 220e is hereinafter referred to as an A-type signal component encoding circuit.

This A-type signal component encoding circuit 220e normalizes and quantizes the high-range side signal components of the (L+R) channel signal components as described above using the normalization coefficients different for the L and R channels.

The control circuit 221c is substantially similar to the control circuit 119d of FIG. 16. The control circuit 211c of FIG. 18 determines the allocated number of bits for encoding 220e for the (L+R) channel from the channel synthesis circuit 211d, allocated number of bits for encoding 220f for the L channel signal components 220c and the allocated number of bits for encoding 220g for the R channel signal components 220d.

Therefore, the A-type signal component encoding circuit 221e and the B-type signal component encoding circuits 221f, 221g encode the (L+R) channel signal components 220h, L-channel signal components 220c and the R-channel signal components 220d based on the allocated numbers of bits 220e, 220f and 220g determined by the control circuit 221c.

The encoding by the A-type signal component encoding circuit 221e and the B-type signal component encoding circuits 221f, 221g results in formation of codes 220k, 220l and 220m which are sent to a codestring generating circuit 221h. The codestring generating circuit then generates a codestring 220n from the codes 220k, 220l and 220m to output the generated codestring 220n.

Figure 19:
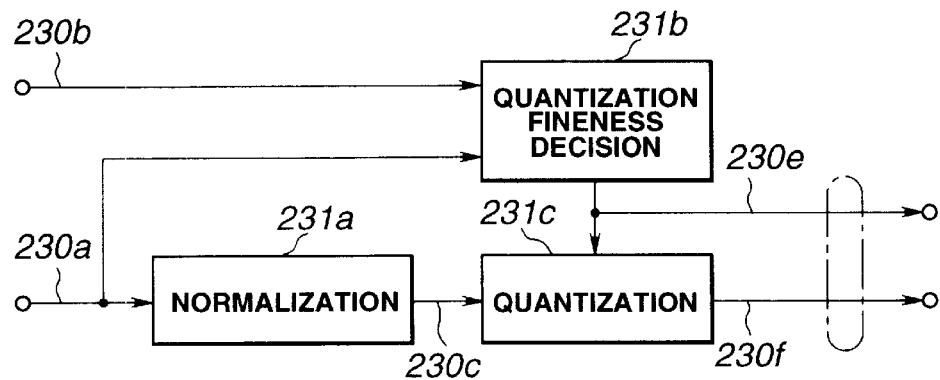
FIG. 19 is a block circuit diagram showing an illustrative structure of an A-type signal component encoding circuit of FIG. 18.

FIG. 19 shows an illustrative structure of the A-type signal component encoding circuit 221e in the configuration of FIG. 18. The signal component encoding circuit 221e of FIG. 19 basically is of the structure similar to the structure of the signal component encoding circuit shown in FIG. 4, with the difference being that the output signal of the signal component encoding circuit 221e is devoid of the normalization coefficient information.

In FIG. 19, the signal component 230a, which is the signal component 220h of the (L+R) channel from the channel synthesis circuit 221d, is normalized from one pre-set band to another by a normalization circuit 231a and sent to a quantization fineness decision circuit 231b. The quantization fineness decision circuit 231b calculates the quantization fineness information 230e based on the above-mentioned signal components 230a and the number of allocated bits 230b corresponding to the above-mentioned number of allocated bits 220e.

The normalized spectral coefficient data 230c from the normalization circuit 231a and the quantization fineness information 230e from the quantization fineness decision circuit 231b are sent to a quantization circuit 231c which then quantizes the normalized spectral coefficient data 230c based on the quantization fineness information 230e. The quantization by the quantization circuit 231c gives codes 230f which are outputted as codes 220k of FIG. 18 simultaneously with the quantization fineness information 230e.

Figure 20:
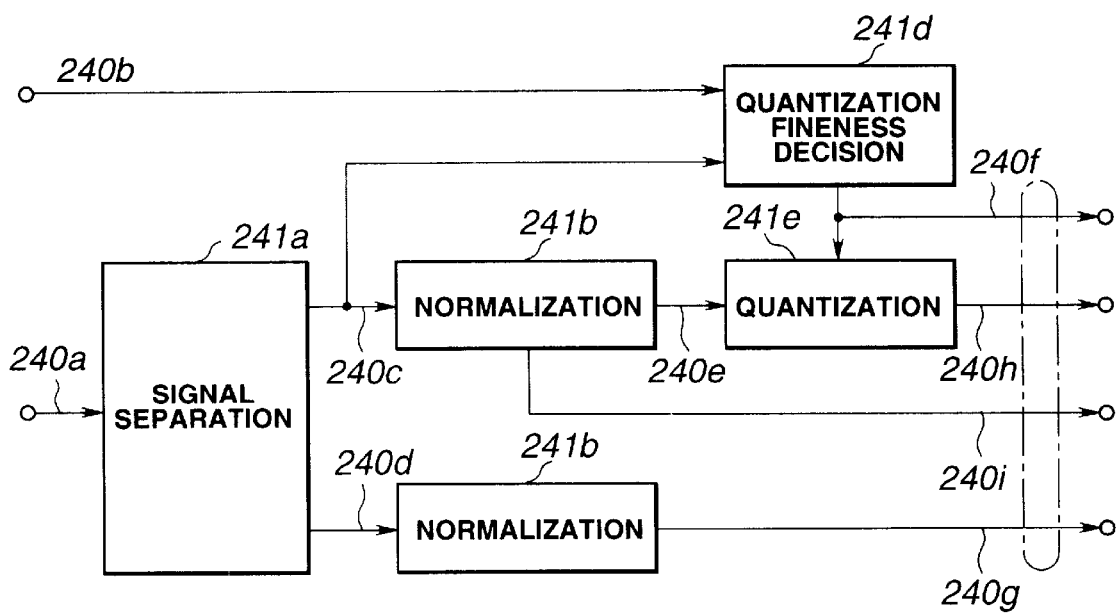
FIG. 20 is a block circuit diagram showing an illustrative structure of a B-type signal component encoding circuit of FIG. 18.

FIG. 20 shows an illustrative structure of the B-type signal component encoding circuits 221f, 221g.

In FIG. 20, the B-type signal component encoding circuits separate signal components 240a, which are the L-channel signal 220c from the transform circuit 221a of FIG. 18 or the R-channel signal components 220d from the transform circuit, into low-range signal components 240c and high-range signal components 240d, by a signal separation circuit 241a.

The low-range signal components 240c are encoded by the normalization circuit 241b, quantization circuit 241e and the quantization fineness decision circuit 241d. The quantization fineness decision circuit 241d determines the quantization fineness based on the number of allocated bits for encoding 240b from the control circuit 221c of FIG. 18.

On the other hand, the high-range side signal components 240d are normalized by the normalization circuit 241c so that only normalized spectral coefficient data are outputted.

The quantization fineness information 240f from the low-range side quantization fineness decision circuit 241 d, codes, 240h from the quantization circuit 241e, normalization coefficient information 240i from the normalization circuit 241b and the and the normalized spectral coefficient data 240g from the high-range side normalization circuit 241c are sent as codes 220l or 220m of FIG. 18 to a codestring generating circuit 221h of FIG. 18.

Figure 21:
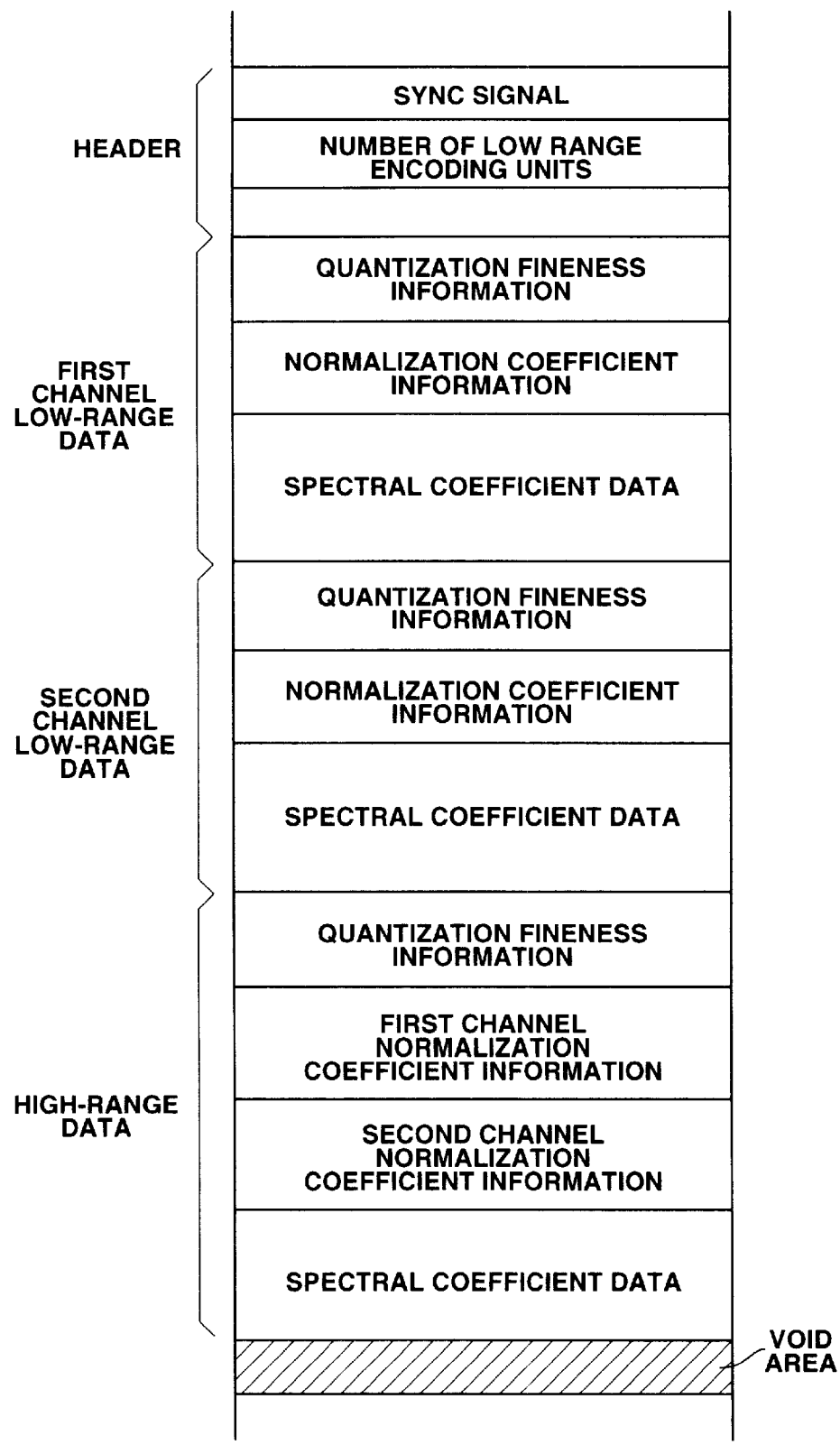
FIG. 21 illustrates the structure of a codestring obtained on encoding the L and R channels on the low frequency side and on encoding the (L+R)/2 channel on the high frequency side.

FIG. 21 shows an illustrative structure of a codestring generated by the codestring generating circuit 221h of FIG. 18.

In FIG. 21, the codestring is made up of a header composed of synchronization signals and the number of encoding units for the low frequency range, encoded data of the low-range side of the first channel (L-channel), encoded data of the low-range side of the second channel (R-channel) and encoded data of the high-range side. As for the low-range side, quantization fineness data, normalization coefficient data and spectral coefficient data are given as independent encoded data for the first channel (L-channel) and for the second channel (R-channel). However, as for the high-range side, data common to the two channels (first and second channels) are given except the normalization coefficient information for the first channel (L-channel) and the second channel (R-channel). Thus, in FIG. 21, the quantization fineness information and the spectral coefficient data are common data for the first and second channels.

Figure 22:
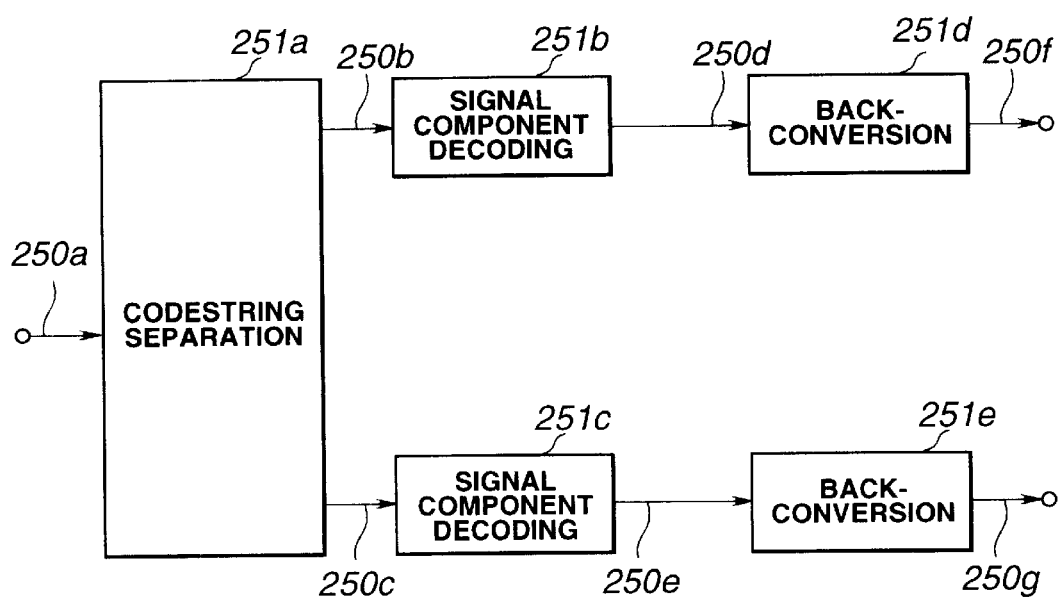
FIG. 22 is a block circuit diagram showing the schematic structure of an encoding circuit configured for encoding the L and R channels on the low frequency side and for encoding the (L+R)/2 channel on the high frequency side.

FIG. 22 shows an illustrative structure of a decoding device configured for decoding encoded data of the codestring shown in FIG. 21.

In FIG. 22, encoded data 250a of the codestring shown in FIG. 21 is separated by a codestring separation circuit 251a into L- and R-channels. However, high-range data, which are common data for the two channels, are sent to both the signal component decoding circuits 251b and 251c. The L-channel encoded data 250b are decoded by a signal component decoding circuit 251b, while the R-channel encoded data 250c are decoded by a signal component decoding circuit 251c.

The signal components 250d, 250e, decoded by these signal component decoding circuits 251b, 251c, are sent to associated inverse transform circuits 251d, 251e where the signal components are inverse-transformed for restoration of the L-channel time-domain signals 250f and the R-channel time-domain signals.

In the method for encoding the channel corresponding to the (L+R) channel and to the (L−R) channel for the entire range as explained with reference to FIG. 16, these two channels need to be encoded even if one of the channels is of a low signal level. This imposes a limit in improving the compression efficiency by encoding. With the method of encoding only the normalization coefficients for the high range side, as explained in FIG. 18, a corresponding number of bits are required for encoding the normalization coefficients of the entire range. Also, with the above-described method, transform processing and inverse transform processing need to be performed for the entire frequency range for both the L and R channels, thus requiring voluminous processing and buffer memory space.

Thus, in the present embodiment, both the L and R channel signals or signals capable of restoring the L and R signals are encoded for the low range side. On the other hand, as for the high-range signals, common signals are used for the L and R channels, or the common signals for the L and R channels modified only in signal level are adapted to be reproduced for realization of highly efficient encoding as well as for reducing the volume of the processing for the decoding and encoding. This will be explained with reference to the drawings.

Figure 23:
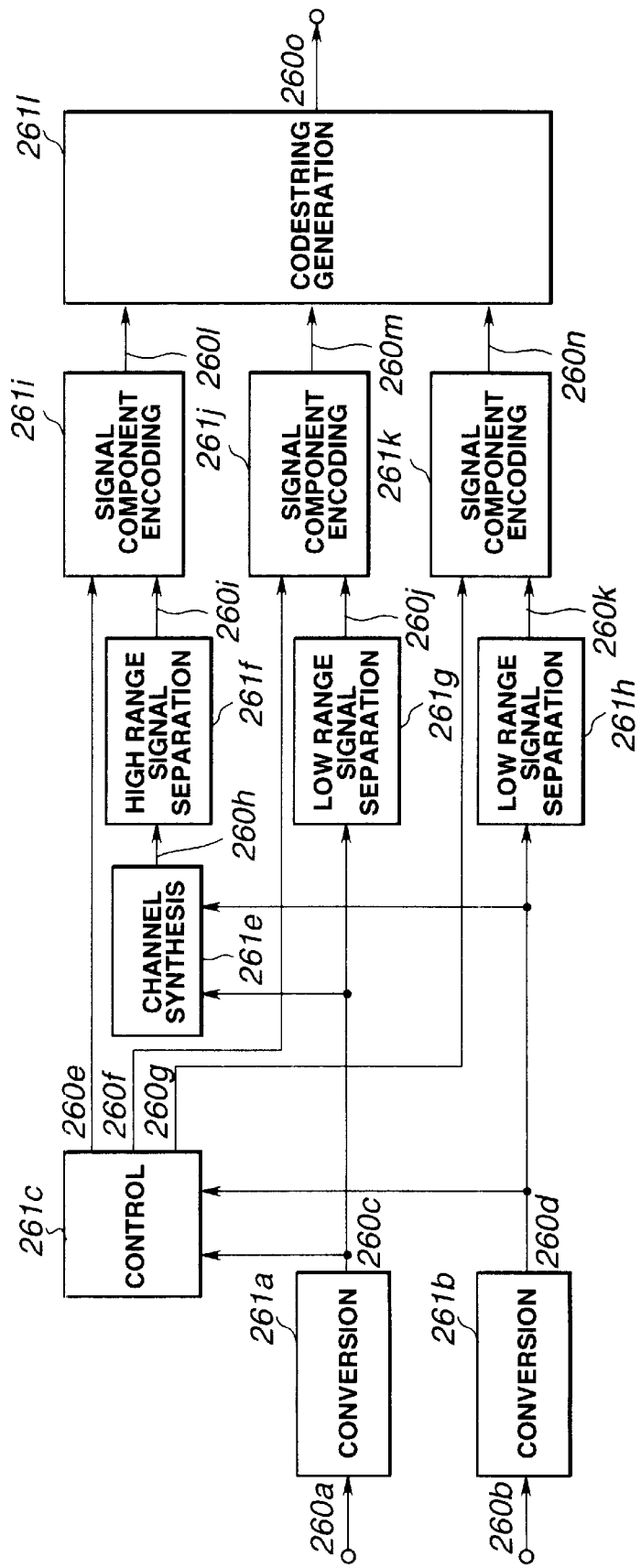
FIG. 23 is a block circuit diagram showing the schematic structure of an encoding circuit configured for encoding the L and R channels on the low frequency side and for encoding common signals for the L and R channels on the high frequency side.

FIG. 23 shows an illustrative structure of an encoding device adapted for performing the encoding by the method of the present embodiment described above.

In FIG. 23, the L-channel signal 260a and the R-channel signal 260b are supplied to transform circuits 261a, 261b, respectively. These transform circuits 261a, 261b are similar to those described previously and perform transform processing for the respective input signals. The L-channel signal components 260c, transformed by the transform circuit 261a, are sent to a low-range signal separation circuit 261g, while the R-channel signal components 260d, transformed by the transform circuit 261b, are sent to a low-range signal separation circuit 261h.

The low-range signal separation circuits 261g, 261h separate only the signal components of the low-range side of the supplied signal components to transmit the separated low-range signals as low-range signal components 260j, 260k to associated signal component encoding circuits 261j, 261k.

The signal component encoding circuit 261j, fed with the low-range side L-channel signal components 260j, and the signal component encoding circuit 261k, fed with the low-range side R-channel signal components 260k, encode low-range signal components of the L and R channels. The signal component encoding circuits 261j, 261k output codes 260m, 260n which are sent to a codestring generating circuit 261l.

Although the low-range signal components of the L and R channels are encoded, it is possible to encode signals capable of restoring low-range signal components of both the L and R channels.

The signal components of the respective channels 260c, 260d from the transform circuits 261a, 261b are both sent to a channel synthesis circuit 261e, which then sums the signal components 260c, 260d of the L and R channels to output the resulting (L+R) channel signal components 260h. The (L+R) channel signal components 260h are sent to a high-range signal separating circuit 261f.

The high-range signal separating circuit 261f separates only the high-range side signal components of the supplied (L+R) channel signal components 260h to produce high-range-signal components 260i which are sent to a signal component encoding circuit 261i.

The signal component encoding circuit 261i encodes the (L+R) channel high-range signal components 260i to produce high-range codes 260i which are sent to a codestring generating circuit 261l.

Although the (L+R) channel high-range signal components, which are signals common to L and R channels, are encoded in the present embodiment, it is also possible to encode signals common to the L and R channels and which are modified only as to the signal level.

The control circuit 261c determines the allocated number of bits for encoding 260e for the high-range signal components 260i for the (L+R) channel, allocated number of bits for encoding 260f for the low-range signal components 260j for the L-channel and allocated number of bits for encoding 260g for the low-range signal components 260k for the R-channel. The particular method for controlling the allocated number of bits for encoding by the control circuit 261c will be explained later on specifically.

Therefore, the signal component encoding circuits 261i, 261j and 261k encode the high-range signal components 260i for the (L+R) channel, low-range signal components 260j for the L-channel and the low-range signal components 260k for the R-channel, respectively, based on the allocated numbers of bits 260e, 260f and 260g as determined by the above-mentioned control circuit 261c.

The above-mentioned codestring generating circuit 261l generates a codestring 260o from the codes 260l, 260m and 260n supplied from the signal component encoding circuits 261i, 1261j and 261k, respectively.

Figure 24:
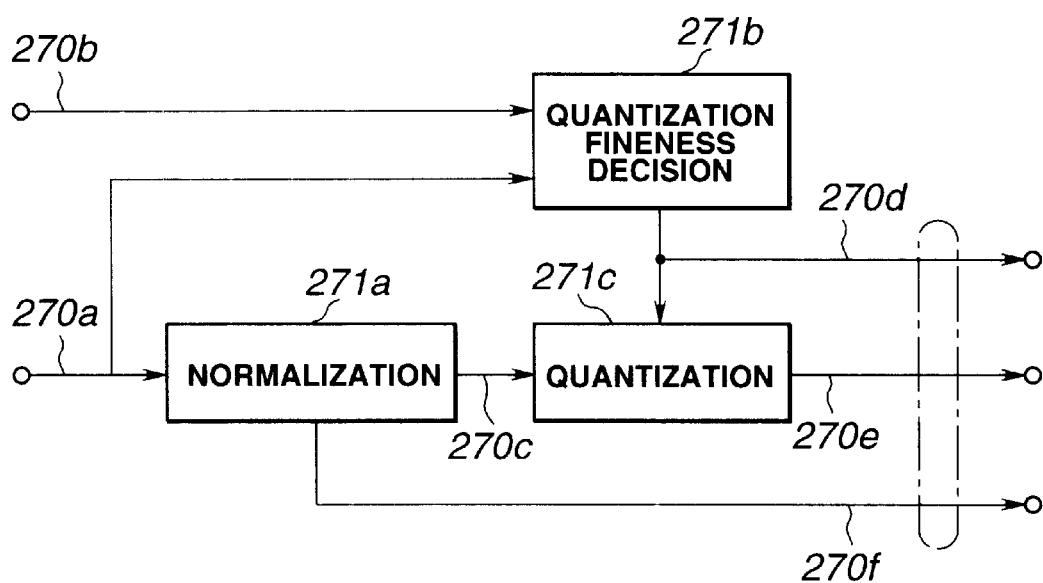
FIG. 24 is a block circuit diagram showing an illustrative structure of a signal component encoding circuit of the encoding circuit of FIG. 23.

FIG. 24 shows an illustrative structure of the signal components encoding circuits 261i, 261j and 261k of FIG. 23.

In FIG. 24, a signal component 270a, which is one of the high-range signal components 260i for the (L+R) channel, low-range signal components 260j for the L-channel and the low-range signal components 260k for the R-channel, is normalized from one pre-set band to another by a normalization circuit 271a, while being sent to a quantization fineness decision circuit 271b. This quantization fineness decision circuit 271b calculates the quantization fineness information 270d, based on the signal components 270a and the signal component 270b which corresponds to one of the allocated numbers of bits 260e, 260f and 260g for encoding.

The normalized spectral coefficient data 270c from the normalization circuit 271a and the quantization fineness information 270d from the quantization fineness decision circuit 271b are sent to a quantization circuit 271c. The quantization circuit 271c quantizes the normalized spectral coefficient data 270c based on the quantization fineness information 270d. The quantized codes 270e from the quantization circuit 271c are outputted as one of the codes 260l, 260m and 260n simultaneously with the above-mentioned quantization fineness information 270d and normalization coefficient information 270f.

Figure 25:
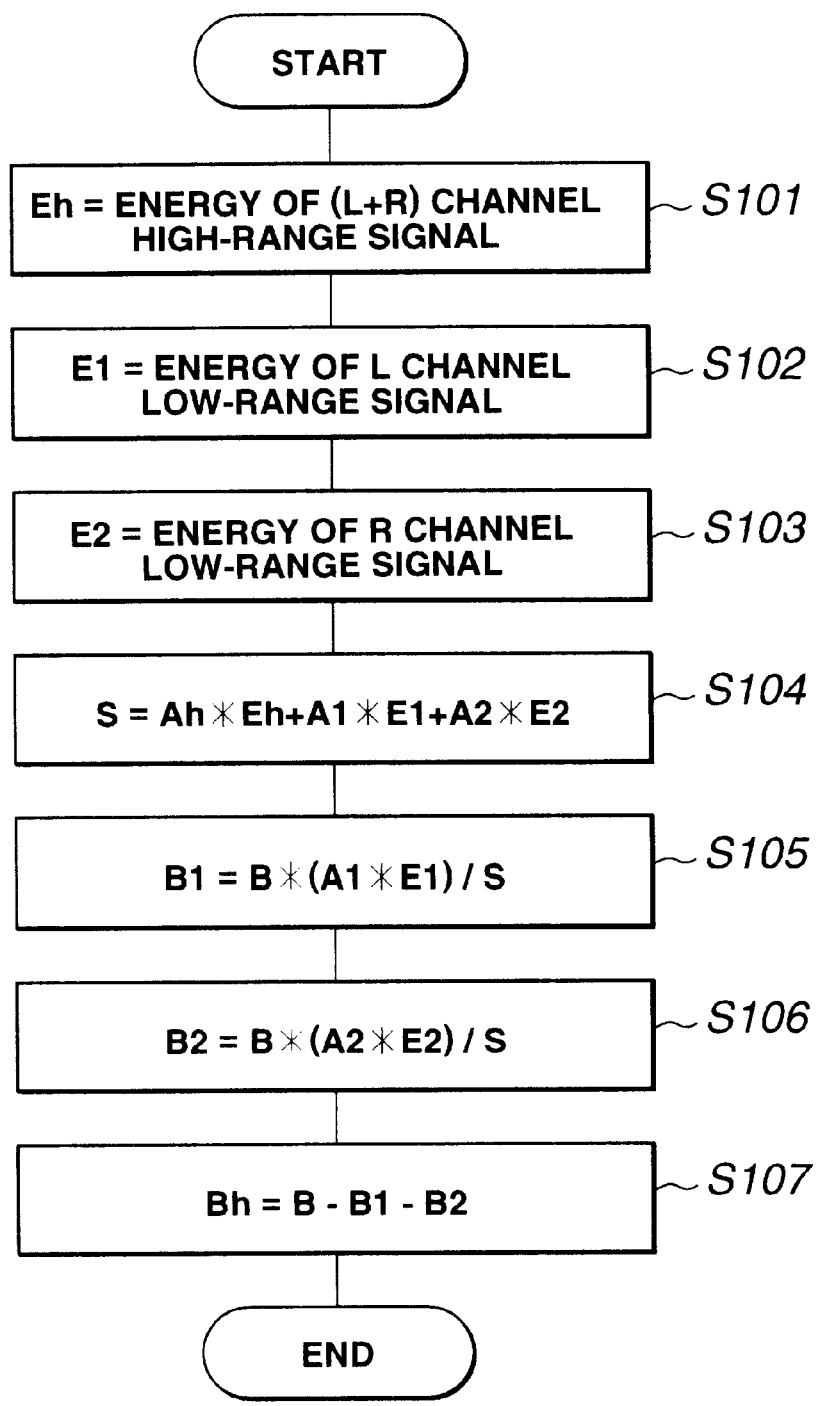
FIG. 25 is a flow chart for illustrating a processing example of the control circuit of the encoding circuit of FIG. 23.

FIG. 25 shows a processing example of finding data on the number of usable bits allocated by the control circuit 261c of FIG. 23 to the signal component encoding circuits 261i, 261j and 261k in each frame. This number of usable bits is that specified by the above-mentioned numbers of allocated bits 260e, 260f and 260g. In FIG. 25, the data on the number of frame-based usable bits for the high-range signal components 260i of the (L+R) channel is specified as Bh, whereas the data on the number of frame-based usable bits for the low-range signal components 260j of the L channel is specified as B1 and the data on the number of frame-based usable bits for the low-range signal components 260k of the R channel is specified as B2. That is, the number of bits specified by the data on the number of bits Bh corresponds to the frame-based number of bits of the code 260l outputted by the signal component encoding circuit 261i of FIG. 23, whereas the number of bits specified by the data on the number of bits B1 corresponds to the frame-based number of bits of the code 260m outputted by the signal component encoding circuit 261j of FIG. 23 and the number of bits specified by the data on the number of bits B2 corresponds to the frame-based number of bits of the code 260n outputted by the signal component encoding circuit 261k of FIG. 23.

Referring to FIG. 25, the high-range side signal energy Eh of the (L+R) channel is found at step S101. The signal energy E1 of the low-range side signal of the L-channel is found at step S102, and the energy E2 of the low-range side signal of the R-channel is found at step S103.

At step S104, signal energies Eh, E1 and E2, thus found, are processed with weighted addition using a weighting coefficient Ah for the (L+R) channel, a weighting coefficient A1 for the L-channel and a weighting coefficient A2 for the R-channel, in order to find the results of processing S.

At steps S105 and S106, the total number of bits B that can be allocated to other than the header portion for the L and R channels is distributed as the above-mentioned data for the numbers of bits B1 and B2 so as to be proportionate to the weighting energy of the respective encoding portions of the signal component encoding circuits 261j, 261k. At step S107, the remaining portions of the total number of bits is allocated to the encoding portion by the signal component encoding circuit 261i as the above-mentioned data on the number of bits Bh.

Figure 26:
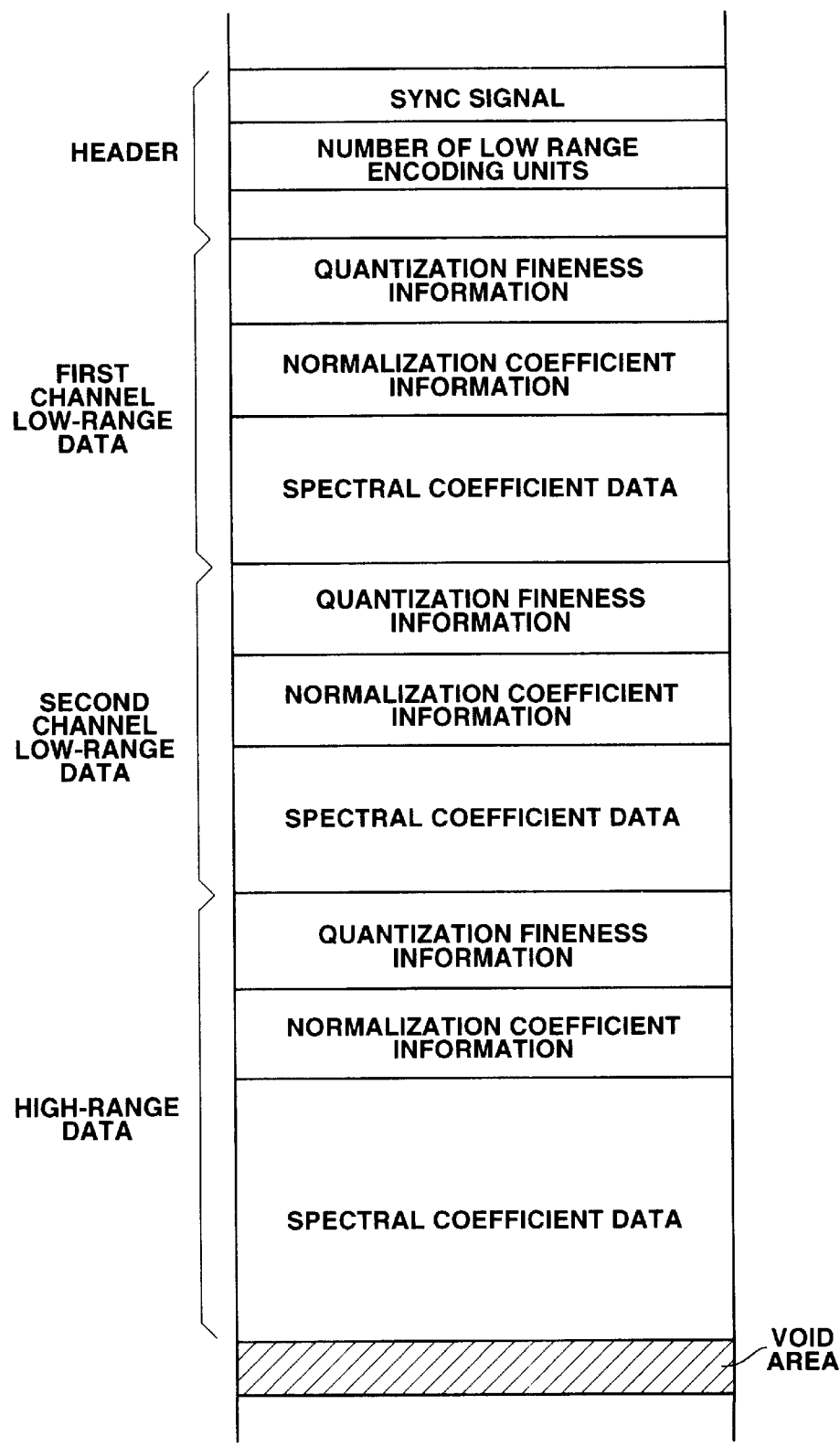
FIG. 26 illustrates the structure of a codestring obtained on encoding the L and R channels on the low frequency side and on encoding common signals for the L and R channels on the high frequency side.

FIG. 26 shows an illustrative structure of a codestring outputted by the encoding device of FIG. 23.

In FIG. 26, the codestring is made up of a header, composed of synchronization signals and the number of low-range encoding units, low-range side encoded data of the first channel (L-channel) (quantization fineness information, normalization coefficient information and spectral coefficients data), low-range side encoded data of the second channel (R-channel) (quantization fineness information, normalization coefficient information and spectral coefficients data) and low-range side encoded data of the (L+R) channel (quantization fineness information, normalization coefficient information and spectral coefficients data). In FIG. 26, since one channel of the high-range side normalization coefficient information suffices in contradistinction from the codestring of FIG. 21, encoding can be done with a smaller number of bits. If the high-range side signals are used in common, the spread-out feeling of the sound is slightly deteriorated. However, the user can still enjoy stereo sound reproduction because it is the low-range side signals, rather than the high-range side signals, that are more instrumental in increasing the stereophonic sound feeling.

Figure 27:
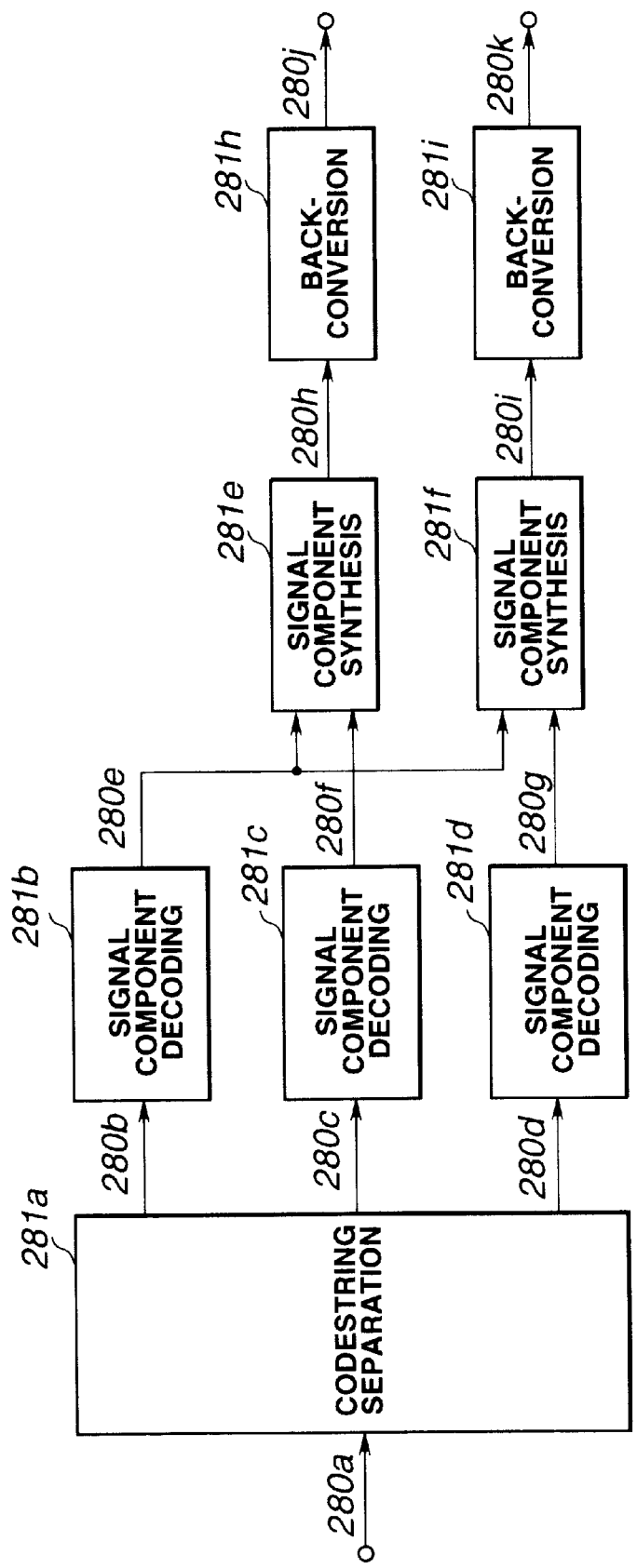
FIG. 27 is a block circuit diagram showing the structure of a decoding circuit configured for decoding a codestring obtained on encoding the L and R channels on the low frequency side and on encoding common signals for the L and R channels on the high frequency side.

FIG. 27 shows an illustrative structure of a decoding device for decoding the codestring shown in FIG. 26.

In FIG. 27, encoded data 280a of the codestring shown in FIG. 26 is separated by a codestring separating circuit 281a into the high-range side (L+R) channel and the low-range side R-channel. Encoded data 280b of the high-range side (L+R) channel are decoded by a signal component decoding circuit 281b, while encoded data 280c of the low-range side L-channel are decoded by a signal component decoding circuit 281c and encoded data 280d of the low-range side R-channel are decoded by a signal component decoding circuit 281d.

The signal components 280e, 280f of the high-range side (L+R) channel and the low-range side L-channel, decoded by the signal components decoding circuits 281b and 281c, respectively, are sent to a signal component synthesis circuit 281e. The signal components 280e, 280f of the high-range side (L+R) channel and the low-range side R-channel, decoded by the signal component decoding circuits 281b and 281d, respectively, are sent to a signal component synthesis circuit 281f.

The signal component synthesis circuit 281e synthesizes the signal components 280e of the high-range side (L+R) channel and the signal components 280f of the low-range side L-channel to synthesize low-range and high-range sides to send the L-channel signal components 280h of the entire range resulting from the synthesis to an inverse transform circuit 281h.

The signal component synthesis circuit 281f synthesizes the signal components 280e of the high-range side (L+R) channel and the signal components 280g of the low-range side R-channel to synthesize low-range and high-range sides to send the L-channel signal components 280i of the entire range resulting from the synthesis to an inverse transform circuit is 281i.

These inverse transform circuits 281h, 281i inverse-transform signal components of the L and R channels of the entire range to restore time-domain signals 280j of the L-channel and time-domain signals 280k of the R-channel.

As will be apparent from the foregoing description, stereo signals can be encoded with a smaller number of bits by the method embodying the present invention.

Also, the processing volume and the buffer memory volume can be decreased effectively by exploiting the method according to a modified embodiment of the present invention. This modification for decreasing the processing volume and the buffer memory volume is hereinafter explained.

Figure 28:
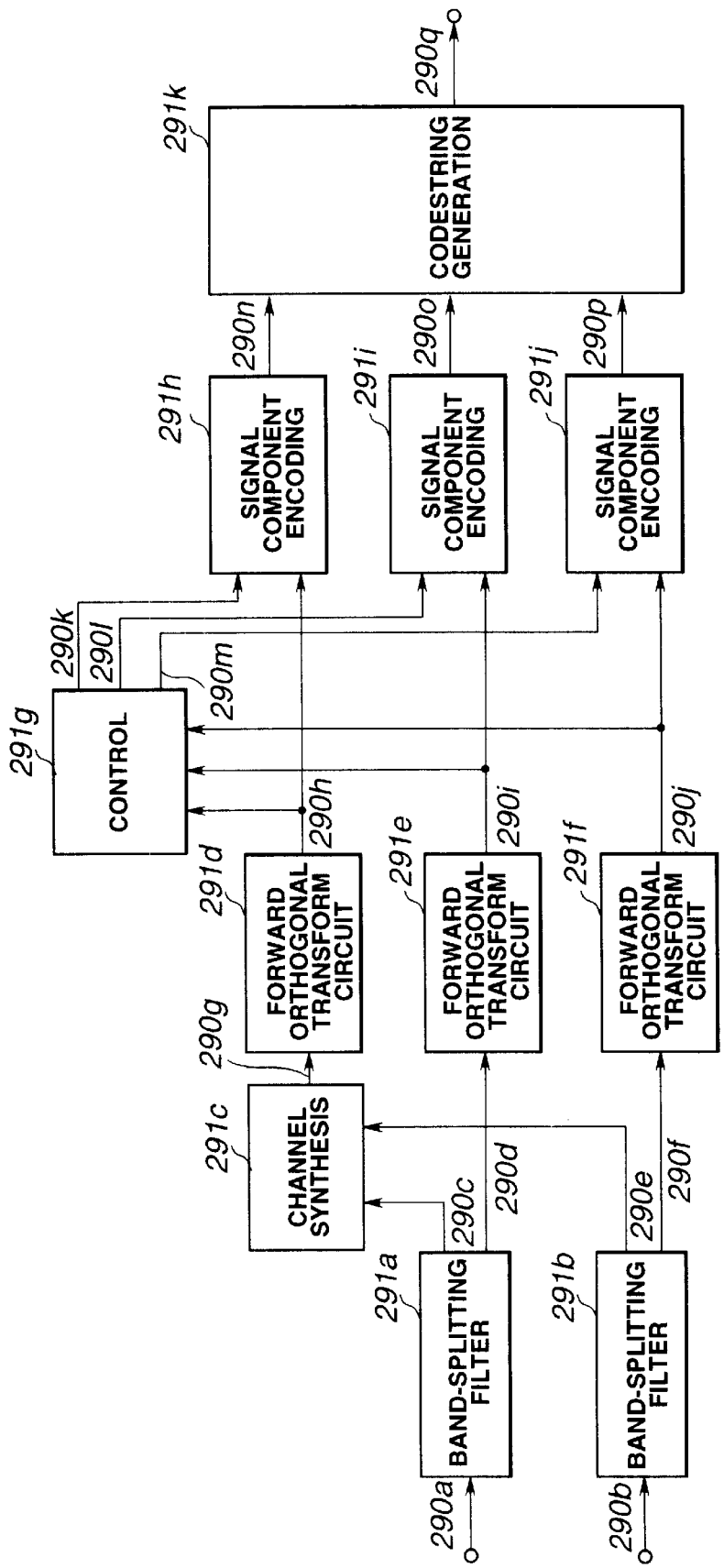
FIG. 28 is a block circuit diagram showing the schematic structure of an encoding circuit according to an embodiment configured for encoding the L and R channels on the low frequency side and for encoding common signals for the L and R channels on the high frequency side.

FIG. 28 shows an illustrative structure of an encoding device of the modification in which processing is by a band-splitting filter and a forward orthogonal transform circuit used in combination.

In FIG. 28, a L-channel signal 290a and a R-channel signal 290b are sent to band-splitting filters 291a, 291b, respectively. The band-splitting filter 291a splits the L-channel signal 290a into low-range and high-range signals, while the band-splitting filter 291b splits the R-channel signal 290b into low-range and high-range signals.

The low-range signal of the L-channel 290d, split by the band-splitting filter 291a, is sent to a forward orthogonal transform circuit 291e, while the low-range signal of the R-channel 290f, split by the band-splitting filter 291b, is sent to a forward orthogonal transform circuit 290j.

The L and R channel high-range signals 290c, 290e, obtained on splitting by the band-splitting filters 291a, 291b, are sent to a channel synthesis circuit 291c so as to be synthesized to a high-range signal of the (L+R) channel which is sent to a forward orthogonal transform circuit 291d.

These forward orthogonal transform circuit 291d, 291e, 291f process the input signals with forward orthogonal transform to produce signal components 290h, 290i, 290j which are sent to associated signal component encoding circuits 291h, 291i, 291j.

The signal components 290h, 290i, 290j from the forward orthogonal transform circuits 291d, 291e, 291f are also sent to a control circuit 291g. The control circuit 291g determines the allocated number of bits for encoding 290k for the high-range signal components 290h of the (L+R) channel, allocated number of bits for encoding 290l for the low-range signal components 290i of the L channel and the allocated number of bits for encoding 290m for the low-range signal components 290j of the R channel, as in the case of FIG. 23, based on the signal components 290h, 290i and 290j from the forward orthogonal transform circuits 291d, 291e and 290f.

Thus, the above-mentioned signal component encoding circuits 291h, 291i, 291j encode the associated high-range signal components 290h of the (L+R) channel 290h, low-range signal components 290i of the L-channel and the low-range signal components 290j of the R-channel, based on the allocated numbers of bits 290k, 290l and 290m as set by the control circuit 291g.

The codestring generating circuit 291k generates a codestring 290q, similar to that shown in FIG. 26, from the codes 290n, 290o and 290p from the signal component encoding circuits 291h, 291i, 291j, and outputs the generated codestring 290j.

Noteworthy with the structure of FIG. 28 is that, since the forward orthogonal transform on the high range side is performed in common on both channels ((L+R) channel), processing such as encoding needs to be performed only once, thus saving the processing volume and the buffer memory space. Specifically, with the above-described method of outputting the codestring shown in FIG. 21, the normalization coefficient data need to be found independently for the L and R channels, even although the combination of the band-splitting filter and the forward orthogonal transform circuits is used as the transform circuit, so that processing needs to be performed on two channels inclusive of transform on the high-range side. With the method applied to the structure of FIG. 28, only one forward orthogonal transform processing operation for high-range side signals suffices for two channels.

Figure 29:
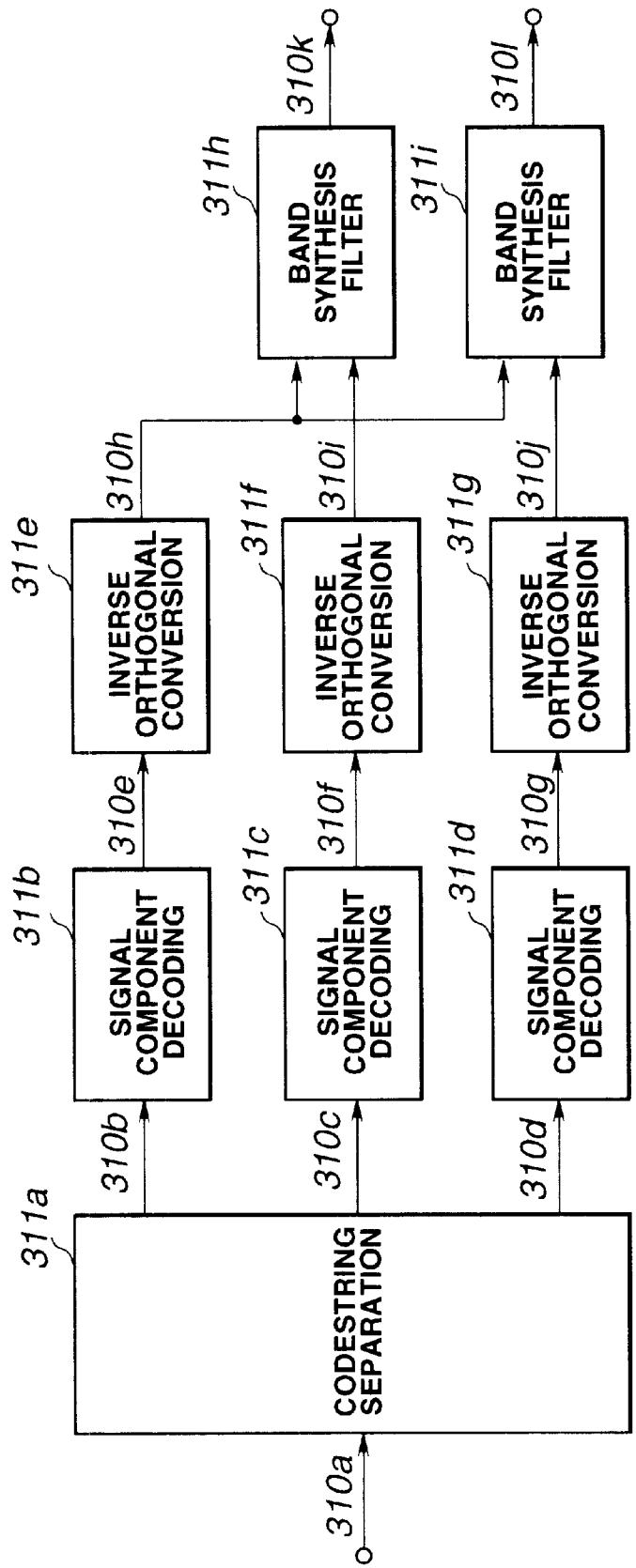
FIG. 29 is a block circuit diagram showing the structure of a decoding circuit according to a modified embodiment configured for decoding a codestring obtained on encoding the L and R channels on the low frequency side and on encoding common signals for the L and R channels on the high frequency side.

FIG. 29 shows an illustrative structure of a decoding device adapted for decoding a codestring generated by the encoding device shown in FIG. 28.

In FIG. 29, encoded data 310a of a codestring similar to one shown in FIG. 26 is split by a codestring dividing circuit 311a into a high-range side (L+R) channel and low-range side L and R channels. Encoded data of the high-range side (L+R) channel 310b is decoded by a signal component decoding circuit 311b, while encoded data of the low-range side L-channel 310c is decoded by a signal component decoding circuit 311c and encoded data of the low-range side R-channel 310d is decoded by a signal component decoding circuit 311d.

The signal components 310e, 310f, 310g of the high-range side (L+R) channel, low-range side L-channel and the low-range side R-channel, decoded by the signal component decoding circuits 311b, 311c and 311d, are sent to associated inverse orthogonal transform circuits 311e, 311f and 311g foir inverse orthogonal transform.

The signal of the high-range side (L+R) channel 310h from the inverse orthogonal transform circuit 311e and the signal of the low-range side R-channel 310i from the inverse orthogonal transform circuit 311f are sent to a band-synthesis filter 311h, which then synthesizes the high-range side (L+R) channel 310h and the low-range side R-channel 310i for synthesizing the low and high ranges to output the resulting full-range L-channel time-domain signals 310k.

The signal of the high-range side (L+R) channel 310h from the inverse orthogonal transform circuit 311e and the signal of the low-range side R-channel 310j from the inverse orthogonal transform circuit 311g are sent to a band-synthesis filter 311i, which then synthesizes the high-range side (L+R) channel 310h and the low-range side R-channel 310j for synthesizing the low and high ranges to output the resulting full-range R-channel time-domain signals 310l.

It is seen that, with the decoding device shown in FIG. 29, it suffices to perform the high-range side inverse orthogonal transform only once as the common (L+R) channel. With the method for decoding the codestring shown in FIG. 22, it is necessary to carry out the inverse orthogonal transform processing independently for the L and R channels for the entire frequency range, even if the combination of the inverse orthogonal transform and the band-synthesis filter is used as described above as the inverse transform circuit, because the normalization coefficients differ from channel to channel. With the above-described decoding method according to the present embodiment, it is possible to save the processing volume and the buffer memory space.

The codestring shown in FIG. 26 can be reproduced so that the high-range side L and R channels will be of a different signal level for improving the stereo sound feeling.

Figure 30:
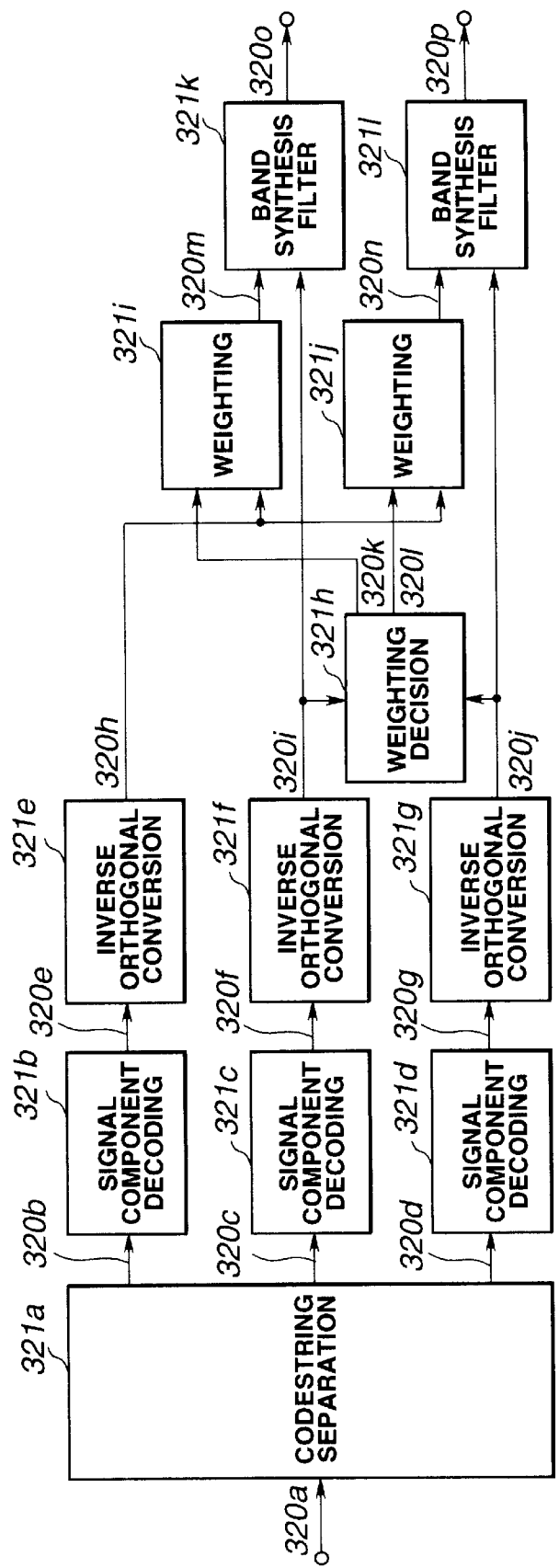
FIG. 30 is a block circuit diagram showing a schematic structure of a decoding circuit according to a modified embodiment configured for decoding a codestring obtained on encoding such that the L and R channels on the high-range side differ from each other in signal level.

FIG. 30 shows the structure of such decoding device.

In FIG. 30, encoded data 320a of a codestring similar to that shown in FIG. 26 is split by the codestring dividing circuit 321a into a high-range side (L+R) channel and into a low-range side R-channel. The encoded data 320b of the high,range side (L+R) channel is decoded by a signal component decoding circuit 321b, while the encoded data 320c of the low-range side L channel is decoded by a signal component decoding circuit 321c and the encoded data 320d of the low-range side R channel is decoded by a signal component decoding circuit 321d.

The signal components 320e, 320f and 320g of the high-range side (L+R) channel, low-range side L channel and the low-range side R channel are sent to associated inverse orthogonal transform circuits 321e, 321f and 321g for inverse orthogonal transform.

The L-channel low-range signal 320i from the inverse orthogonal transform circuit 321f and the low-range side R channel signals 320j from the inverse orthogonal transform circuit 321g are sent to associated band-synthesis filters 321k and 321l and simultaneously to a weighting decision circuit 321h. This weighting decision circuit 321h sets weighting coefficients for the L and R channels to send the weighting coefficients for the L and R channels thus set to associated weighting circuits 321i, 321j.

These weighting circuits 321i, 321j are fed with high-range signals 320h of the (L+R) channel from the inverse orthogonal transform circuit 321e. These weighting circuits 321i, 321j perform weighting independently for the L and R channels on the (L+R) channel high-range signal 320h. The (L+R) channel high-range signals 320m, weighted for the L-channel by the weighting circuit 321i, is sent to the band-synthesis filter 321k, while the (L+R) channel high-range signals 320n, weighted for the R-channel by the weighting circuit 321j, is sent to the band-synthesis filter 321l.

That is, in the decoding device of FIG. 30, the weighting decision circuit 321h determines the weighting coefficients 320k, 320l from the low-range side signal levels of the L and R channels, while the weighting circuits 321i, 321j correct the sample values of the respective signals so as to be proportional to the weighting coefficients 320k, 320l.

The band-synthesis filter 321k synthesizes the high-range signals for the (L+R) channel 320m, weighted for the L-channel, and the above-mentioned low-range signals 320i of the L-channel, by way of synthesis of the low and high ranges, to output the resulting L-channel time-domain signal 320o of the entire range.

The band-synthesis filter 321l synthesizes the high-range signals for the (L+R) channel 320n, weighted for the R-channel, and the above-mentioned low-range signals of the R-channel, by way of synthesis of the low and high ranges, to output the resulting R-channel time-domain signal 320p of the entire range.

Figure 31:
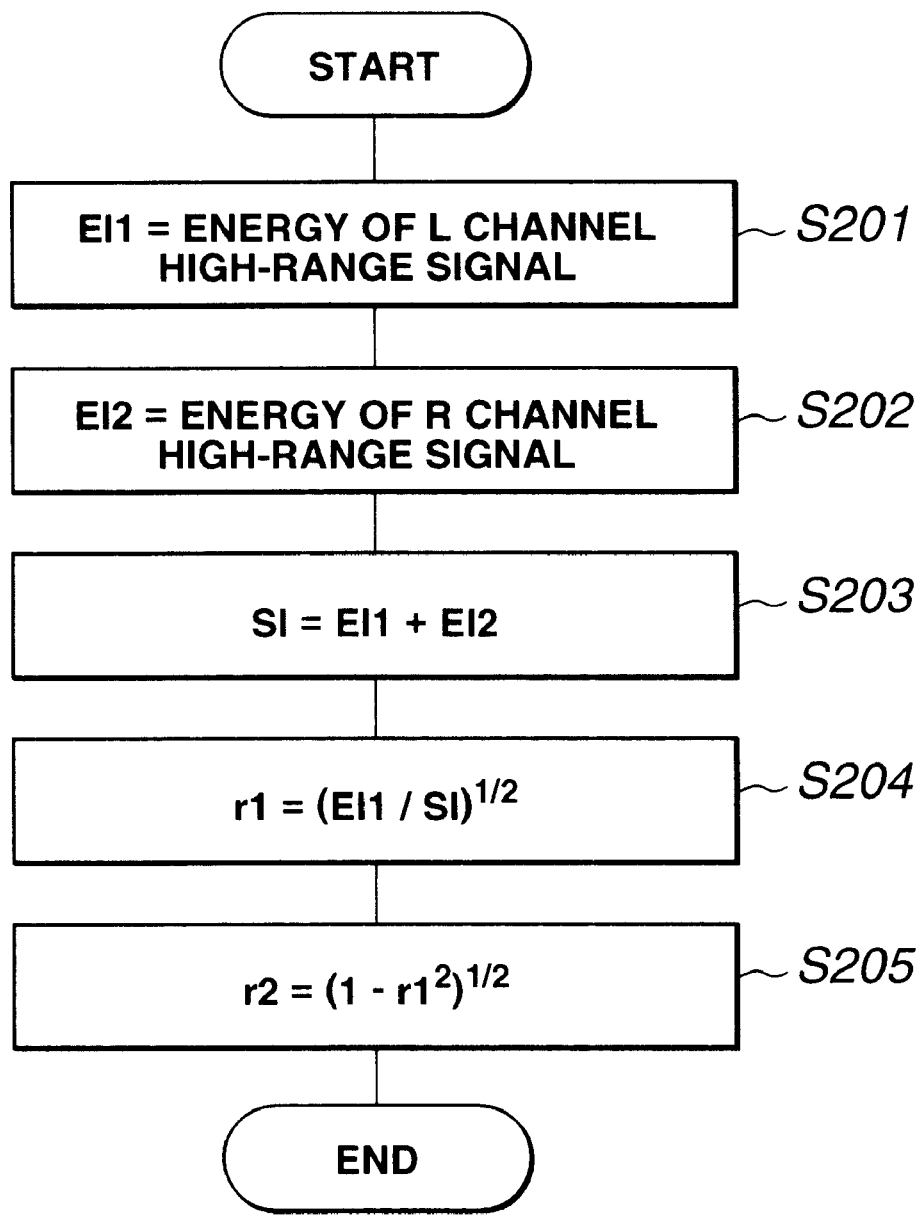
FIG. 31 is a flowchart showing the processing flow of the method in which a weighting decision circuit of the decoding circuit of FIG. 30 determines the weighting parameters.

FIG. 31 shows a processing example in which the weighting decision circuit 321h of the decoding device of FIG. 30 determines the weighting coefficient 320k for the first channel (L-channel) (indicated as a weighting parameter r1 in FIG. 31) and the weighting coefficient 320l for the second channel (R-channel) (indicated as a weighting parameter r2 in FIG. 31).

In this processing, the high-range side signal energy is also distributed to the L and R channels so as to be proportionate to the signal energy on the low-range side. To this end, at step S201, the high-range side signal energy EI1 of the L-channel is found, using the L-channel low-range signals 320i, so that the signal energy EI1 will be proportionate to the energy of the L-channel low-range signals 320i. Similarly, at step S202, the high-range side signal energy EI2 of the R-channel is found, using the R-channel tL low-range signals 320j, so that the signal energy EI2 will be proportionate to the energy of the R-channel low-range signals 320j.

Then, at step S203, the sum SI of the high-range side signal energy EI1 for the L-channel and the high-range side signal energy EI2 for the R-channel is found. At step S204, a square root of the quotient of the signal energy EI1 by the sum SI is adopted as weighting parameter r1 for the first channel (L-channel). Similarly, a square root of the quotient of the signal energy EI2 by the sum SI is adopted as weighting parameter r2 for the second channel (R-channel). As will be readily understood from the relation between the weighting parameters r1 and r2, the weighting parameter r2 can be found from the equation of step S205.

In the above example, the high-range side signals are used in common for the L and R channels. However, level-controlling data for the L and R channels, such as weighting parameters, may also be included in the codestring. This gives rise to more faithful stereo sound feeling. The low-range signal may also be encoded after transform into (L+R) channel and (L−R) channel instead of being encoded as L and R channels. By so doing, the (L−R) channel signal is lowered in level to realize more efficient encoding especially if these is a strong correlation between the L and R channels.

Figure 32:
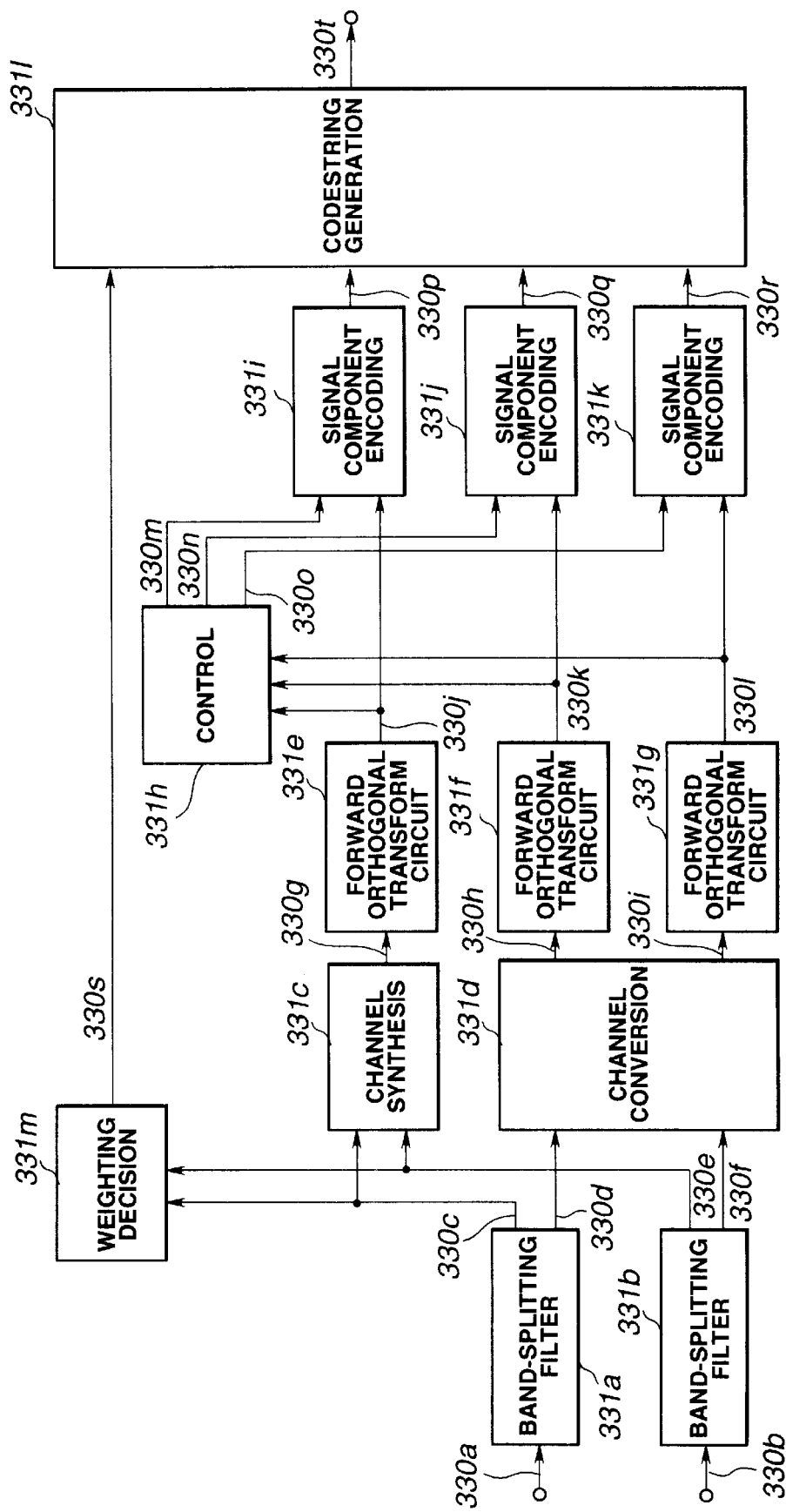
FIG. 32 is a block circuit diagram showing the schematic structure of an encoding circuit of an embodiment in which the channels (L+R)/2 and (L−R)/2 are encoded on the low-range side and the common signals of the L and R channels and the weighting parameters are encoded on the high-range side.

FIG. 32 shows an illustrative structure of a modification of the encoding device comprised of the above-mentioned two methods.

In FIG. 32, a L-channel signal 330a and a R-channel signal 330b are fed to band-splitting filters 331a and 331b, respectively. The band-splitting filter 331a splits the L-channel signal 330a into low-range and high-range signals, whereas the band-splitting filter 331b splits the R-channel signal 330b into low-range and high-range signals.

The L-channel low-range signals 330d, split by the band-splitting filter 331a, and the R-channel low-range signals 330f, split by the band-splitting filter 331b, are both sent to the channel conversion circuit 331d.

The channel conversion circuit 331d converts the L-channel low-range signals 330d and the R-channel low-range signals 330f into a (L+R) channel low-range signal 330h and a (L−R) channel low-range signal 330i.

The (L+R) channel low-range signal 330h is sent to a forward orthogonal transform circuit 331f, while the (L−R) channel low-range signal 330i is sent to a forward orthogonal transform circuit 331g.

The high-range signals 330c, 330e of the L and R channels, split by the band-splitting filters 331a, 331b, are both sent to the channel synthesis circuit 331c so as to be synthesized to the (L+R) channel high-range signals 330g by the channel synthesis circuit 331c before being sent to a forward orthogonal transform circuit 331e.

The above-mentioned forward orthogonal transform circuits 331e, 331f and 331g process the input signals with forward orthogonal transform to produce signal components 330j, 330k, 330l which are sent to associated signal component encoding circuits 331i, 331j, 331k, respectively.

The signal components 330j, 330k, 330l from the forward orthogonal transform circuits 331e, 331f, 331g are also sent to a control circuit 331h. The control circuit 331h determines the allocated number of bits for encoding 330m for the high-range signal components 330j for the (L+R) channel, allocated number of bits for encoding 330n for the low-range signal components 330k for the (L+R) channel and the allocated number of bits for encoding 330o for the low-range signal components 330l for the (L−R) channel.

Thus, the above-mentioned signal component encoding circuits 331i, 331j and 331k encode the high-range side signal components 330j of the (L+R) channel, low-range signal components 330k of the (L+R) channel and the low-range signal components 330l of the (L−R) channel, based on the numbers of allocated bits 330m, 330n and 330o determined by the control circuit 331h.

The high-range signals 330c and 330e of the L and R channels, split by the band-splitting filters 331a, 331b, are also sent to the weighting circuit 331m which then sets weighting coefficients (weighting parameters) 330s for the L- and R-channels by a method which will be explained subsequently.

Using the codes 330p, 330q and 330r from the signal component encoding circuits 331i, 331j and 331k and the weighting coefficient 330s from the weighting decision circuit 331m, the codestring generating circuit 331l generates and outputs a codestring 330t.

The encoding method for the (L+R) channel may differ from that for the (L−R) channel. For example, the encoding method for the (L+R) channel may use a fixed code length to make possible encoding and decoding with a smaller processing volume, or the encoding method for the (L−R) channel may use a variable length coding to reduce the processing volume for the encoding and decoding at the cost of the increased processing volume for encoding and decoding. This enables a codestring to be constructed so that reproduction by a simplified hardware structure is possible if monaural reproduction suffices, and so that stereo reproduction is also possible. As an encoding method with a higher encoding efficiency, not only the variable-length coding, but also an encoding method for separately encoding tonal components having concentrated signal energy, may be used. It is also possible to use orthogonal transform having different transform bock lengths for the (L+R) and (L−R) channels.

Figure 33:
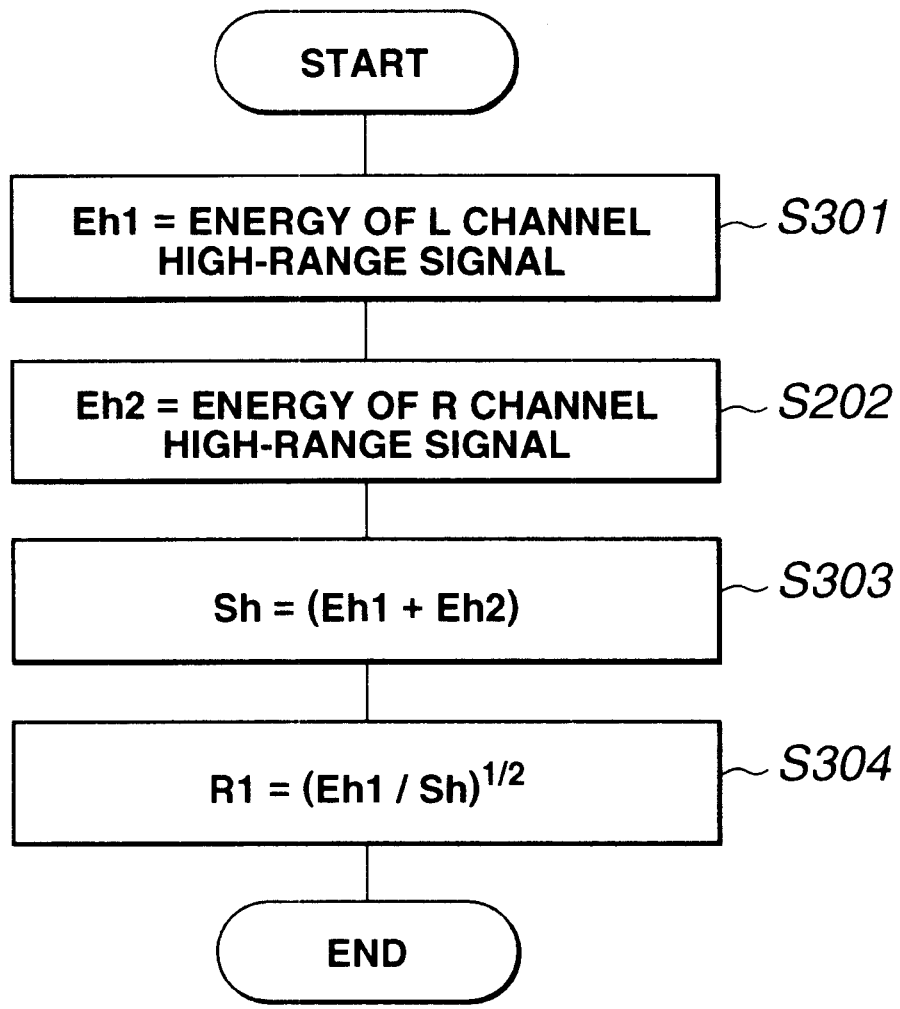
FIG. 33 is a flowchart showing the processing flow of the method in which a weighting decision circuit of the encoding circuit of FIG. 32 determines the weighting parameters.

FIG. 33 shows a processing example of a method in which the weighting decision circuit 331m determines the weighting coefficients 330s 9 parameter R1 in FIG. 33).

In FIG. 33, a signal energy Eh1 of the L-channel high-range signals 330c is found at step S301 and the signal energy Eh2 of the R-channel high-range signals 330e is found at step S302.

Then, at step S303, the sum Sh of the high-range side signal energy Eh1 for the L-channel and the high-range side signal energy Eh2 for the R-channel is found. At step S304, a square root R1 of the quotient of the signal energy Eh1 or Eh2 by the sum Sh is found. This value of R1 is sent as the above-mentioned weighting parameter to the codestring generating circuit 331l where it is encoded as part of the code string.

Figure 34:
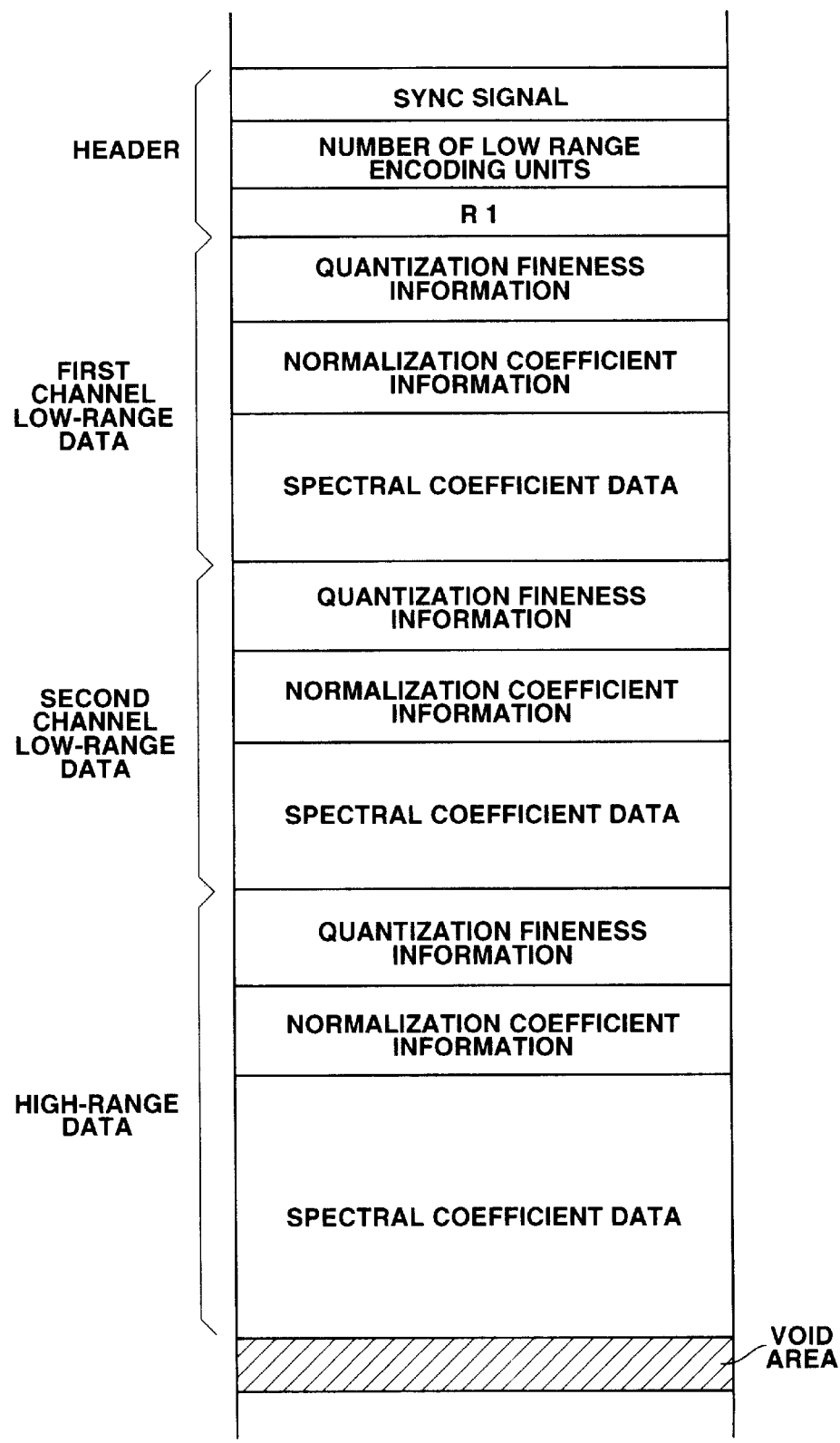
FIG. 34 illustrates the structure of a codestring in case the channels (L+R)/2 and (L−R)/2 are encoded on the low-range side and the common signals of the L and R channels and the weighting parameters are encoded on the high-range side.

FIG. 34 shows an example of a codestring generated by the codestring generating circuit 331l of FIG. 32.

Referring to FIG. 34, the codestring is made up of a header composed of synchronization signals, number of low-range encoding units and the above-mentioned weighting parameters R1, low-range side encoded data of the first channel (L+R channel) (quantization fineness information, normalization coefficient information and spectral coefficients data), low-range side encoded data of the second channel (L−R channel) (quantization fineness information, normalization coefficient information and spectral coefficients data) and high-range side encoded data of the (L+R) channel (quantization fineness information, normalization coefficient information and spectral coefficients data).

Figure 35:
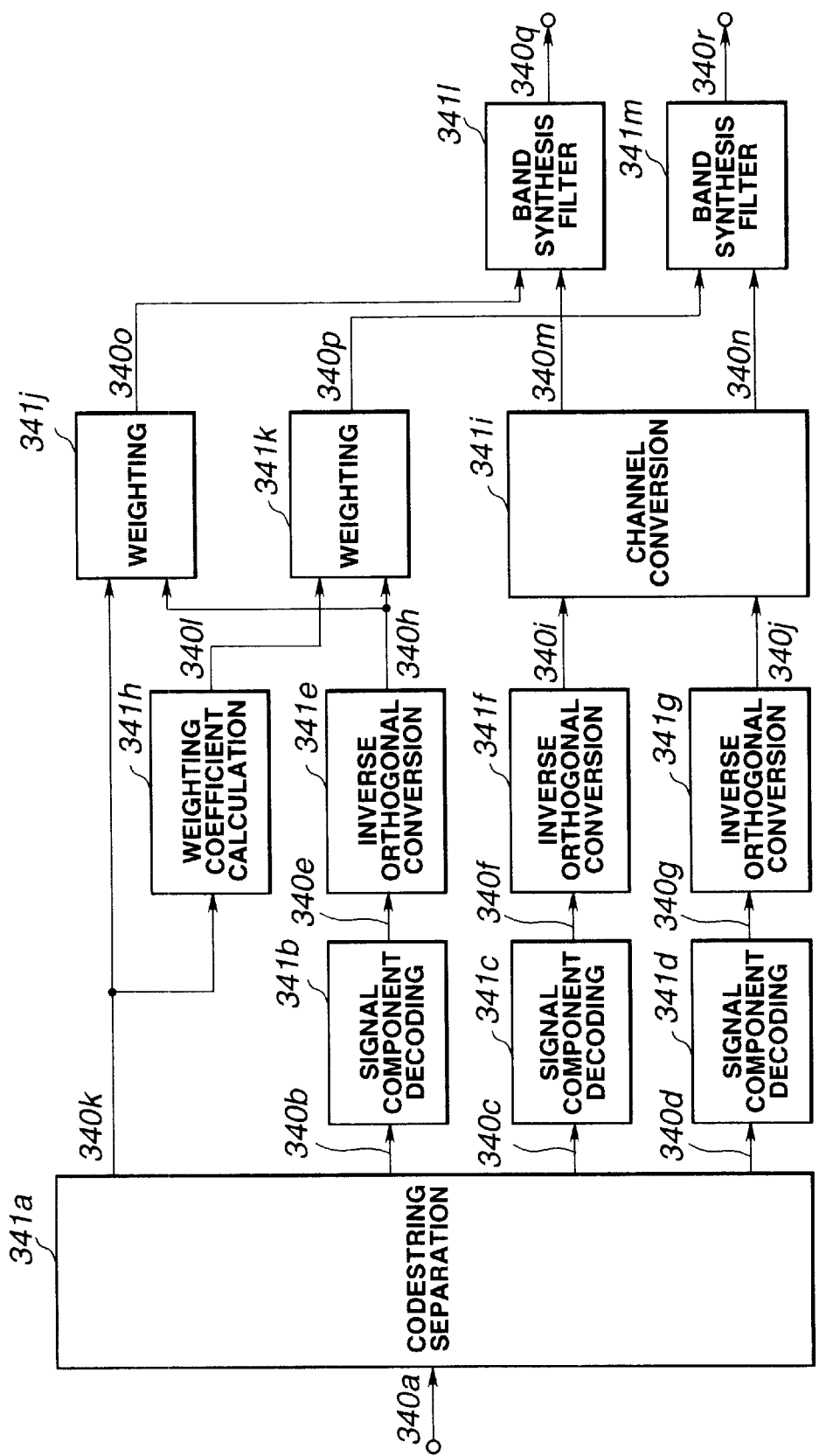
FIG. 35 is a block circuit diagram showing the schematic structure of an decoding circuit in which the channels, (L+R)/2 and (L−R)/2 are encoded on the low-range side and the common signals of the L and R channels and the weighting parameters are encoded on the high-range side.

FIG. 35 shows an illustrative structure of a decoding device adapted for decoding a codestring generated by the encoding device of FIG. 32.

Referring to FIG. 35, the encoded data 340a of the codestring of FIG. 34 are separated by a codestring separating circuit 341a into encoded data of the high-range side (L+R) channel, encoded data of the low-range side (L+R) channel and encoded data of the low-range side (L−R) channel. The encoded data 340b of the high-range side (L+R) channel are decoded by the signal component decoding circuit 341b, while encoded data 340c of the low-range side (L+R) channel are decoded by the signal component decoding circuit 341c and the encoded data 340d of the low-range side (L−R) channel are decoded by the signal component decoding circuit 341d.

The signal components 340e, 340f and 340g of the high-range side (L+R) channel, low-range side (L+R) channel and the low-range side (L−R) channel, decoded by the signal component decoding circuits 341b, 341c and 341d, respectively, are sent to associated inverse orthogonal transform circuits 341e, 341f and 341g, respectively, for inverse orthogonal transform.

The low-range signal 340i of the (L+R) channel from the inverse orthogonal transform circuit 341f and the low-range signal 340j of the (L−R) channel from the inverse orthogonal transform circuit 341g are sent to a channel conversion circuit 341i for conversion to L-channel low-range signal 340m and R-channel low-range signal 340n. These L-channel low-range signals 340m and the R-channel low-range signals 340n are sent to associated band-synthesis filters 341l and 341m, respectively.

The high-range signal 340h of the (L+R) channel from the inverse orthogonal transform circuit 341e is sent to the weighting circuits 341j, 341k.

The weighting circuit 341j is fed with the weighting coefficients 340k (weighting parameter Ri) separated from the codestring by the codestring separating circuit 341a. The weighting circuit 341k is fed with the weighting coefficients 340l (weighting parameter R2) calculated by the weighting coefficient calculating circuit 341h from the weighting coefficients 340k. The weighting coefficients 340k (weighting parameter R1) and the weighting coefficient 340l (weighting parameter R2) are correlated with each other in a manner similar to the relation between the weighting parameters r1 and r2 of FIG. 31, and represent weighting coefficients for the high-range side L and R channels (weighting parameters). That is, in the decoding circuit of FIG. 35, weighting is made for correcting the sample values of the respective signals so that the sample values will be proportionate to the weighting ice coefficients (weighting parameters R1 and R2) associated with the L and R channels, respectively.

The (L+R) channel high-range signal 340o, corresponding to the (L+R) high-range signals 340h weighted by the weighting circuit 341j, is sent to the band-synthesis circuit 341l fed with the L-channel low-range signals 340m from the channel conversion circuit 341i. The (L+R) channel high-range signal 340p, corresponding to the (L+R) high-range signals 340h weighted by the weighting circuit 341k, is sent to the band-synthesis circuit 341m fed with the R-channel low-range signals 340n from the channel conversion circuit 341i.

The band-synthesis filter 341l synthesizes the (L+R) high-range signals 340o, weighted for the L-channel, and the L-channel low-range signals 340m, by way of synthesizing the low and high ranges, to output a L-channel time-domain signal 340q of the entire range obtained by the synthesis. The band-synthesis filter 341m synthesizes the (L+R) high-range signals 340p, weighted for the R-channel, and the R-channel low-range signals 340n, by way of synthesizing the low and high ranges, to output a R-channel time-domain signal 340r of the entire range obtained by the synthesis.

Figure 36:
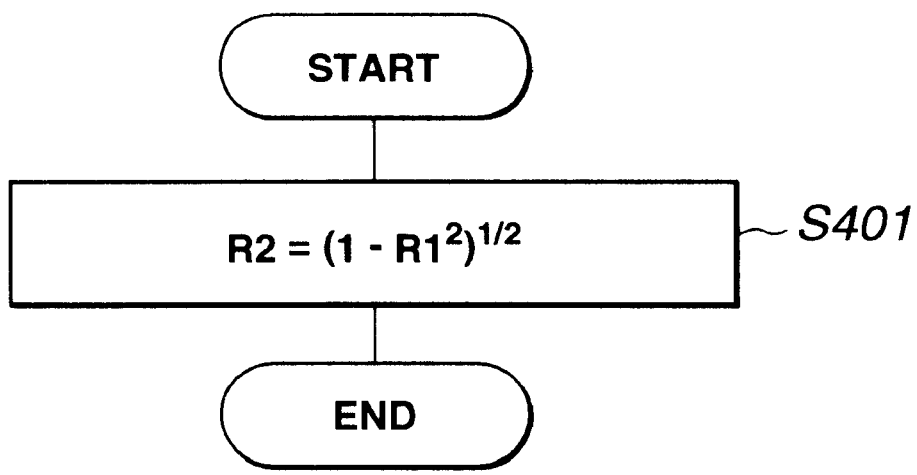
FIG. 36 is a flowchart illustrating the processing flow of a weighting coefficient calculating circuit of a decoding circuit of FIG. 35.

FIG. 36 shows a processing example of calculating the weighting coefficients 340l (weighting parameters R2) by the weighting coefficient calculating circuit 341h of FIG. 35.

In FIG. 36, at step S401, squared value of R1 is subtracted from 1 and a square root of the resulting difference is found as R2. Meanwhile, R1 is the weighting parameter corresponding to the weighting coefficient 340l. The value of R2 is sent as the above-mentioned weighting coefficient 340p to the above-mentioned band-synthesis filter 341m.

With the illustrative method, explained with reference to FIGS. 32 and 35, the high-range side signal distribution can be determined by the high-range side energy proportion itself, by employing the weighting parameters R1 and R2 obtained as described above and by adding a smaller number of bits, thus enabling reproduction of the faithful stereo sound feeling by the original acoustic signals.

Noteworthy is the fact that, with the forward orthogonal transform circuit of the encoding device and the inverse orthogonal transform of the decoding circuit, the L and R channels can be used in common for the high-range sides, thus realizing saving in processing volume and buffer memory space as compared to the above-described method.

The above description has been made of a case of using a splitting filter of splitting the frequency spectrum in high and low frequency ranges. The present invention can, however, be applied to a case wherein the number of splitting of the frequency spectrum is larger than two.

Figure 37:
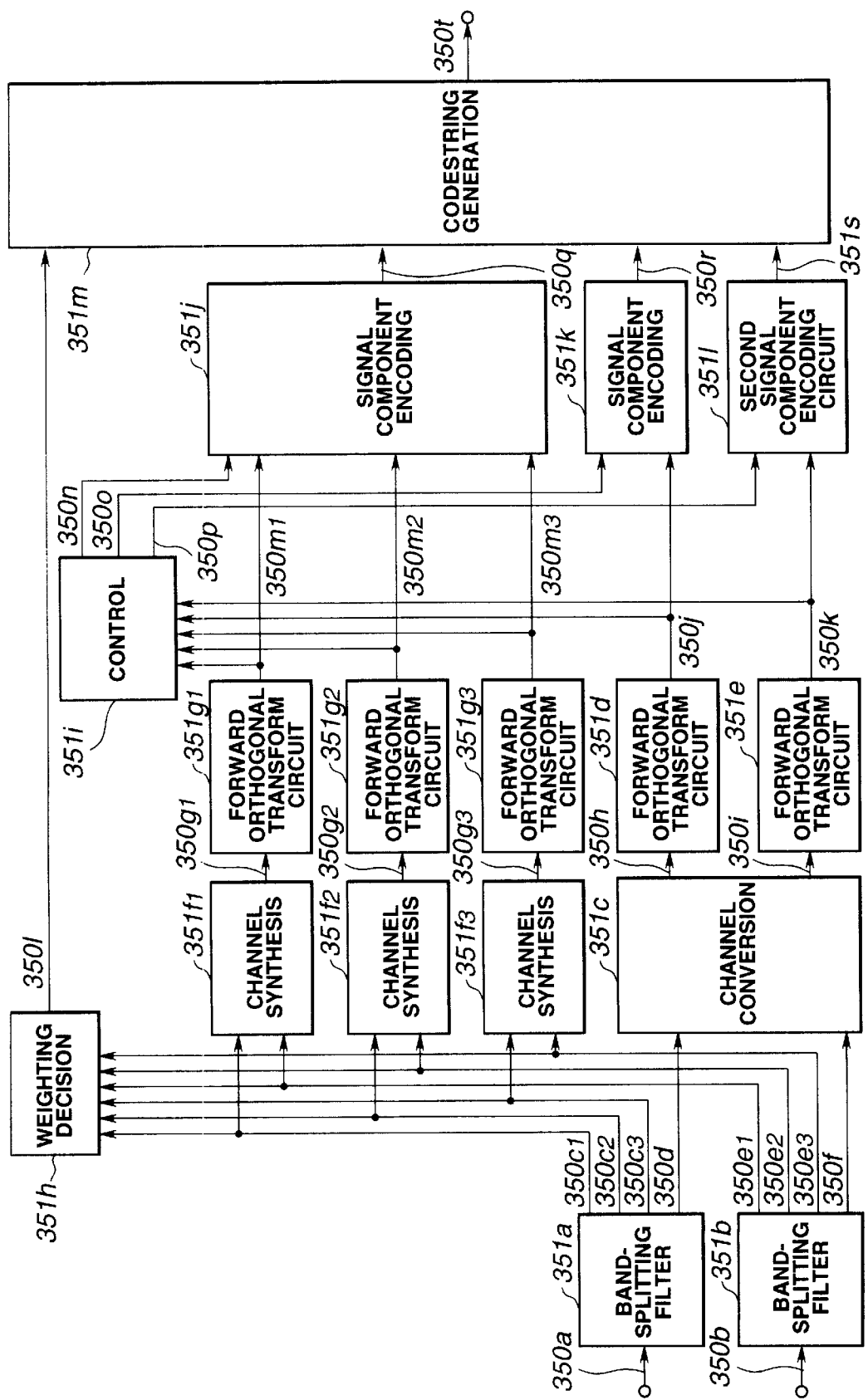
FIG. 37 is a block circuit diagram for illustrating the schematic structure of an encoding circuit having four split bands embodying the present invention.
Figure 38:
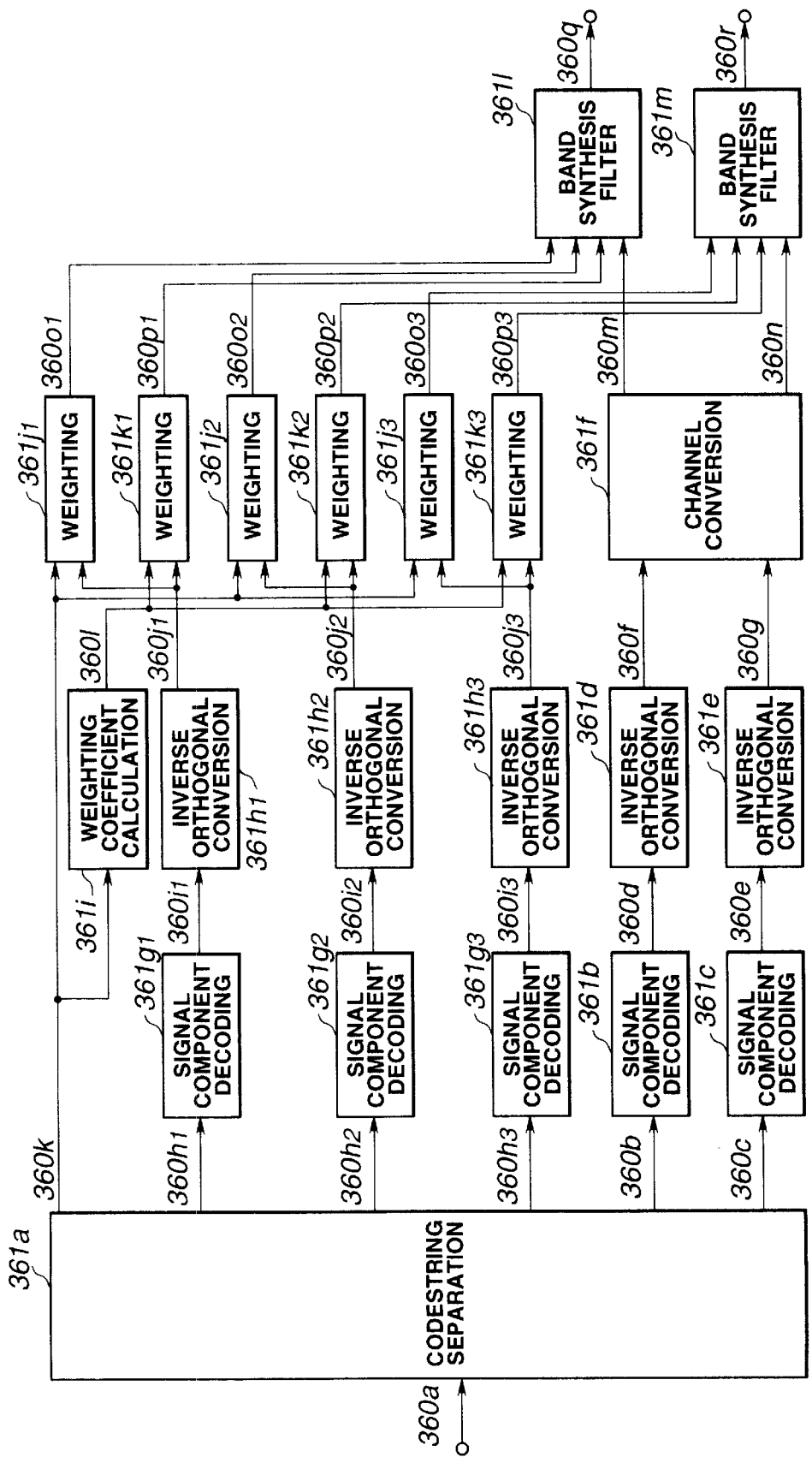
FIG. 38 is a block circuit diagram for illustrating the schematic structure of a decoding circuit having four split bands embodying the present invention.

FIGS. 37 and 38 show an illustrative structure of an encoding device (FIG. 37) and a decoding device (FIG. 38) when the method of the present invention is applied to the case wherein the number of splitting of the frequency spectrum is four. As explained with reference to FIG. 8, the encoding unit processed with normalization is set independently of the band splitting width by the band-splitting filter. It is noted that, in distinction from the above-described method of varying tkle levels of the L and R channels from one encoding unit to another, the forward orthogonal transform for the high range side and the inverse orthogonal transform for the high range side can be processed as being common to the two channels, thus again realizing saving in the processing volume and the buffer memory space.

In the encoding device shown in FIG. 37, the L-channel signal 350a and the R-channel signal 350b are sent to the band-splitting filters 35 1a, 35 1b, respectively. The band-splitting filter 351a splits the L-channel signal 350a into four band signals 350c1, 350c2, 350c3 and 350d. The band-splitting filter 351b similarly splits the R-channel signal 350b into four band signals 350e1, 350e2, 350e3 and 350f.

The L-channel lowermost signal 350d, as split by the band-splitting filter 351a, and the R-channel lowermost signal 350f, as split by the band-splitting filter 351b, are both sent to the channel conversion circuit 351c.

The channel conversion circuit 351c converts the L-channel lowermost signal 350d and the R-channel lowermost signal 350f into the (L+R) channel lowermost signal 350h and the (L−R) channel lowermost signal 350i.

The (L+R) channel lowermost signal 350h and the (L−R) channel lowermost signal 350i are sent to a forward orthogonal transform circuits 35 1d, 35 1e, respectively. The signal components 350j, 350k from these forward orthogonal transform circuits 351d, 351e are sent to associated signal component encoding circuits 351k, 351l, respectively.

Three remaining high-range side signals 350c1, 350c2, 350c3 and 350e1, 350e2, 350e3 of the L and R channels, as split by the band-splitting filters 351a and 351b, are sent to channel synthesis circuits 351f1, 351f2 and 351f3 provided in association with respective split bands. The channel synthesis circuit 351f1 synthesizes the uppermost range side signals 350c1, 350e1 of the L and R channels to produce the (L+R.) channel uppermost signal 350g1. The channel synthesis circuit 351f2 synthesizes the second upper range side signals 350c2, 350e2 of the L and R channels to produce the (L+R) channel second upper signal 350g2. The channel synthesis circuit 351f3 synthesizes the third upper range side signals 350c3, 350e3 of the L and R channels to produce the (L+R) channel third upper signal 350g3.

The high-range signals 350g1, 350g2 and 350g3 from the channel synthesis circuits 351f1, 350f2 and 350f3 are sent to forward orthogonal transform circuits 351g1, 351g2 and 351g3 for forward orthogonal transform. The signal components 350m1, 350m2 and 350m3, obtained on forward orthogonal transform by the forward orthogonal transform circuits 351g1, 351g2 and 351g3, respectively, are sent to the signal component encoding circuit 351j.

The signal components 350j, 350k, 350m1, 350m2 and 350m3 from the forward orthogonal transform circuits 351d, 351e, 351g1, 351g2 and 351g3 are sent to a control circuit 351i. The control circuit 351i determines the allocated numbers of bits for encoding 350n for the high-range side signal components 350m1, 350m2 and 350m3 of the (L+R) channel, the allocated numbers of bits for encoding 350o for the (L+R) channel lowermost signal components 350j and the allocated numbers of bits for encoding 350p for the (L−R) channel lowermost signal components 350k.

Thus, the signal component encoding circuits 351j, 351k and 351l encode the high-range side signal components of the (L+R) channel 350m1, 350m2 and 350m3 of the (L+R) channel, lower most signal components 350j of the (L+R) channel and the lower most signal components 350k of the (L−R) channel, based on the numbers of allocated bits 350n, 350o and 350p as determined by the control circuit 351i.

The high-range side three-band signals 350c1, 350c2, 350c3, 350e1, 350e2 and 350e3, obtained on splitting by the band-splitting filters 351a, 351b into four, are also sent to a weighting decision circuit 351h, which then determines the weighting coefficients (weighting parameters) 350l for the L and R channels by the method as described above.

The codestring generating circuit 351l generates and output a codestring 350t, using codes 350q, 350r and 350s from the signal component encoding circuits 351j, 351k and 351l and the weighting coefficients 350l from the weighting decision circuit 351h.

The decoding device shown in FIG. 38 splits the encoded data 360a of the codestring generated by the encoding device of FIG. 37 into encoded data of three upper side bands of the (L+R) channel, (L+R) channel of the lower most range side and the (L−R) channel lower most range side, by the codestring splitting circuit 361a. The encoded data of three upper side bands of the (L+R) channel 360h1, 360h2 and 360h3 are decoded by associated signal component decoding circuits 361g1, 361g2 and 361g3. The encoded data 360b of the (L+R) channel of the lower most range side are decoded by the signal component decoding circuit 361b, while the encoded data 360c of the (L−R) channel of the lower most range side are decoded by the signal component decoding circuit 361c.

The signal components 360i1, 360i2, 360i3, 360d and 360e of the high-range side three band (L+R) channel, the lower most side (L+R) channel and the lower most side (L−R) channel, are sent to associated inverse orthogonal transform circuits 361h1, 361h2, 361h3, 361d and 361e for inverse orthogonal transform.

The lower most range (L+R) channel signal 360f from the inverse orthogonal transform circuit 361d and the lower most range (L−R) channel signal 360g from the inverse orthogonal transform circuit 361e are sent to the channel conversion circuit 361f for conversion into the lower most L-channel signal 360m and lower most R-channel signal 360n. The lower most L-channel signal 360m and lower most R-channel signal 360n are sent to associated weighting circuits 361l, 361m, respectively.

On the other hand, the high-range side three (L+R) channel signals 360j1, 360j2 and 360j3 from the inverse orthogonal transform circuits 361h1, 361h2 and 361h3 are sent to associated weighting circuits 361j1, 361j2, 361j3, 361k1, 361k2 and 361k3.

The weighting circuits 361j1, 361j2, 361j3 are fed with weighting coefficients separated from the codestring 360k by the codestring dividing circuit 361a. The weighting circuits 361k1, 361k2 and 361k3 are fed with the weighting coefficients 360l calculated from the weighting coefficients 360k by the weighting coefficient calculating circuit 361i. The relation between the weighting coefficients 360k and the weighting coefficients 360l is similar to that between the weighting coefficients 340k, 340l shown in FIG. 35.

The high-range side three-band (L+R) channel signals 360o1, 360o2 and 360o3, obtained on weighting the high-range side three-band (L+R) channel signals 360j1, 360j2 and 360j3 by associated weighting circuits 361j1, 361j2 and 361j3, are sent to the band synthesis circuit 361l, fed with the lower most signal of the L-channel 360m from the channel conversion circuit 361f. On the other hand, the high-range side three-band (L+R) channel signals 360p1, 360p2 and 360p3, weighted by the weighting circuits 361k1, 361k2 and 361k3, are sent to the band synthesis circuit 361m, fed with the lower most signal of the R-channel 360n from the channel conversion circuit 361f.

The band synthesis filter 361l synthesizes the high-range side three-band (L+R) channel signal 360o1, 360o2 and 360o3, weighted for the L-channel, and the lower most L-channel signal 360m, by way of synthesizing the low-range and high-range signals, in order to output a L-channel time-domain signal 360q for the entire range resulting from the synthesis. On the other hand, the band synthesis filter 361m synthesizes the high-range side three-band (L+R) channel signal 360p1, 360p2 and 360p3, weighted for the R-channel, and the lower most R-channel signal 360n, by way of synthesizing the low-range and high-range signals, in order to output a R-channel time-domain signal 360r for the entire range resulting from the synthesis.

Although the foregoing description is made of the use of two channels of L and R, the present invention may be applied to acoustic signals of three or more channels. The codestring generated by the above embodiment of the encoding device, that is the encoded bitstream, can be recorded on a recording medium, such as an optical disc, a magnetic disc, a magnetic tape or a semiconductor memory, or transmitted by a transmission line, such as an optical fiber, electrical waves or infrared rays.

Although the foregoing description is made of the use of orthogonal transform, the method of the present invention may be applied to the case of using only a band-splitting filter.

What is claimed is:

1. A method for encoding plural input audio signals, comprising the steps of:
   generating plural lower frequency signals and higher frequency signals by splitting a signal derived from the plural input audio signals, wherein a number of the higher frequency signals is less than that of the plural input audio signals;
   encoding each of said plural lower frequency signals;
   encoding said higher frequency signals and generating encoding information obtained on said step of encoding said higher frequency signals; and
   generating a codestring based on signals encoded by said step of encoding each of said lower frequency signals, the step of encoding said higher frequency signals and on said encoding information.

2. The encoding method as claimed in claim 1, wherein said step of encoding higher frequency signals normalizes and encodes the higher frequency signals and also generates the encoding information, wherein the encoding information contains normalization coefficients based on said encoding of higher frequency signals.

3. The encoding method as claimed in claim 2, wherein said step of splitting generates from a signal derived from the plural input audio signals common higher frequency signals for said plural input audio signals, wherein
   said step of encoding higher frequency signals encodes the common higher frequency signals and generates the encoding information, wherein the encoding information contains normalization coefficient information based on said step of encoding higher frequency signals.

4. The encoding method as claimed in claim 1, wherein said step of splitting generates common higher frequency signals for said plural input audio signals from the signal derived from the plural input audio signals.

5. The encoding method as claimed in claim 1, wherein the plural input audio signals are right-channel and left-channel signals of an acoustic signal.

6. The encoding method as claimed in claim 5, wherein said step of splitting generates plural lower frequency signals and higher frequency signals from right-channel and left-channel signals of the acoustic signal.

7. The encoding method as claimed in claim 5, wherein said step of splitting generates plural lower frequency signals and higher frequency signals from a signal generated based on the sum of the left-channel signal and the right-channel signal of said acoustic signal.

8. The encoding method as claimed in claim 1 further comprising the step of:
   calculating weighting information for said higher frequency signals in association with each of the input audio signals, wherein said step of generating generates signals encoded by said steps of encoding higher frequency signals and lower frequency signals, said encoding information and the weighting information.

9. The encoding method as claimed in claim 1, wherein said step of slitting splits the signal derived from the plural input audio signals into plural band signals and generates plural the lower frequency signals and the higher frequency signals from the plural band signals;

said step of encoding low frequency signals forward orthogonally transforms said lower frequency signals to generate spectral signal components; and said step of encoding high frequency signals forward orthogonally transforms said higher frequency signals to generate spectral signal components.

10. The encoding method as claimed in claim 9, further comprising the step of:

calculating weighting coefficient information for the higher frequency signals associated with the input audio signal, wherein said step of generating a codestring generates a codestring based on the signal encoded by said steps of encoding the higher frequency signals and encoding the lower frequency signals, said encoding information and on the weighting information.

11. The encoding method as claimed in claim 1, wherein said step of encoding lower frequency signals encodes said plural lower frequency signals by different encoding systems.

12. An apparatus for encoding plural input audio signals, comprising:

splitting means for generating plural lower frequency signals and higher frequency signals from a signal derived from the plural input audio signals, wherein a number of the higher frequency signals is less than that of the plural input audio signals;

lower frequency encoding means for encoding each of said plural lower frequency signals;

higher frequency encoding means for encoding said higher frequency signals and for generating encoding information obtained by said higher frequency encoding means; and generating means for generating a codestring based on signals encoded by said lower frequency encoding means and the higher frequency encoding means, and on said encoding information.

13. The encoding apparatus as claimed in claim 12, wherein said higher frequency encoding means normalizes and encodes the higher frequency signals, and also generates the encoding information, wherein the encoding information contains normalization coefficients based on said encoding of higher frequency signals.

14. The encoding apparatus as claimed in claim 13, wherein said splitting means generates from a signal derived from the plural input audio signals common higher frequency signals for said plural input audio signals, wherein said higher frequency encoding means encodes the common higher frequency signals and generates the encoding information, wherein the encoding information contains normalization coefficient information based on the encoding of higher frequency signals.

15. The encoding apparatus as claimed in claim 12, wherein said splitting means generates common higher frequency signals for said plural input audio signals from the signal derived from the plural input audio signals.

16. The encoding apparatus as claimed in claim 12, wherein the plural input audio signals are right-channel and left-channel signals of an acoustic signal.

17. The encoding apparatus as claimed in claim 16, wherein said splitting means generates plural lower frequency signals and higher frequency signals from right-channel and left-channel signals of the acoustic signal.

18. The encoding apparatus as claimed in claim 16, wherein said splitting means generates plural lower frequency signals and higher frequency signals from a signal generated based on the sum of the left-channel signal and the right-channel signal of said acoustic signal.

19. The encoding apparatus as claimed in claim 12, further comprising:

weighting calculating means for calculating weighting information for said higher frequency signals in association with each of the input audio signals, wherein said generating means generates signals encoded by said lower frequency encoding means and higher frequency encoding means, said encoding information and the weighting information.

20. The encoding apparatus as claimed in claim 12, wherein said splitting means splits the signal derived from the plural input audio signals into plural band signals and generates plural the lower frequency signals and the higher frequency signals from the plural band signals;

said lower frequency encoding means forward orthogonally transforms said lower frequency signals to generate spectral signal components; and said higher frequency encoding means forward orthogonally transforms said higher frequency signals to generate spectral signal components.

21. The encoding apparatus as claimed in claim 20, further comprising:

a weighting calculating means for calculating weighting coefficient information for the higher frequency signals associated with the input audio signals, wherein said generating means generates a codestring based on the signal encoded by said lower frequency encoding means and said higher frequency encoding means, said encoding information and on the weighting information.

22. The apparatus for encoding as claimed in claim 12, wherein said lower frequency encoding means encodes said plural lower frequency signals by different encoding systems.

23. A method for decoding a codestring, comprising the steps of:

separating a codestring having low-range codes obtained on encoding each of plural lower frequency signals, generated based on plural audio signals, high-range codes obtained on each of plural higher frequency signals wherein a number of higher frequency signals is smaller than that of the plural signals and encoding information obtained on encoding the higher frequency signals;

decoding the separated low-range codes;

decoding the separated high-range codes based on the encoding information; and synthesizing plural output audio signals based on the decoded lower frequency signals and the decoded higher frequency signals.

24. The decoding method as claimed in claim 23, wherein said high-range decoding step decodes the high-range codes by denormalization based on normalization coefficient information contained in said encoding information.

25. The decoding method as claimed in claim 24, wherein said step of synthesizing generates plural output signals based on higher frequency signals decoded on denormalization by common normalization coefficients information for each of the higher frequency signals.

26. The decoding method as claimed in claim 23, wherein said step of synthesizing generates plural output signals using a common higher frequency signal decoded by the step of decoding the high-range codes and the plural lower frequency signals.

27. The decoding method as claimed in claim 23, wherein said step of synthesizing generates right-channel and left-channel signals of an acoustic signal based on the decoded lower frequency signals and the decoded higher frequency side signals.

28. The decoding method as claimed in claim 27, wherein said step of synthesizing synthesizes the decoded lower frequency signals and the decoded higher frequency signals to generate right-channel and left-channel signals of the acoustic signal.

29. The decoding method as claimed in claim 27, wherein said step of synthesizing generates right-channel and left-channel signals of the acoustic signals from a signal generated based on the sum of the decoded respective lower frequency signals, a signal generated based on the difference of the respective frequency signals and the decoded higher frequency signals.

30. The decoding method as claimed in claim 23 further comprising the step of:

generating weighting information used for controlling a level of the higher frequency signals corresponding to said plural signals, wherein said step of synthesizing generates the output audio signals based on the decoded lower frequency signals and on the higher frequency signals controlled in level based on the weighting information.

31. The decoding method as claimed in claim 23, wherein said step of synthesizing generates plural output signals based on the decoded lower frequency signals and on the higher frequency signals controlled in level based on weighting information contained in said encoding information.

32. The decoding method as claimed in claim 23, wherein said step of synthesizing inverse orthogonally transforms lower frequency spectral signal components derived from the decoded respective lower frequency signals; and said step of synthesizing also inverse orthogonally transforms higher frequency spectral signal components derived from the decoded higher frequency signals.

33. The decoding method as claimed in claim 23, wherein said plural low-range codes are decoded by respective decoding methods.

34. An apparatus for decoding a codestring, comprising:

separating means for separating a codestring having low-range codes obtained on encoding each of plural lower frequency signals, generated based on plural audio signals, high-range codes obtained on each of plural higher frequency signals, wherein a number of higher frequency signals is smaller than that of the plural signals and encoding information obtained on encoding the high-range signals;

lower frequency decoding means for decoding the separated low-range codes;

higher frequency decoding means for decoding the separated high-range codes based on the encoding information; and synthesis means for generating plural output audio signals based on the decoded lower frequency signals and the decoded higher frequency signals.

35. The decoding apparatus as claimed in claim 34, wherein said high-range decoding means decodes the high-range codes by denormalization based on normalization coefficient information contained in said encoding information.

36. The decoding apparatus as claimed in claim 35, wherein said synthesis means generates plural output signals based on higher frequency signals decoded on denormalization by common normalization coefficient information for each of the higher frequency signals.

37. The decoding apparatus as claimed in claim 34, wherein said synthesis means generates an plural output signals using the a common higher frequency signal decoded by the step of decoding the high-range codes and the plural lower frequency signals.

38. The decoding apparatus as claimed in claim 34, wherein said synthesis means generates right-channel and left-channel signals of an acoustic signal based on the decoded lower frequency signals and the decoded higher frequency signals.

39. The decoding apparatus as claimed in claim 38, wherein said synthesis means synthesizes the decoded lower frequency signals and the decoded higher frequency signals to generate right-channel and left-channel signals of the acoustic signal.

40. The decoding apparatus as claimed in claim 38, wherein said synthesis means generates right-channel and left-channel signals of the acoustic signal from a signal generated based on the sum of the decoded respective lower frequency signals, a signal generated based on the difference of the respective lower frequency signals and the decoded higher frequency signals.

41. The decoding apparatus as claimed in claim 34 further comprising:

weighted information generating means for generating weighting information used for controlling a level of the higher frequency signals corresponding to said plural signals, wherein said synthesis means generates the output audio signals based on the decoded lower frequency signals and on the higher frequency signals controlled in level based on the weighting information.

42. The decoding apparatus as claimed in claim 34, wherein said synthesis means generates plural output signals based on the decoded lower frequency signals and on the higher frequency signals controlled in level based on weighting information contained in said encoding information.

43. The decoding apparatus as claimed in claim 34, wherein said synthesis means inverse orthogonally transforms lower frequency spectral signal components derived from the decoded respective lower frequency signals; and said synthesis means also inverse orthogonally transforms higher frequency spectral signal components derived from the decoded higher frequency signals.

44. The decoding apparatus as claimed in claim 34, wherein said plural low-range codes are decoded by respective decoding methods.

45. A recording medium having plural audio signals recorded thereon, the plural audio signals represented by a codestring having low-range codes obtained on encoding each of plural lower frequency signals, high-range codes obtained on encoding a number of higher frequency signals and encoding information obtained on encoding the higher frequency signals, wherein the lower frequency signals and the higher frequency signals are generated based on plural audio signals and a number of the higher frequency signals is smaller than that of the plural audio signals.

46. The recording medium as claimed in claim 45, wherein said encoding information includes normalization coefficient information obtained on normalization of said higher frequency signals.

47. The recording medium as claimed in claim 45, wherein said encoding information includes weighting information used for controlling a level of the higher frequency signals corresponding to the plural audio signals.

48. The recording medium as claimed in claim 45, wherein common high-range codes for the plural signals and the encoding information are recorded for said plural audio signals.

49. An apparatus for encoding plural input audio signals, comprising:
  a circuit for generating plural lower frequency signals and higher frequency signals from a signal derived from the plural input audio signals, wherein a number of the higher frequency signals is less than that of the plural input audio signals;
  a lower frequency encoder for encoding each of said plural lower frequency signals;
  a higher frequency encoder for encoding said higher frequency signals and for generating encoding information obtained by said higher frequency encoder; and
  a coder for generating a codestring based on signals encoded by said lower frequency encoder and the higher frequency encoder, and on said encoding information.

50. The encoding apparatus as claimed in claim 49, wherein said higher frequency encoder normalizes and encodes the higher frequency signals and also generates the encoding information, wherein the encoding information contains normalization coefficients based on said encoding of higher frequency signals.

51. The encoding apparatus as claimed in claim 50, wherein said circuit generates from a signal derived from the plural input audio signals common higher frequency signals for said plural input audio signals, wherein
  said higher frequency encoder encodes the common higher frequency signals and generates the encoding information, wherein the encoding information contains normalization coefficient information based on the encoding of higher frequency signals.

52. The encoding apparatus as claimed in claim 49, wherein said circuit generates common higher frequency signals for said plural input audio signals from the signal derived from the plural input audio signals.

53. The encoding apparatus as claimed in claim 49, wherein the plural input audio signals are right-channel and left-channel signals of an acoustic signal.

54. The encoding apparatus as claimed in claim 53, wherein said circuit generates plural lower frequency signals and higher frequency signals from right-channel and left-channel signals of the acoustic signal.

55. The encoding apparatus as claimed in claim 53, wherein said circuit generates plural lower frequency signals and higher frequency signals from a signal generated based on the sum of the left-channel signal and the right-channel signal of said acoustic signal.

56. The encoding apparatus as claimed in claim 49, further comprising:
  a calculator for calculating weighting information for said higher frequency signals in association with each of the input audio signals, wherein
    said coder generates signals encoded by said lower frequency encoder and higher frequency encoder, said encoding information and the weighting information.

57. The encoding apparatus as claimed in claim 49, wherein
  said circuit splits the signal derived from the plural input audio signals into plural band signals and generates plural the lower frequency signals and the higher frequency signals from the plural band signals;
  said lower frequency encoder forward orthogonally transforms said lower frequency signals to generate spectral signal components; and
  said higher frequency encoder forward orthogonally transforms said higher frequency signals to generate spectral signal components.

58. The encoding apparatus as claimed in claim 57, further comprising:
  a calculator for calculating weighting coefficient information for the higher frequency signals associated with the input audio signals, wherein
    said coder generates a codestring based on the signal encoded by said lower frequency encoder and said higher frequency encoder, said encoding information and on the weighting information.

59. The apparatus for encoding as claimed in claim 49, wherein said lower frequency encoder encodes said plural lower frequency signals by different encoding systems.

60. An apparatus for decoding a codestring, comprising:
  a circuit for separating a codestring having low-range codes obtained on encoding each of plural lower frequency signals, generated based on plural audio signals, high-range codes obtained on each of plural higher frequency signals, wherein a number of higher frequency signals is smaller than that of the plural signals and encoding information obtained on encoding the high-range signals;
  lower frequency decoder for decoding the separated low-range codes;
  higher frequency decoder for decoding the separated high-range codes based on the encoding information; and
  a synthesizer for generating plural output audio signals based on the decoded lower frequency signals and the decoded higher frequency signals.

61. The decoding apparatus as claimed in claim 60, wherein said high-range decoder decodes the high-range codes by denormalization based on normalization coefficient information contained in said encoding information.

62. The decoding apparatus as claimed in claim 61, wherein said synthesizer generates plural output signals based on higher frequency signals decoded on denormalization by common normalization coefficient information for each of the higher frequency signals.

63. The decoding apparatus as claimed in claim 60, wherein said synthesizer generates an plural output signals using the a common higher frequency signal decoded by the step of decoding the high-range codes and the plural lower frequency signals.

64. The decoding apparatus as claimed in claim 60, wherein said synthesizer generates right-channel and left-channel signals of an acoustic signal based on the decoded lower frequency signals and the decoded higher frequency signals.

65. The decoding apparatus as claimed in claim 64, wherein said synthesizer synthesizes the decoded lower frequency signals and the decoded higher frequency signals to generate right-channel and left-channel signals of the acoustic signal.

66. The decoding apparatus as claimed in claim 64, wherein said synthesizer generates right-channel and left-channel signals of the acoustic signal from a signal generated based on the sum of the decoded respective lower frequency signals, a signal generated based on the difference of the respective lower frequency signals and the decoded higher frequency signals.

67. The decoding apparatus as claimed in claim 60, wherein the circuit is a first circuit, further comprising:

a second circuit for generating weighting information used for controlling a level of the higher frequency signals corresponding to said plural signals, wherein said synthesizer generates the output audio signals based on the decoded lower frequency signals and on the higher frequency signals controlled in level based on the weighting information.

68. The decoding apparatus as claimed in claim 60, wherein said synthesizer generates plural output signals based on the decoded lower frequency signals and on the higher frequency signals controlled in level based on weighting information contained in said encoding information.

69. The decoding apparatus as claimed in claim 60, wherein said synthesizer inverse orthogonally transforms lower frequency spectral signal components derived from the decoded respective lower frequency signals; and said synthesizer also inverse orthogonally transforms higher frequency spectral signal components derived from the decoded higher frequency signals.

70. The decoding apparatus as claimed in claim 60, wherein said plural low-range codes are decoded by respective decoding methods.

\* \* \* \* \*